(12) United States Patent
Dai et al.

(10) Patent No.: US 9,398,581 B2
(45) Date of Patent: Jul. 19, 2016

(54) METHOD AND DEVICE FOR TRANSMITTING DOWNLINK CONTROL INFORMATION

(71) Applicant: ZTE Corporation, Shenzhen (CN)

(72) Inventors: Bo Dai, Shenzhen (CN); Kexue Lu, Shenzhen (CN); Yijian Chen, Shenzhen (CN); Senbao Guo, Shenzhen (CN); Yunfeng Sun, Shenzhen (CN)

(73) Assignee: ZTE Corporation, Shenzhen, GD (CN)

( * ) Notice: Subject to any disclaimer, the term of this patent is extended or adjusted under 35 U.S.C. 154(b) by 0 days.

(21) Appl. No.: 14/371,368

(22) PCT Filed: Jan. 5, 2013

(86) PCT No.: PCT/CN2013/070082
§ 371 (c)(1),
(2) Date: Jul. 9, 2014

(87) PCT Pub. No.: WO2013/104277
PCT Pub. Date: Jul. 18, 2013

(65) Prior Publication Data
US 2015/0110015 A1    Apr. 23, 2015

(30) Foreign Application Priority Data
Jan. 9, 2012    (CN) .......................... 2012 1 0004604

(51) Int. Cl.
*H04W 72/04* (2009.01)
*H04L 5/00* (2006.01)

(52) U.S. Cl.
CPC ........... *H04W 72/042* (2013.01); *H04L 5/0053* (2013.01)

(58) Field of Classification Search
None
See application file for complete search history.

(56) References Cited

U.S. PATENT DOCUMENTS

2011/0170496 A1* 7/2011 Fong ............... H04L 5/0053
370/329

FOREIGN PATENT DOCUMENTS

| CN | 101707511 | | 5/2010 | |
| CN | 102082600 | | 6/2011 | |
| CN | 102256358 | | 11/2011 | |
| CN | 102256358 | A * | 11/2011 | ........ H04W 72/0453 |
| EP | 2 273 817 | | 1/2011 | |

OTHER PUBLICATIONS

Renesas Mobile Europe LTD, "*Link-Level Evaluation of E-PDCCH Design Aspects*", 3GPP TSG-RAN WG1 Meeting #66bis, R1-113175, Oct. 10-14, 2011.
Motorola Mobility, "*Initial Analysis of EPDCCH Link Performance*", 3GPP TSG RAN1#63, 812-114030, Nov. 14-18, 2011.
"*3rd Generation Partnership Project; Technical Specification Group Radio Access Network; Evolved Universal Terrestrial Radio Access (E-UTRA); Physical Layer Procedures (Release 10)*", 2011.

* cited by examiner

*Primary Examiner* — Omar Ghowrwal
(74) *Attorney, Agent, or Firm* — Diederiks & Whitelaw, PLC

(57) ABSTRACT

Provided are a method and device for transmitting downlink control information. The method comprises: according to a predefined condition, the downlink control information carried on an ePDCCH onto at least one PRB pair, the predefined condition comprising at least one of: an ePDCCH aggregation level, a subframe cyclic prefix type, a format of downlink control information carried on the ePDCCH, an ePDCCH transmission mode, and mapping mode indication information; and the downlink control information carried on the at least of PRB pairs is transmitted. By mapping according to one or more predefined conditions, the present disclosure achieves mapping from the ePDCCH to the physical resource pair, and ensures the ePDCCH to obtain frequency domain diversity gain and scheduling gain.

19 Claims, 65 Drawing Sheets

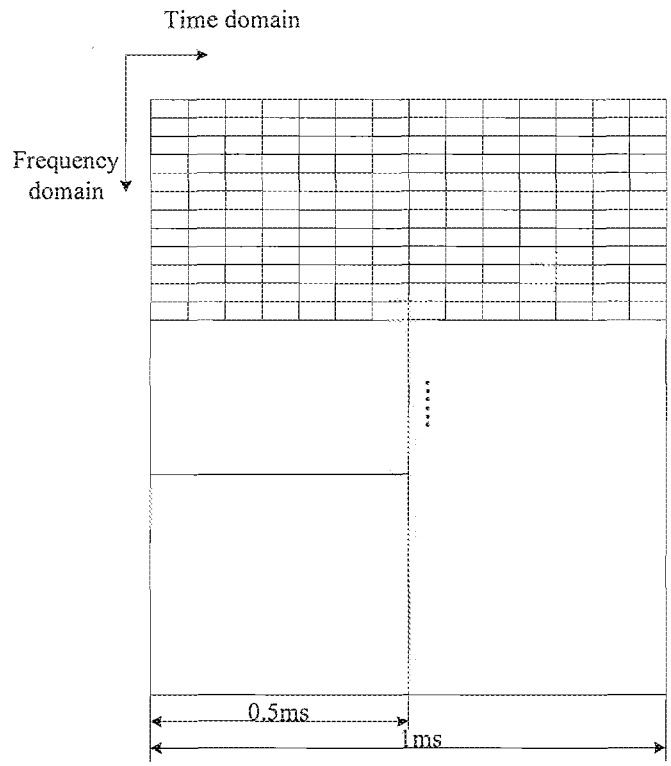

Fig. 3 according to a predefined condition, downlink control information carried on an ePDCCH is mapped onto at least one PRB pair, the predefined condition comprising at least one of: an ePDCCH aggregation level, a subframe cyclic prefix type, a format of downlink control information carried on the ePDCCH, an ePDCCH transmission mode, and mapping mode indication information — S402 the downlink control information carried on the at least one PRB pair is transmitted — S404

Fig. 4

METHOD AND DEVICE FOR TRANSMITTING DOWNLINK CONTROL INFORMATION

CROSS-REFERENCE TO RELATED APPLICATIONS

This application represents a National Stage of PCT/CN2013/0070082 filed on Jan. 5, 2013 which claims priority to Chinese Application No. 201210004604.4, filed on Jan. 9, 2012. The entire disclosure of each of the above applications is incorporated herein by reference.

TECHNICAL FIELD

The present disclosure relates to the field of communications, and in particular to a method and device for transmitting downlink control information.

BACKGROUND

There are two frame structures in a long term evolution (LTE for short) system. Frame structure type 1 is applicable to frequency division duplex (FDD for short) and frequency division half-duplex. Each radio frame has a length of 10 ms, and is composed of 20 time slots, each time slot being 0.5 ms, and numbered from 0 to 19. One subframe is composed of two continuous time slots, e.g. a subframe i is composed of two continuous time slots 2i and 2i+1.

Frame structure type 2 is applicable to time division duplex (TDD for short). One radio frame has a length of 10 ms, and is composed of two half-frames, wherein the length of each half-frame is 5 ms. One half-frame is composed of 5 subframes, wherein the length of each subframe is 1 ms. A special subframe is composed of a downlink special subframe DwPTS, a guard space (GP) and an uplink special subframe UpPTS, and the total length is 1 ms. Each subframe i is composed of two time slots 2i and 2i+1, wherein the length of each time slot is 0.5 ms (15360×Ts).

In the above-mentioned two frame structures, for a normal cyclic prefix (Normal CP for short), one time slot comprises 7 symbols, wherein the length of each symbol is 66.7 μs, and a CP length of the first symbol is 5.21 μs, and lengths of the rest 6 symbols are 4.69 μs; for an extended cyclic prefix (Extended CP for short), one time slot comprises 6 symbols, wherein the CP lengths of all the symbols are 16.67 μs.

One resource element (RE for short) is an OFDM symbol in time domain, and is a subcarrier in frequency domain; one time slot comprises $N_{symb}^{DL}$ OFDM symbols; one resource block (RB for short) is composed of $N_{symb}^{DL} \times N_{sc}^{RB}$ resource elements, is 1 time slot in time domain and 180 kHz in frequency domain; when a subframe cyclic prefix is the normal cyclic prefix, one resource element is as shown in FIG. 1; one subframe corresponds to a pair of resource blocks in the same frequency domain; and a resource block pair has two mapping modes over physical resources, one is the same resource block pair frequency domain position (continuous mapping), as shown in FIG. 2, and the other is different resource block pair frequency domain positions (discrete mapping), as shown in FIG. 3.

The LTE defines the following three downlink physical control channels: a physical downlink control format indicator channel (PCFICH for short), a physical hybrid automatic retransmission request indicator channel (PHICH for short), and a physical downlink control channel (PDCCH for short).

Information carried on the PCFICH is used for indicating the number of transmitting orthogonal frequency division multiplexing (OFDM for short) symbols of the PDCCH in a subframe, is transmitted on the first OFDM symbol of the subframe, and the frequency position thereof is determined by system downlink bandwidth and cell identity (ID for short).

The PDCCH is used for bearing downlink control information (DCI for short), comprising: physical uplink shared channel (PUSCH for short) scheduling information, physical downlink shared channel (PDSCH for short) scheduling information and uplink power control information. DCI formats are divided into the following several kinds: DCI format 0, DCI format 1, DCI format 1A, DCI format 1B, DCI format 1C, DCI format 1D, DCI format 2, DCI format 2A, DCI format 2B, DCI format 2C, DCI format 3 and DCI format 3A, DCI format 4, etc., wherein there are 9 PDSCH downlink transmission modes:

The physical downlink control channel (PDCCH) is mapped onto physical resources taking a control channel element (CCE for short) as a unit. The size of one CCE is 9 resource element groups (REGs for short), i.e. 36 resource elements. One PDCCH have four aggregation levels, the four aggregation levels respectively corresponding to the case where one PDCCH occupies 1, 2, 4 or 8 CCEs, which are referred to as aggregation level 1, aggregation level 2, aggregation level 4 and aggregation level 8, which also correspond to four formats of the PDCCH. That is to say, the aggregation level represents the size of the physical resource occupied by the physical downlink control channel.

In Release (R for short) 8/9 of the LTE system, in order to measure the quality of a channel and to demodulate a received data symbol, a common reference signal (CRS for short) is designed. User equipment (UE) may perform channel measurement via the CRS, thereby supporting the UE to perform cell reselection and switching to a target cell. In LTE R10, in order to further improve the average spectrum utilization rate of a cell and the edge spectrum utilization rate of the cell and the throughput rate of each UE, two reference signals are respectively defined: a channel information reference signal (CSI-RS) and a demodulation reference signal (DMRS), wherein the CSI-RS is used for channel measurement, and the DMRS is used for downlink shared channel demodulation. The use of DMRS demodulation may use a beam method to reduce the interference between different receiving sides and different cells, and may reduce the performance decreasing due to codebook granularity, and lower the overhead of downlink control signalling to some extent.

In order to obtain larger working spectrum and system bandwidth, one direct technique is to aggregate several continuous component carriers (spectrum) distributed on different frequency bands using the carrier aggregation technology, thereby forming bandwidth which may be used by LTE-Advanced, e.g.: 100 MHz. That is to say, the aggregated spectrum is divided into n component carriers (spectrum), the spectrum in each component carrier (spectrum) being continuous. The spectrum is divided into two types: a primary component carrier (PCC) and a secondary component carrier (SCC), which are also referred to a primary cell and a secondary cell.

In an LTE R10 heterogeneous network, since different base station types have a relatively strong interference, considering the interference problem from a macro base station (Macro eNodeB) on a micro base station (Pico) and the interference problem from a home base station (Home eNodeB) on the macro base station (Macro eNodeB), LTE R11 proposes a multi-antenna transmission method based on a user-dedicated pilot frequency, which solves the interference problems. In addition, by mapping the PDCCH to a PDSCH area, the use of a frequency division multiplexing mode similar to PDSCH multiplexing may achieve frequency domain coordination of inter-cell interference.

In the LTE R11 stage, it is considered to introduce more user PDSCH areas for transmitting data. The capacity of 4 OFDM symbols at maximum configured currently may not satisfy the requirements. In order to provide a control channel with a larger capacity, there is a need to design an enhanced control channel, or there is a need to open a new resource for transmitting control information over the PDSCH resource.

At present, the specific mapping mode of the physical downlink control channel (also referred to as an enhanced physical downlink control channel (ePDCCH)) mapped onto a new resource is not determined yet, and meanwhile, the specific mapping mode needs to ensure the enhanced physical downlink control channel to obtain frequency domain diversity gain or scheduling gain; in addition, multiple ePDCCHs are centrally mapped as much as possible, so as to reduce the influence on PDSCH transmission from the resource occupied by the ePDCCHs.

SUMMARY

Provided are a method and device for transmitting downlink control information, so as to at least solve the problem that an enhanced physical downlink control channel (ePDCCH) cannot be mapped onto at least one PRB pair.

Provided is a method for transmitting downlink control information, comprising: according to a predefined condition, mapping the downlink control information carried on an ePDCCH onto at least one physical resource block (PRB) pair, the predefined condition comprising at least one of: an ePDCCH aggregation level, a subframe cyclic prefix type, a format of the downlink control information carried on the ePDCCH, an ePDCCH transmission mode, and mapping mode indication information; and transmitting the downlink control information carried on the at least one PRB pair.

Preferably, if the at least one PRB pair is capable of carrying 4 pieces of the downlink control information with the aggregation level being 1, according to a predefined condition, mapping the downlink control information carried on the ePDCCH onto the at least one PRB pair comprises a part or all of one of: mapping onto 1 PRB pair when the aggregation level is 1, mapping onto 2 PRB pairs when the aggregation level is 2, mapping onto 4 PRB pairs when the aggregation level is 4, and mapping onto 8 PRB pairs when the aggregation level is 8; mapping onto 1 PRB pair when the aggregation level is 1, mapping onto 2 PRB pairs when the aggregation level is 2, mapping onto 4 PRB pairs when the aggregation level is 4, and mapping onto 4 PRB pairs when the aggregation level is 8; and mapping onto 1 PRB pair when the aggregation level is 1, mapping onto 2 PRB pairs when the aggregation level is 2, mapping onto 2 PRB pairs when the aggregation level is 4, and mapping onto 2 PRB pairs when the aggregation level is 8.

Preferably, if the at least one PRB pair is capable of carrying 2 pieces of the downlink control information with the aggregation level being 1, according to the predefined condition, mapping the downlink control information carried on the ePDCCH onto the at least one PRB pair comprises a part or all of one of: if the predefined condition comprises that the subframe cyclic prefix type is Normal CP, mapping onto 2 PRB pairs when the aggregation level is 1, mapping onto 2 PRB pairs when the aggregation level is 2, mapping onto 2 PRB pairs when the aggregation level is 4, and mapping onto 4 PRB pairs when the aggregation level is 8; if the predefined condition comprises that the subframe cyclic prefix type is Normal CP, mapping onto 2 PRB pairs when the aggregation level is 1, mapping onto 4 PRB pairs when the aggregation level is 2, mapping onto 4 PRB pairs when the aggregation level is 4, and mapping onto 4 PRB pairs when the aggregation level is 8; if the predefined condition comprises that the subframe cyclic prefix type is Normal CP, mapping onto 2 PRB pairs when the aggregation level is 1, mapping onto 4 PRB pairs when the aggregation level is 2, mapping onto 8 PRB pairs when the aggregation level is 4, and mapping onto 8 PRB pairs when the aggregation level is 8; if the predefined condition comprises that the subframe cyclic prefix type is Extended CP, mapping onto 1 PRB pair when the aggregation level is 1, mapping onto 2 PRB pairs when the aggregation level is 2, mapping onto 4 PRB pairs when the aggregation level is 4, and mapping onto 8 PRB pairs when the aggregation level is 8; and if the predefined condition comprises that the subframe cyclic prefix type is Extended CP, mapping onto 1 PRB pair when the aggregation level is 1, mapping onto 2 PRB pairs when the aggregation level is 2, mapping onto 2 PRB pairs when the aggregation level is 4, and mapping onto 4 PRB pairs when the aggregation level is 8.

Preferably, if the at least one PRB pair is capable of carrying 1 piece of the downlink control information with the aggregation level being 1, according to the predefined condition, mapping the downlink control information carried on the ePDCCH onto the at least one PRB pair comprises a part or all of one of: if the predefined condition comprises that the subframe cyclic prefix type is Normal CP, mapping onto 4 PRB pairs when the aggregation level is 1, mapping onto 4 PRB pairs when the aggregation level is 2, mapping onto 4 PRB pairs when the aggregation level is 4, and mapping onto 8 PRB pairs when the aggregation level is 8; if the predefined condition comprises that the subframe cyclic prefix type is Normal CP, mapping onto 4 PRB pairs when the aggregation level is 1, mapping onto 8 PRB pairs when the aggregation level is 2, mapping onto 8 PRB pairs when the aggregation level is 4, and mapping onto 8 PRB pairs when the aggregation level is 8; if the predefined condition comprises that the subframe cyclic prefix type is Extended CP, mapping onto 2 of the PRB pair when the aggregation level is 1, mapping onto 2 PRB pairs when the aggregation level is 2, mapping onto 4 PRB pairs when the aggregation level is 4, and mapping onto 8 PRB pairs when the aggregation level is 8; if the predefined condition comprises that the subframe cyclic prefix type is Extended CP, mapping onto 2 PRBs pair when the aggregation level is 1, mapping onto 2 PRB pairs when the aggregation level is 2, mapping onto 4 PRB pairs when the aggregation level is 4, and mapping onto 8 PRB pairs when the aggregation level is 8; and if the predefined condition comprises that the subframe cyclic prefix type is Extended CP, mapping onto 2 PRB pairs when the aggregation level is 1, mapping onto 4 PRB pairs when the aggregation level is 2, mapping onto 8 PRB pairs when the aggregation level is 4, and mapping onto 8 PRB pairs when the aggregation level is 8.

Preferably, if the at least one PRB pair is capable of carrying K pieces of the downlink control information with the aggregation level being 1 and the value range of K comprises at least one of 1, 2 and 4, according to the predefined condition, mapping the downlink control information carried on the ePDCCH onto the at least one PRB pair comprises one of: successively ranking aggregation levels comprised by all the PRB pairs configured to carry the downlink control information, and mapping according to an aggregation level type sequence on the basis of a predefined initial aggregation level index; and successively ranking aggregation levels comprised by all the PRB pairs configured to carry the downlink control information, and mapping according to an aggregation level type sequence on the basis of an aggregation level index configured by a base station.

Preferably, before mapping the downlink control information carried on the ePDCCH onto the at least one PRB pair according to the predefined condition, the method further comprises: determining the aggregation level according to indication information, wherein the indication information comprises at least one of: the format of the downlink control information carried on the ePDCCH, the ePDCCH transmission mode, an ePDCCH modulation mode, high layer signalling, and a transmission mode of physical downlink shared channel (PDSH).

Preferably, after mapping the downlink control information carried on the ePDCCH onto the at least one PRB pair according to the predefined condition, the method further comprises: according to the aggregation level, determining a port for a demodulation reference signal on the PRB pair onto which the downlink control information carried on the ePDCCH maps.

Also provided is a device for transmitting downlink control information, comprising: a mapping module, configured to, according to a predefined condition, map the downlink control information carried on an ePDCCH onto at least one PRB pair, the predefined condition comprising at least one of: an ePDCCH aggregation level, a subframe cyclic prefix type, a format of the downlink control information carried on the ePDCCH, an ePDCCH transmission mode, and mapping mode indication information; and a transmission module, configured to transmit the downlink control information carried on the at least one PRB pair.

Preferably, if the at least one PRB pair is capable of carrying 4 pieces of the downlink control information with the aggregation level being 1, the mapping module comprises: a first mapping sub-module, configured to map onto 1 PRB pair when the aggregation level is 1, map onto 2 PRB pairs when the aggregation level is 2, map onto 4 PRB pairs when the aggregation level is 4, and map onto 8 PRB pairs when the aggregation level is 8; a second mapping sub-module, configured to map onto 1 PRB pair when the aggregation level is 1, map onto 2 PRB pairs when the aggregation level is 2, map onto 4 PRB pairs when the aggregation level is 4, and map onto 4 PRB pairs when the aggregation level is 8; and a third mapping sub-module, configured to map onto 1 PRB pair when the aggregation level is 1, map onto 2 PRB pairs when the aggregation level is 2, map onto 2 PRB pairs when the aggregation level is 4, and mapping onto 2 PRB pairs when the aggregation level is 8.

Preferably, if the at least one PRB pair is capable of carrying 2 pieces of the downlink control information with the aggregation level being 1, the mapping module comprises: a fourth mapping sub-module, configured to, if the predefined condition comprises that the subframe cyclic prefix type is Normal CP, mapping onto 2 of the PRB pairs when the aggregation level is 1, mapping onto 2 of the PRB pairs when the aggregation level is 2, mapping onto 2 PRB pairs when the aggregation level is 4, and map onto 4 PRB pairs when the aggregation level is 8; a fifth mapping sub-module, configured to, if the predefined condition comprises that the subframe cyclic prefix type is Normal CP, map onto 2 PRB pairs when the aggregation level is 1, map onto 4 PRB pairs when the aggregation level is 2, map onto 4 PRB pairs when the aggregation level is 4, and map onto 4 PRB pairs when the aggregation level is 8; a sixth mapping sub-module, configured to, if the predefined condition comprises that the subframe cyclic prefix type is Normal CP, map onto 2 PRB pairs when the aggregation level is 1, map onto 4 PRB pairs when the aggregation level is 2, map onto 8 PRB pairs when the aggregation level is 4, and map onto 8 PRB pairs when the aggregation level is 8; a seventh mapping sub-module, configured to, if the predefined condition comprises that the subframe cyclic prefix type is Extended CP, map onto 1 PRB pair when the aggregation level is 1, map onto 2 PRB pairs when the aggregation level is 2, map onto 4 PRB pairs when the aggregation level is 4, and map onto 8 PRB pairs when the aggregation level is 8; and an eighth mapping sub-module, configured to, if the predefined condition comprises that the subframe cyclic prefix type is Extended CP, map onto 1 PRB pair when the aggregation level is 1, map onto 2 PRB pairs when the aggregation level is 2, map onto 2 PRB pairs when the aggregation level is 4, and map onto 4 PRB pairs when the aggregation level is 8.

Preferably, if the at least one PRB pair is capable of carrying 1 piece of the to downlink control information with the aggregation level being 1, the mapping module comprises: a ninth mapping sub-module, configured to, if the predefined condition comprises that the subframe cyclic prefix type is Normal CP, map onto 4 PRB pairs when the aggregation level is 1, map onto 4 PRB pairs when the aggregation level is 2, map onto 4 PRB pairs when the aggregation level is 4, and map onto 8 PRB pairs when the aggregation level is 8; a tenth mapping sub-module, configured to, if the predefined condition comprises that the subframe cyclic prefix type is Normal CP, map onto 4 PRB pairs when the aggregation level is 1, map onto 8 PRB pairs when the aggregation level is 2, map onto 8 PRB pairs when the aggregation level is 4, and map onto 8 PRB pairs when the aggregation level is 8; an eleventh mapping sub-module, configured to, if the predefined condition comprises that the subframe cyclic prefix type is Extended CP, map onto 2 PRB pairs when the aggregation level is 1, map onto 2 PRB pairs when the aggregation level is 2, map onto 4 PRB pairs when the aggregation level is 4, and map onto 8 PRB pairs when the aggregation level is 8; a twelfth mapping sub-module, configured to, if the predefined condition comprises that the subframe cyclic prefix type is Extended CP, map onto 2 PRB pairs when the aggregation level is 1, map onto 4 PRB pairs when the aggregation level is 2, map onto 4 PRB pairs when the aggregation level is 4, and map onto 8 PRB pairs when the aggregation level is 8; and a thirteenth mapping sub-module, configured to, if the predefined condition comprises that the subframe cyclic prefix type is Extended CP, map onto 2 PRB pairs when the aggregation level is 1, map onto 4 PRB pairs when the aggregation level is 2, map onto 8 PRB pairs when the aggregation level is 4, and map onto 8 PRB pairs when the aggregation level is 8.

Preferably, if the at least one PRB pair is capable of carrying K pieces of the downlink control information with the aggregation level being 1 and the value range of K comprises at least one of 1, 2 and 4, the mapping module comprises: a ranking module, configured to successively rank aggregation levels comprised by all the PRB pairs configured to carry the downlink control information; a fourteenth mapping sub-module, configured to map according to an aggregation level type sequence on the basis of a predefined initial aggregation level index; and a fifteenth mapping sub-module, configured to map according to an aggregation level type sequence on the basis of an aggregation level index configured by a base station.

By mapping according to one or more predefined conditions, the present disclosure achieves mapping from the ePDCCH to the PRB pairs, and ensures the ePDCCH to obtain frequency domain diversity gain and scheduling gain.

BRIEF DESCRIPTION OF THE DRAWINGS

Drawings, provided for further understanding of the present disclosure and forming a part of the specification, are used to explain the present disclosure together with embodiments of the present disclosure rather than to limit the present disclosure. In the drawings:

FIG. 3 is a schematic diagram of continuous mapping of resource block pairs according to the relevant technology;

FIG. 4 is a flow chart of a method for transmitting downlink control information according to an embodiment of the present disclosure;

DETAILED DESCRIPTION OF THE EMBODIMENTS

Figure 1:
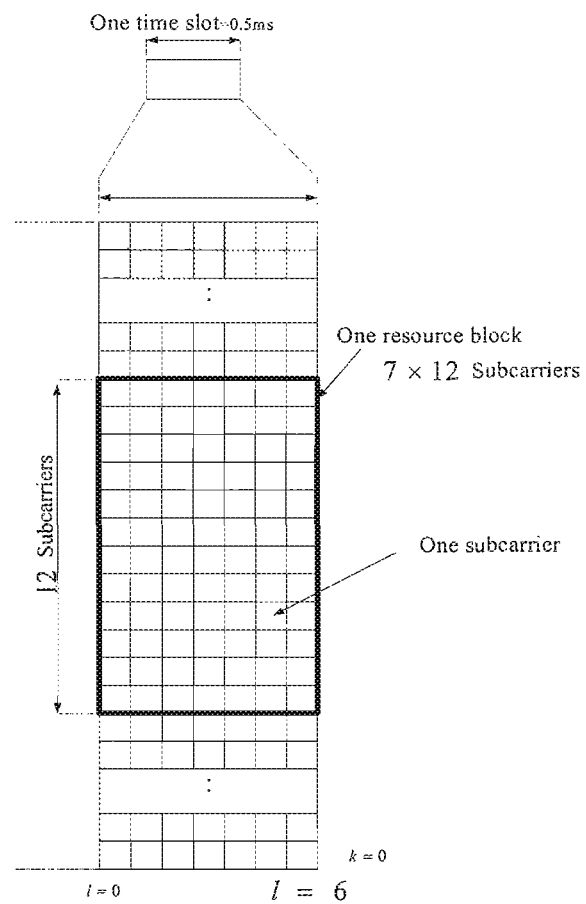
FIG. 1 is a schematic diagram of resource block mapping when a subframe cyclic prefix is a normal cyclic prefix according to the relevant technology.
Figure 2:
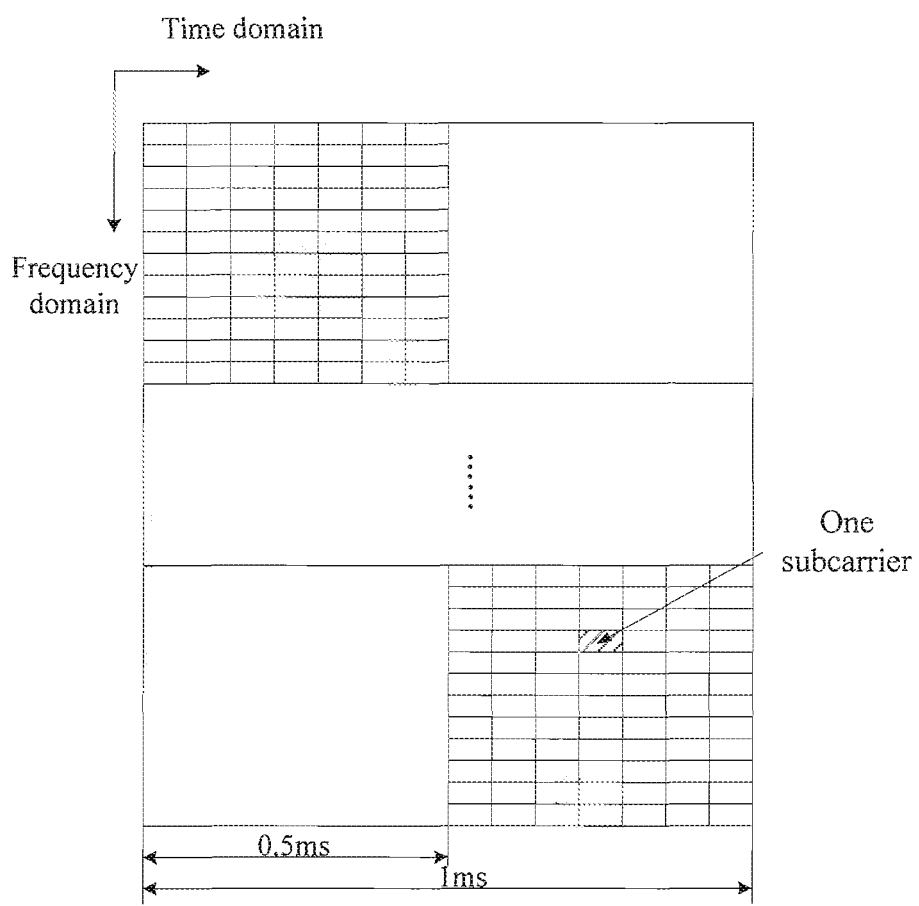
FIG. 2 is a schematic diagram of discrete mapping of resource block pairs according to the relevant technology.

Note that, the embodiments of the present disclosure and the features of the embodiments can be combined with each other if there is no conflict. The present disclosure will be explained below with reference to the drawings and in conjunction with the embodiments in detail.

The present disclosure provides a method for transmitting downlink control information. FIG. 4 is a flow chart of a method for transmitting downlink control information according to an embodiment of the present disclosure. As shown in FIG. 4, the following step S402 to step S404 are comprised.

Step S402, according to a predefined condition, downlink control information carried on an ePDCCH is mapped onto at least one PRB pair, the predefined condition comprising at least one of: an ePDCCH aggregation level, a subframe cyclic prefix type, a format of downlink control information carried on the ePDCCH, an ePDCCH transmission mode, and mapping mode indication information; and Step S404, the downlink control information carried on the at least one PRB pair is transmitted.

In the relevant technology, the ePDCCH cannot be mapped onto the PRB pairs. In the embodiment of the present disclosure, by mapping according to one or more predefined conditions, the present disclosure achieves mapping from the ePDCCH to the PRB pairs, and ensures the ePDCCH to obtain frequency domain diversity gain and scheduling gain.

In order to illustrate the above-mentioned step S402 in detail, the present disclosure also provides four specific implementation methods in combination with the case where the PRB pairs are capable of carrying downlink control information with the aggregation level being 1 and the cases of subframe cyclic prefix types comprised in the predefined condition.

Method I: If the PRB Pairs are Capable of Carrying 4 Pieces of Downlink Control Information with the Aggregation Level being 1, any Mapping Mode of the Following (1) to (3) May be Applied:

(1) it is mapped onto 1 PRB pair when the aggregation level is 1, mapped onto 2 PRB pairs when the aggregation level is 2, mapped onto 4 PRB pairs when the aggregation level is 4, and mapped onto 8 PRB pairs when the aggregation level is 8;

(2) it is mapped onto 1 PRB pair when the aggregation level is 1, mapped onto 2 PRB pairs when the aggregation level is 2, mapped onto 4 PRB pairs when the aggregation level is 4, and mapped onto 4 PRB pairs when the aggregation level is 8; and (3) it is mapped onto 1 PRB pair when the aggregation level is 1, mapped onto 2 PRB pairs when the aggregation level is 2, mapped onto 2 PRB pairs when the aggregation level is 4, and mapped onto 2 PRB pairs when the aggregation level is 8.

Method II: If the PRB Pairs are Capable of Carrying 2 Pieces of Downlink Control Information with the Aggregation Level being 1

(1) If the predefined condition comprises that the subframe cyclic prefix type is Normal CP, any mapping mode of the following A to C may be applied:

A. it is mapped onto 2 PRB pairs when the aggregation level is 1, mapped onto 2 PRB pairs when the aggregation level is 2, mapped onto 2 PRB pairs when the aggregation level is 4, and mapped onto 4 PRB pairs when the aggregation level is 8;

B. it is mapped onto 2 PRB pairs when the aggregation level is 1, mapped onto 4 PRB pairs when the aggregation level is 2, mapped onto 4 PRB pairs when the aggregation level is 4, and mapped onto 4 PRB pairs when the aggregation level is 8; and C. it is mapped onto 2 PRB pairs when the aggregation level is 1, mapped onto 4 PRB pairs when the aggregation level is 2, mapped onto 8 PRB pairs when the aggregation level is 4, and mapped onto 8 PRB pairs when the aggregation level is 8.

(2) If the predefined condition comprises that the subframe cyclic prefix type is Extended CP, the mapping mode of the following A or B may be applied:

A. it is mapped onto 1 PRB pair when the aggregation level is 1, mapped onto 2 PRB pairs when the aggregation level is 2, mapped onto 4 PRB pairs when the aggregation level is 4, and mapped onto 8 PRB pairs when the aggregation level is 8; and B. it is mapped onto 1 PRB pair when the aggregation level is 1, mapped onto 2 PRB pairs when the aggregation level is 2, mapped onto 2 PRB pairs when the aggregation level is 4, and mapped onto 4 PRB pairs when the aggregation level is 8.

Method III: If the PRB Pairs are Capable of Carrying 1 Piece of Downlink Control Information with the Aggregation Level being 1

(1) If the predefined condition comprises that the subframe cyclic prefix type is Normal CP, the mapping mode of the following A or B may be applied:

A. it is mapped onto 4 PRB pairs when the aggregation level is 1, mapped onto 4 PRB pairs when the aggregation level is 2, mapped onto 4 PRB pairs when the aggregation level is 4, and mapped onto 8 PRB pairs when the aggregation level is 8; and B. it is mapped onto 4 PRB pairs when the aggregation level is 1, mapped onto 8 PRB pairs when the aggregation level is 2, mapped onto 8 PRB pairs when the aggregation level is 4, and mapped onto 8 PRB pairs when the aggregation level is 8.

(2) If the predefined condition comprises that the subframe cyclic prefix type is Extended CP, any mapping mode of the following A to C may be applied:

A. it is mapped onto 2 PRB pairs when the aggregation level is 1, mapped onto 2 PRB pairs when the aggregation level is 2, mapped onto 4 PRB pairs when the aggregation level is 4, and mapped onto 8 PRB pairs when the aggregation level is 8;

B. it is mapped onto 2 PRB pairs when the aggregation level is 1, mapped onto 4 PRB pairs when the aggregation level is 2, mapped onto 4 PRB pairs when the aggregation level is 4, and mapped onto 8 PRB pairs when the aggregation level is 8; and C. it is mapped onto 2 PRB pairs when the aggregation level is 1, mapped onto 4 PRB pairs when the aggregation level is 2, mapped onto 8 PRB pairs when the aggregation level is 4, and mapped onto 8 PRB pairs when the aggregation level is 8.

Method VI: If the PRB Pairs are Capable of Carrying K Pieces of Downlink Control Information with the Aggregation Level being 1 and the Value Range of K Comprises at Least One of 1, 2 and 4

The present disclosure may successively rank aggregation levels comprised by all the PRB pairs configured to carry the downlink control information, and perform mapping according to an aggregation level type sequence on the basis of a predefined initial aggregation level index, or successively rank aggregation levels comprised by all the PRB pairs configured to carry the downlink control information, and perform mapping according to an aggregation level type sequence on the basis of an aggregation level index configured by a base station.

In addition, the present disclosure further provides a specific implementation method, i.e. according to the format of downlink control information carried on the ePDCCH, mapping downlink control information carried on the ePDCCH onto the PRB pairs, and specifically, it may be defined that the corresponding bit number of the minimum aggregation level corresponding to the ePDCCH is greater than the maximum bit number corresponding to the downlink control information format.

Preferably, a downlink control information format set H and a downlink control information format set F are defined, wherein the mapping method corresponding to the downlink control information format set H is method X, and the mapping method corresponding to the downlink control information format set F is method Y. The specific applications are as follows:

the downlink control information format set H comprises DCI Format 2C and DCI Format 4;

the downlink control information format set F comprises DCI Format 1A and DCI Format 0; and the mapping method corresponding to DCI Format 2C and DCI Format 4 is method X, and the mapping method corresponding to DCI Format 1A and DCI Format 0 is method I, or the mapping method corresponding to DCI Format 2C and DCI Format 4 is method III, and the mapping method corresponding to DCI Format 1A and DCI Format 0 is method I.

In addition, before mapping the downlink control information carried on the ePDCCH onto the PRB pairs, the aggregation levels may be configured as fixed M kinds by a base station in the present disclosure, wherein M is a natural number, or the present disclosure may also determine aggregation levels according to the indication information. Determining an aggregation level according to indication information will be described in detail in combination with examples 1 to 5.

Example 1, the aggregation levels are determined according to the format of downlink control information carried on the ePDCCH. Specifically, a downlink control information format set H1 and a downlink control information format set F may be defined, wherein specifically, the aggregation levels corresponding to the downlink control information format set H1 are X2, and the aggregation levels corresponding to the downlink control information format set F1 are Y2.

Example 2, the aggregation levels are determined according to the ePDCCH transmission mode. Specifically, when the ePDCCH applies a diversity transmission mode, the corresponding aggregation levels are X3, and when the ePDCCH applies a single-antenna port transmission mode, the corresponding aggregation levels are Y3.

Example 3, the aggregation levels are determined according to high layer signalling. Specifically, the aggregation levels configured by RRC signalling are one or more of 1, 2, 4 and 8.

Example 4, the aggregation levels are determined according to a physical downlink shared channel transmission mode. Specifically, a PDSCH transmission mode set H2 and a PDSCH transmission mode set F2 may be defined, wherein the aggregation levels corresponding to the PDSCH transmission mode set H2 are X4, and the aggregation levels corresponding to the PDSCH transmission mode set F2 are Y4. In this manner, the aggregation levels of the ePDCCH are determined according to the PDSCH transmission mode, such that a plurality of ePDCCHs are centrally mapped as much as possible, so as to reduce the influence on PDSCH transmission from the resource occupied by the ePDCCHs.

Example 5, the aggregation levels are determined according to the ePDCCH modulation mode. Specifically, it may be defined that if the ePDCCH modulation mode is QPSK, then the aggregation levels are X5, and if the ePDCCH modulation mode is 16QAM, then the aggregation levels are Y5.

In addition, after mapping the downlink control information carried on the ePDCCH onto the PRB pairs according to the predefined condition, a port for a demodulation reference signal on the PRB pairs onto which the downlink control information carried on the ePDCCH maps may also be determined according to the aggregation levels.

The implementation process of embodiments of the present disclosure is described below in combination with preferred embodiments I to VII in detail.

Preferred Embodiment I

Corresponding to the Above-Mentioned Method I

Figure 5:
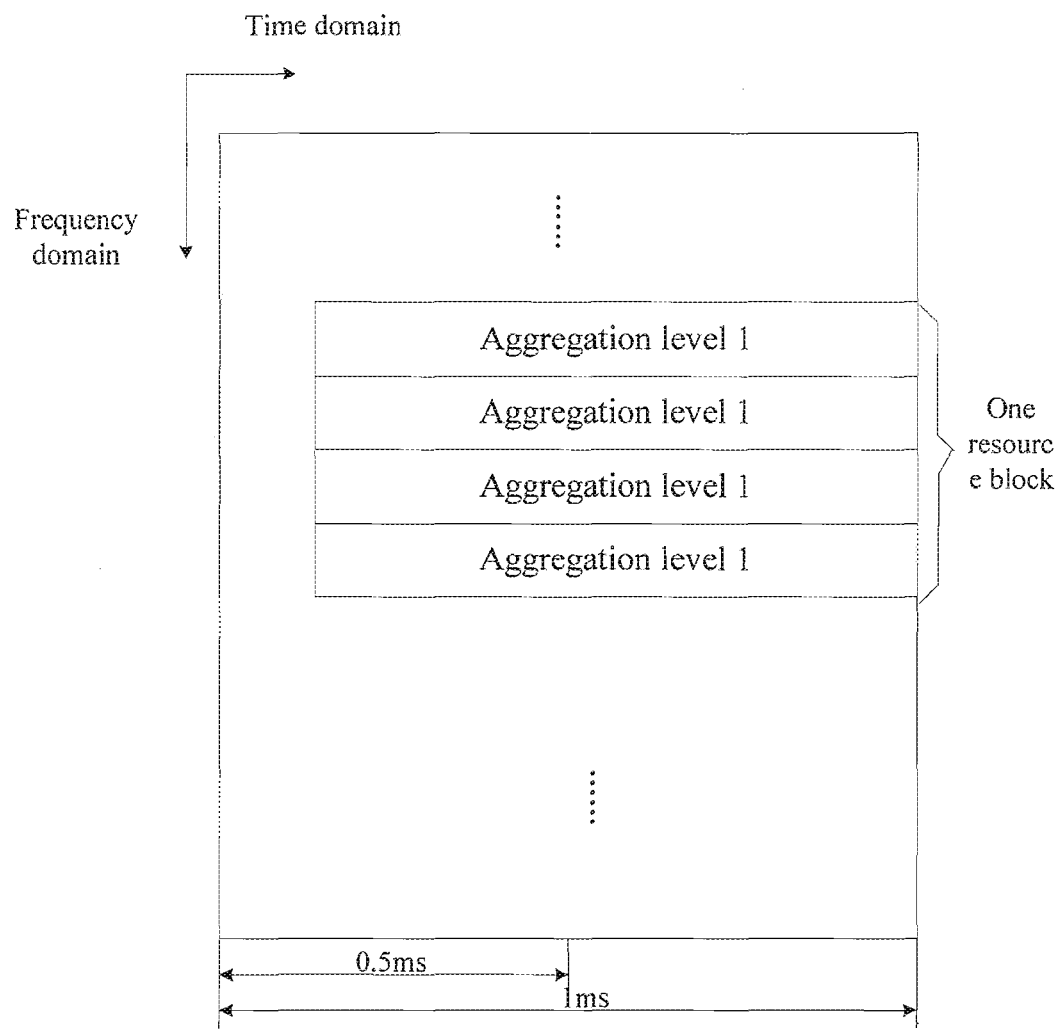
FIG. 5 is a schematic diagram that PRB pairs are capable of carrying 4 resources corresponding to aggregation level 1 according to preferred embodiment I of the present disclosure.

FIG. 5 is a schematic diagram that PRB pairs are capable of carrying 4 resources corresponding to aggregation level 1 according to preferred embodiment I of the present disclosure. As shown in FIG. 5, the ePDCCH comprises one or more of the following aggregation levels, and according to the aggregation levels of a physical downlink control channel, the ePDCCH is mapped onto M PRB pairs.

Method 1-1

Figure 6:
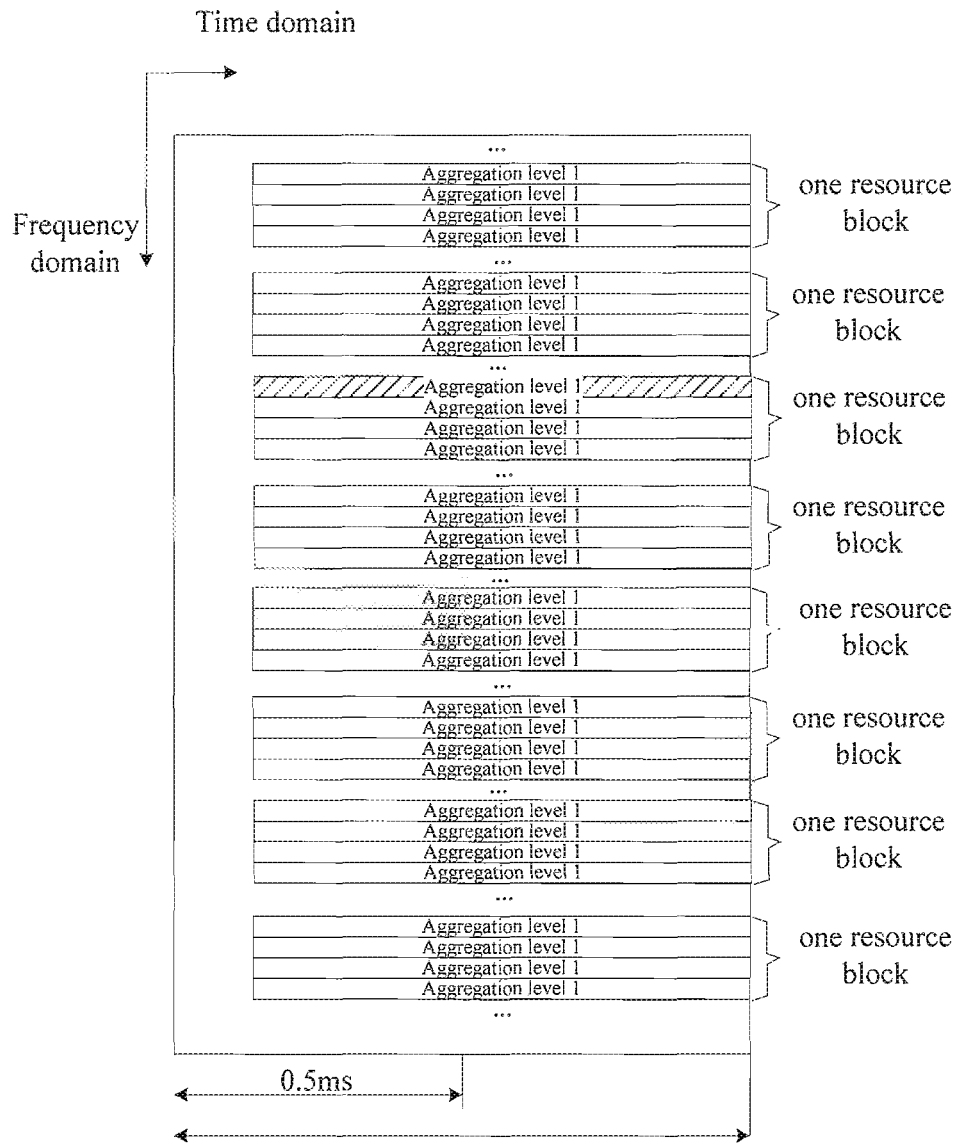
FIG. 6 is a schematic diagram of aggregation level 1 mapping of method 1-1 according to preferred embodiment I of the present disclosure.
Figure 7:
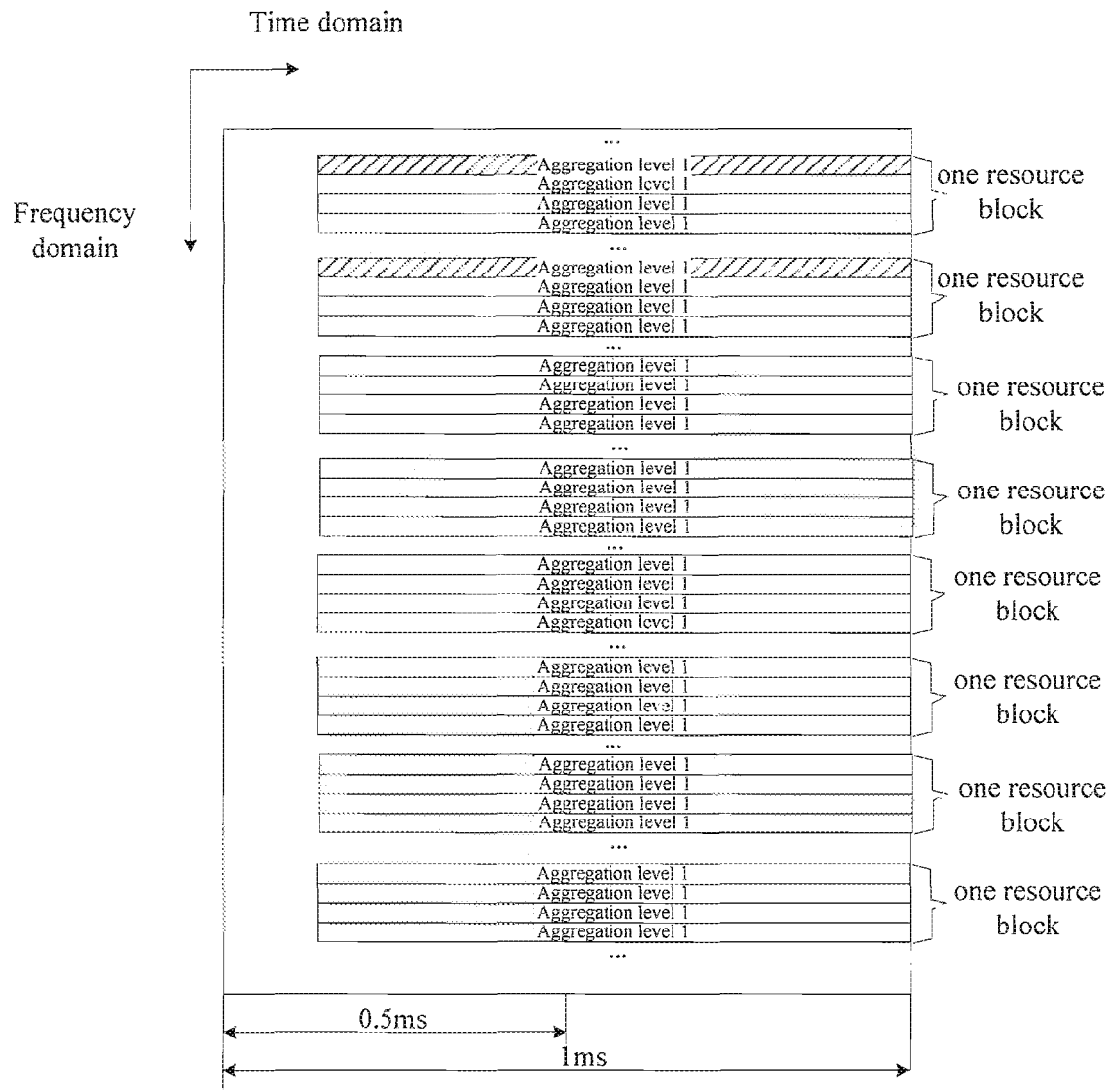
FIG. 7 is a schematic diagram of aggregation level 2 mapping of method 1-1 according to preferred embodiment I of the present disclosure.
Figure 8:
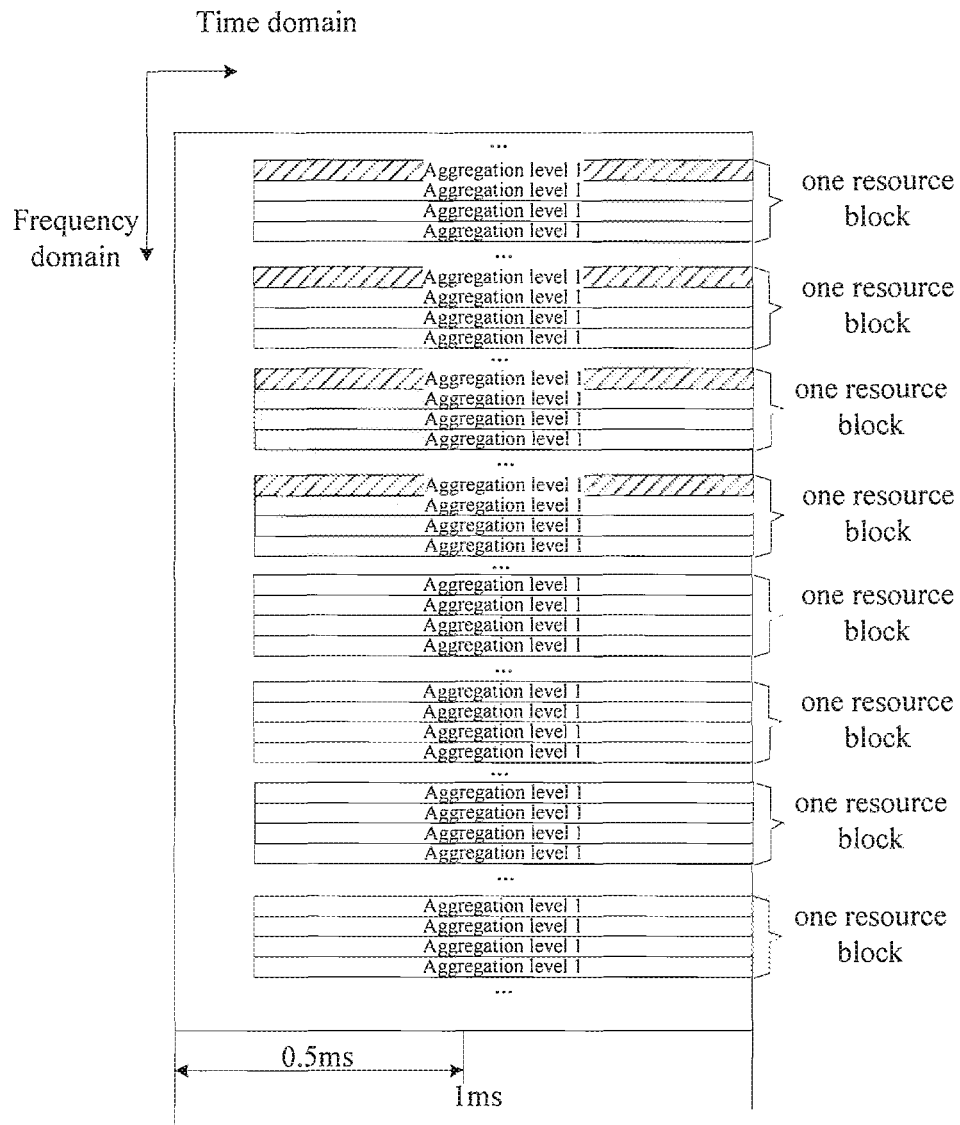
FIG. 8 is a schematic diagram of aggregation level 4 mapping of method 1-1 according to preferred embodiment I of the present disclosure.
Figure 9:
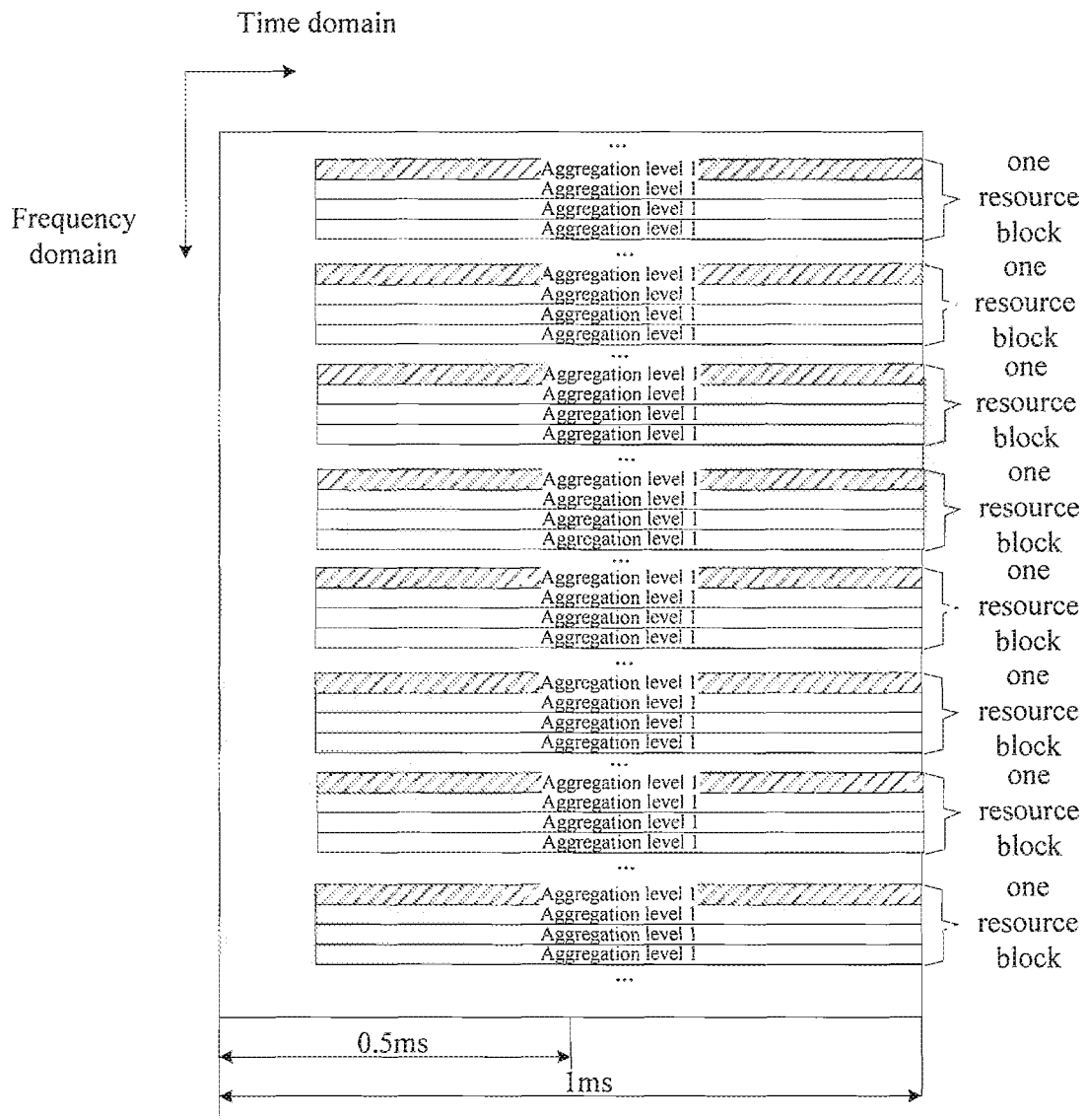
FIG. 9 is a schematic diagram of aggregation level 8 mapping of method 2-1 according to preferred embodiment I of the present disclosure.

FIG. 6 is a schematic diagram of aggregation level 1 mapping of method 1-1 according to preferred embodiment I of the present disclosure. As shown in FIG. 6, the aggregation level is 1, and it is mapped onto 1 PRB pair. FIG. 7 is a schematic diagram of aggregation level 2 mapping of method 1-1 according to preferred embodiment I of the present disclosure. As shown in FIG. 7, the aggregation level is 2, and it is mapped onto 2 PRB pairs. FIG. 8 is a schematic diagram of aggregation level 4 mapping of method 1-1 according to preferred embodiment I of the present disclosure. As shown in FIG. 8, the aggregation level is 4, and it is mapped onto 4 PRB pairs. FIG. 9 is a schematic diagram of aggregation level 8 mapping of method 1-1 according to preferred embodiment I of the present disclosure. As shown in FIG. 9, the aggregation level is 8, and it is mapped onto 8 PRB pairs.

Method 1-2

Figure 10:
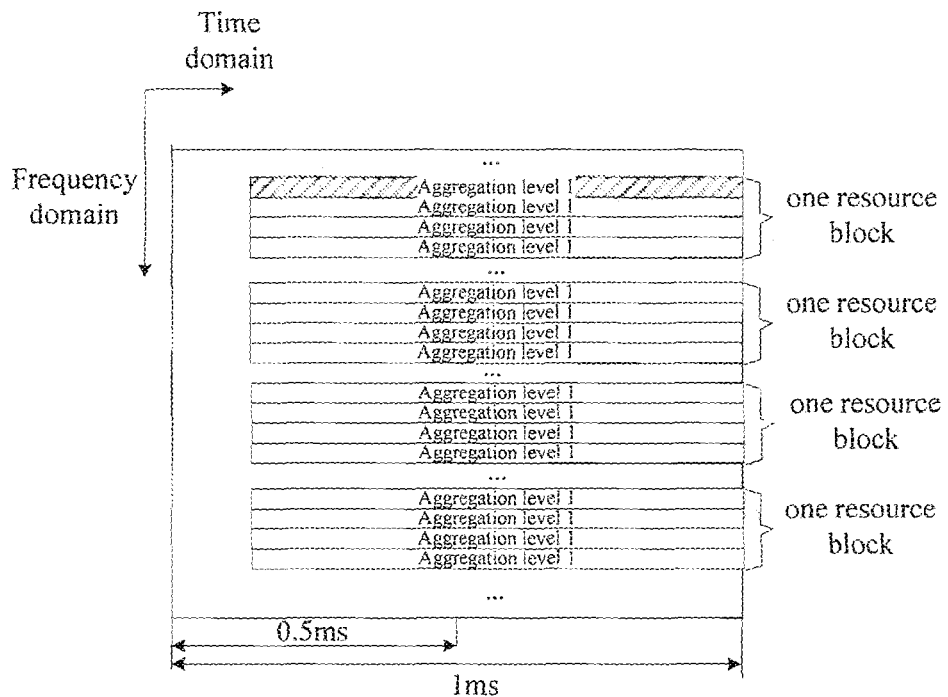
FIG. 10 is a schematic diagram of aggregation level 1 mapping of method 1-2 according to preferred embodiment I of the present disclosure.
Figure 11:
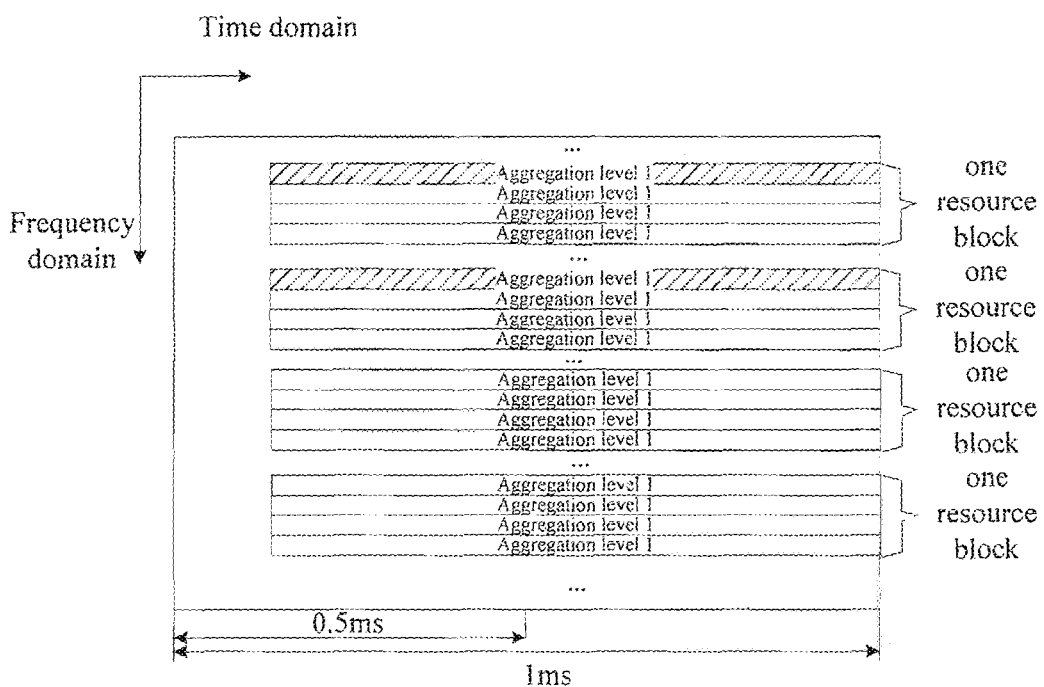
FIG. 11 is a schematic diagram of aggregation level 2 mapping of method 1-2 according to preferred embodiment I of the present disclosure.
Figure 12:
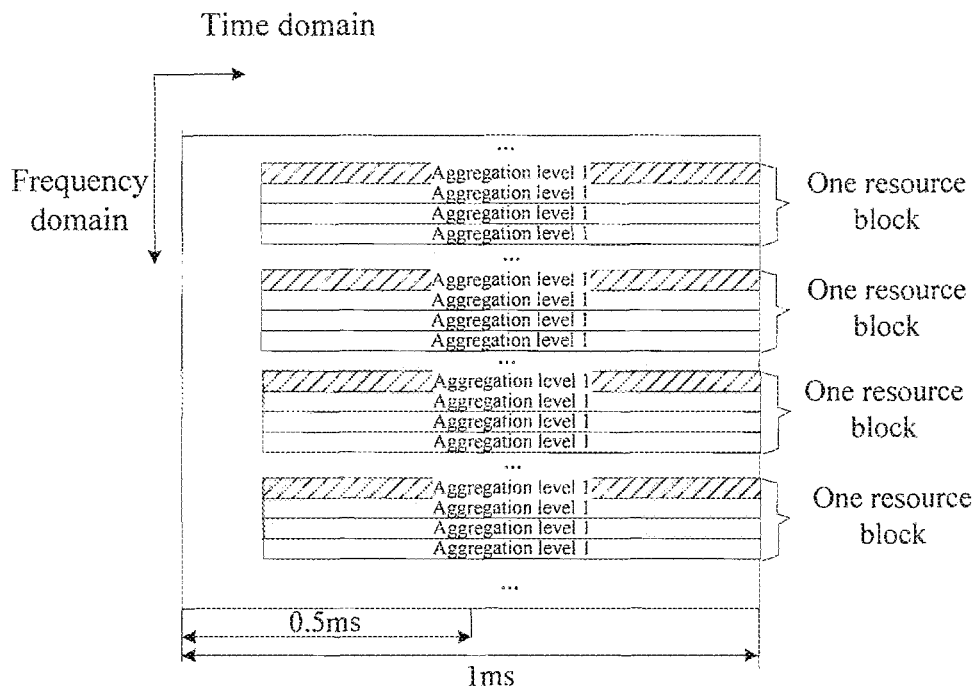
FIG. 12 is a schematic diagram of aggregation level 4 mapping of method 1-2 according to preferred embodiment I of the present disclosure.
Figure 13:
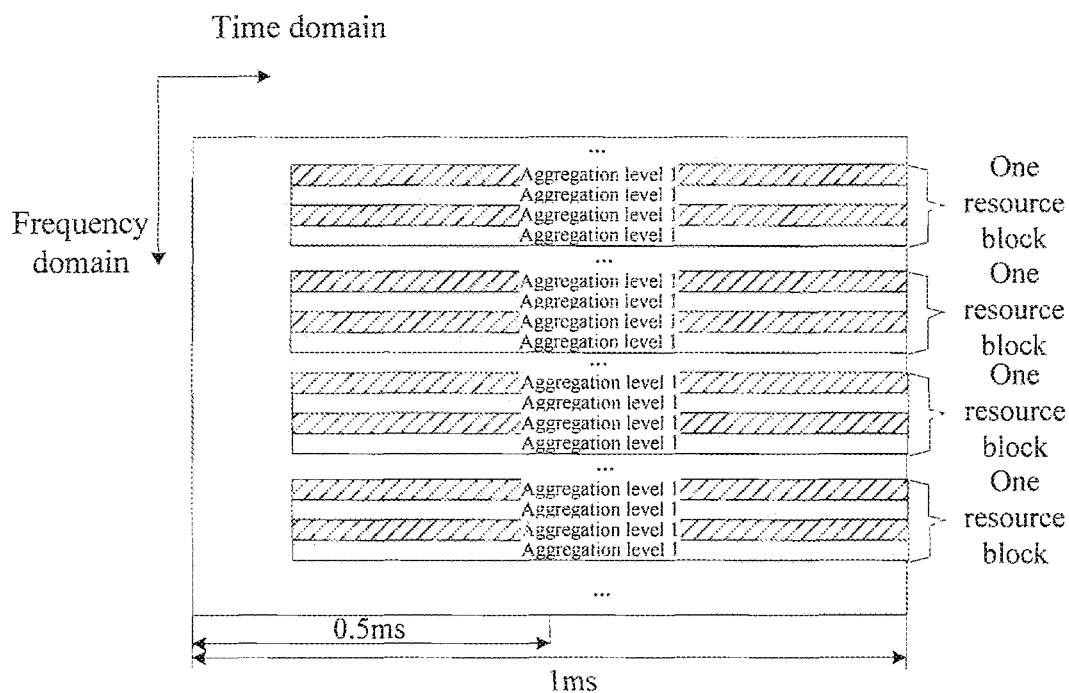
FIG. 13 is a schematic diagram of aggregation level 8 mapping of method 1-2 according to preferred embodiment I of the present disclosure.

FIG. 10 is a schematic diagram of aggregation level 1 mapping of method 1-2 according to preferred embodiment I of the present disclosure. As shown in FIG. 10, the aggregation level is 1, and it is mapped onto 1 PRB pair. FIG. 11 is a schematic diagram of aggregation level 2 mapping of method 1-2 according to preferred embodiment I of the present disclosure. As shown in FIG. 11, the aggregation level is 2, and it is mapped onto 2 PRB pairs. FIG. 12 is a schematic diagram of aggregation level 4 mapping of method 1-2 according to preferred embodiment I of the present disclosure. As shown in FIG. 12, the aggregation level is 4, and it is mapped onto 4 PRB pairs. FIG. 13 is a schematic diagram of aggregation level 8 mapping of method 1-2 according to preferred embodiment I of the present disclosure. As shown in FIG. 13, the aggregation level is 8, and it is mapped onto 4 PRB pairs.

Method 1-3

Figure 14:
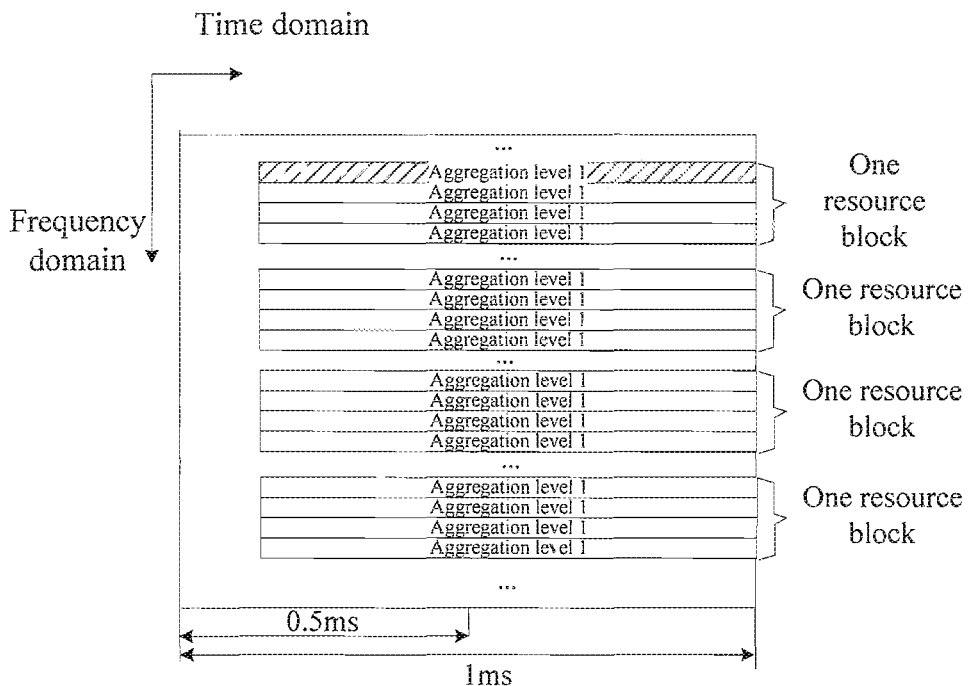
FIG. 14 is a schematic diagram of aggregation level 1 mapping of method 1-3 according to preferred embodiment 1 of the present disclosure.
Figure 15:
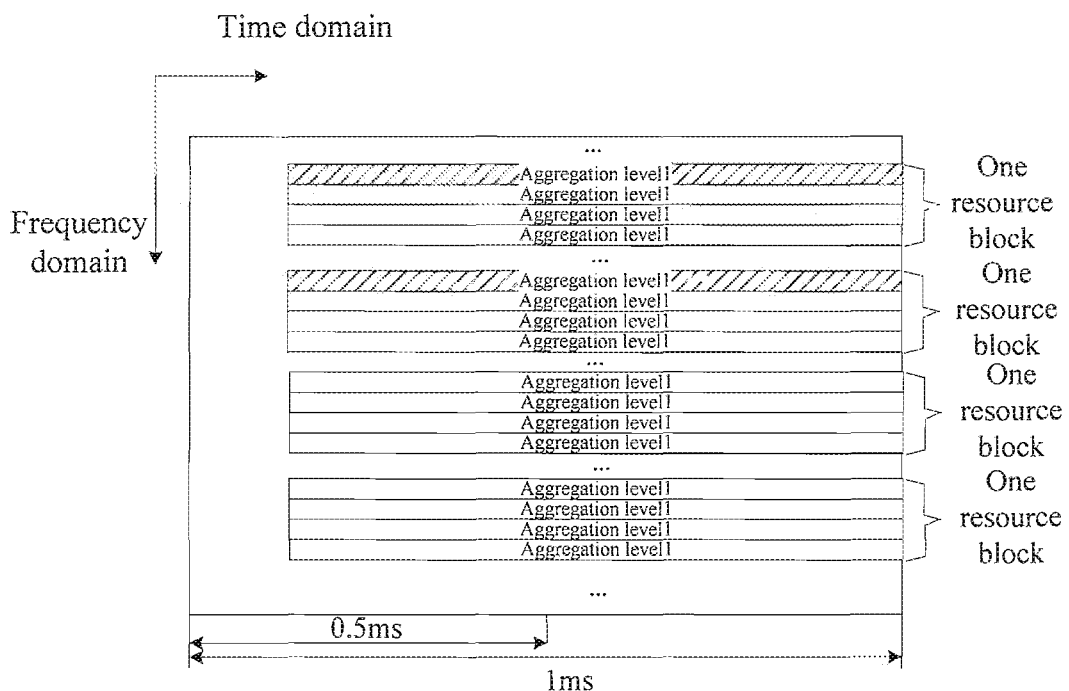
FIG. 15 is a schematic diagram of aggregation level 2 mapping of method 1-3 according to preferred embodiment I of the present disclosure.
Figure 16:
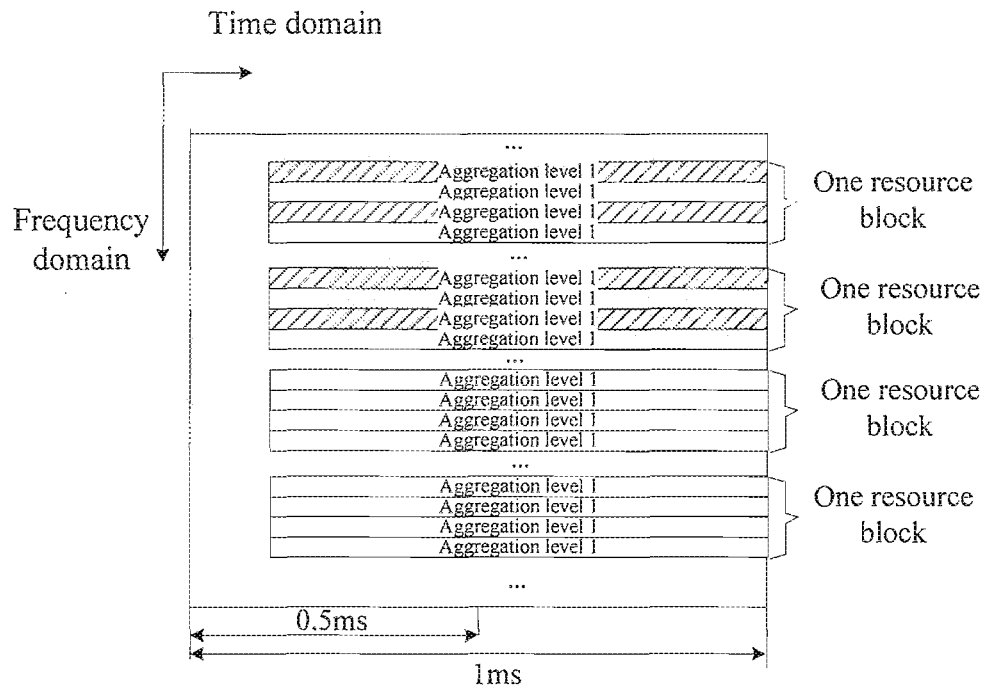
FIG. 16 is a schematic diagram of aggregation level 4 mapping of method 1-3 according to preferred embodiment I of the present disclosure.
Figure 17:
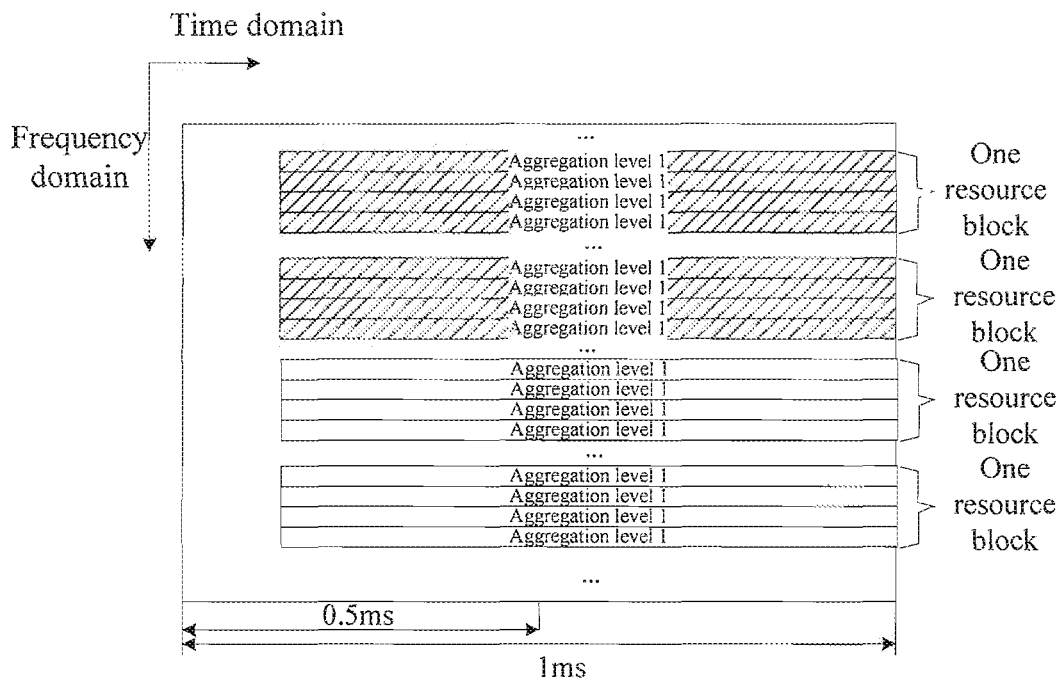
FIG. 17 is a schematic diagram of aggregation level 8 mapping of method 1-3 according to preferred embodiment I of the present disclosure.

FIG. 14 is a schematic diagram of aggregation level 1 mapping of method 1-3 according to preferred embodiment I of the present disclosure. As shown in FIG. 14, the aggregation level is 1, and it is mapped onto 1 PRB pair. FIG. 15 is a schematic diagram of aggregation level 2 mapping of method 1-3 according to preferred embodiment I of the present disclosure. As shown in FIG. 15, the aggregation level is 2, and it is mapped onto 2 PRB pairs. FIG. 16 is a schematic diagram of aggregation level 4 mapping of method 1-3 according to preferred embodiment I of the present disclosure. As shown in FIG. 16, the aggregation level is 4, and it is mapped onto 2 PRB pairs. FIG. 17 is a schematic diagram of aggregation level 8 mapping of method 1-3 according to preferred embodiment I of the present disclosure. As shown in FIG. 17, the aggregation level is 8, and it is mapped onto 2 PRB pairs.

Preferred Embodiment II

Corresponding to the Above-Mentioned Method II

Figure 18:
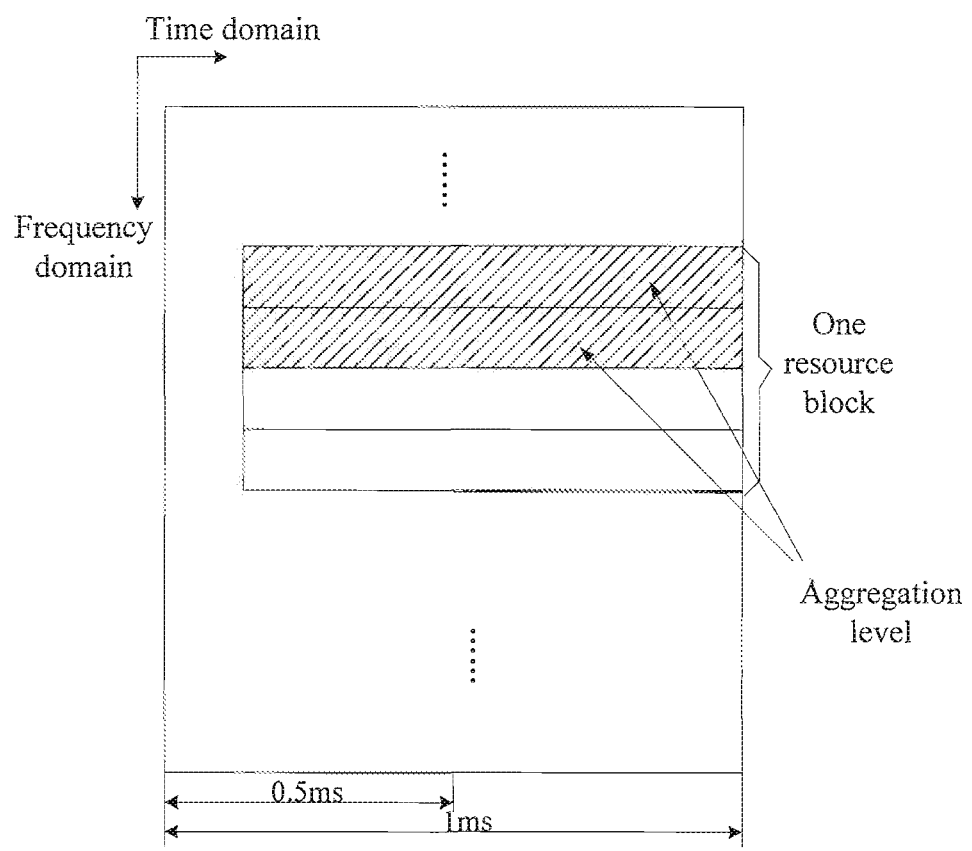
FIG. 18 is schematic diagram I that PRB pairs are capable of carrying 2 resources corresponding to aggregation level 1 according to preferred embodiment II of the present disclosure.
Figure 19:
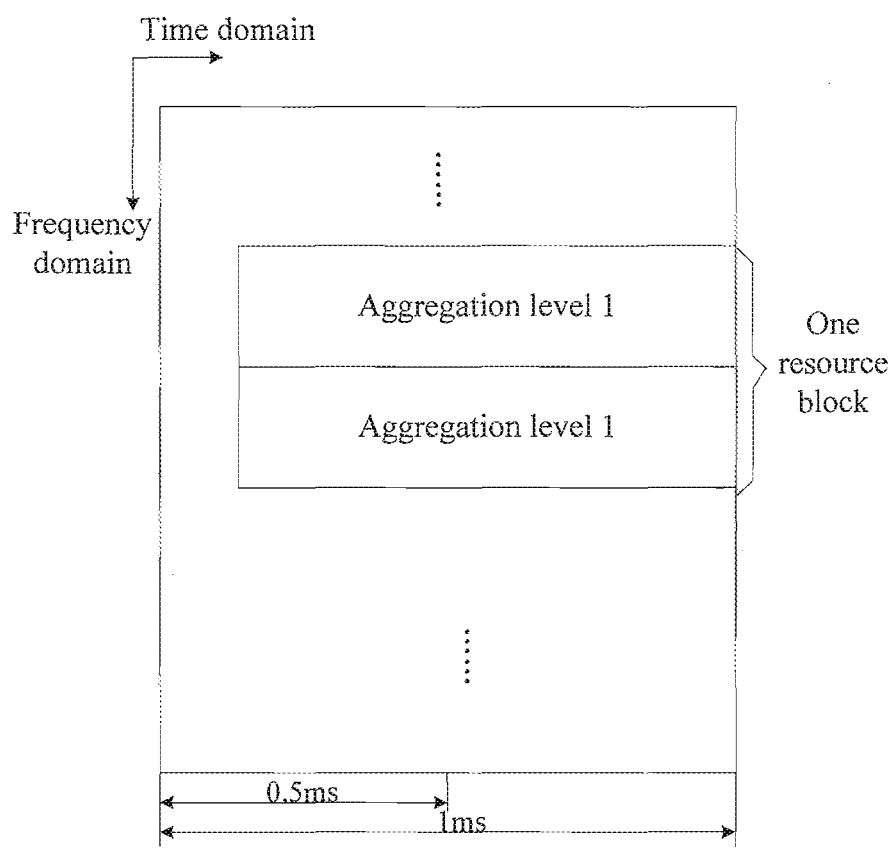
FIG. 19 is schematic diagram II that PRB pairs are capable of carrying 2 resources corresponding to aggregation level 1 according to preferred embodiment II of the present disclosure.

FIG. 18 is schematic diagram I that the PRB pairs are capable of carrying 2 resources corresponding to aggregation level 1 according to preferred embodiment II of the present disclosure, and FIG. 19 is schematic diagram II that the PRB pairs are capable of carrying 2 resources corresponding to aggregation level 1 according to preferred embodiment II of the present disclosure. As shown in FIG. 18 and FIG. 19, the ePDCCH comprises one or more of the following aggregation levels. According to the PDCCH aggregation level and/or subframe cyclic prefix type, the ePDCCH is mapped onto M PRB pairs.

Method 2-1 to method 2-3 describe the cases where the subframe cyclic prefix is Normal CP.

Method 2-1

Figure 20:
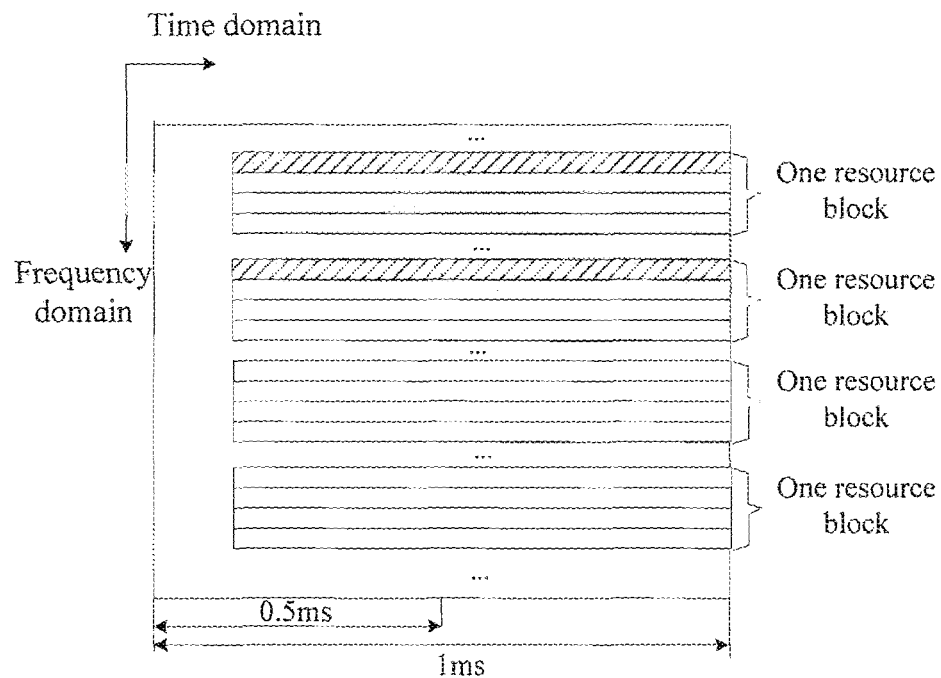
FIG. 20 is a schematic diagram of aggregation level 1 mapping of method 2-1 according to preferred embodiment II of the present disclosure.
Figure 21:
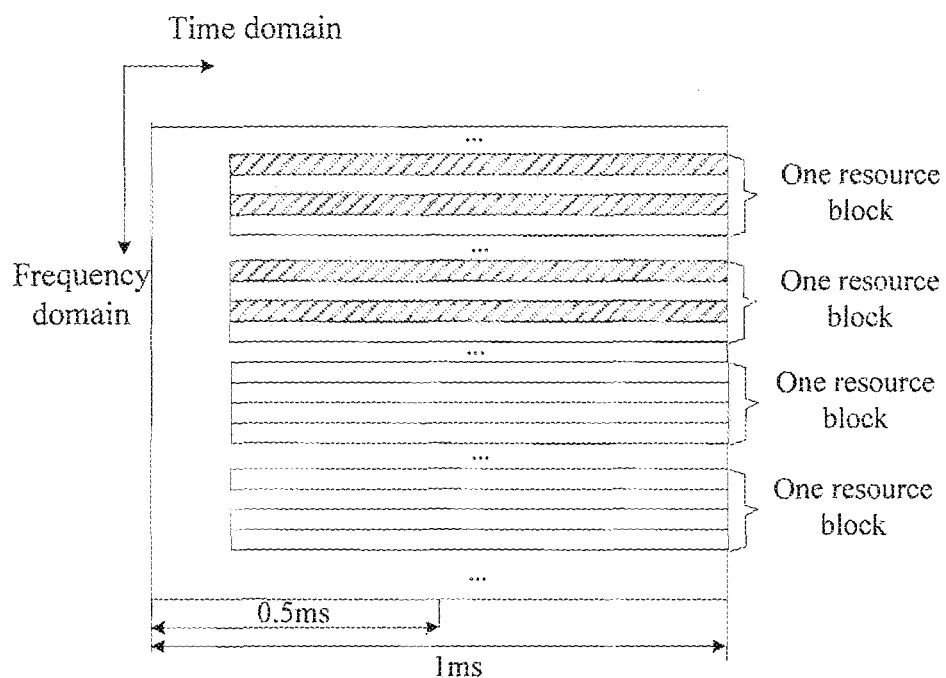
FIG. 21 is a schematic diagram of aggregation level 2 mapping of method 2-1 according to preferred embodiment II of the present disclosure.
Figure 22:
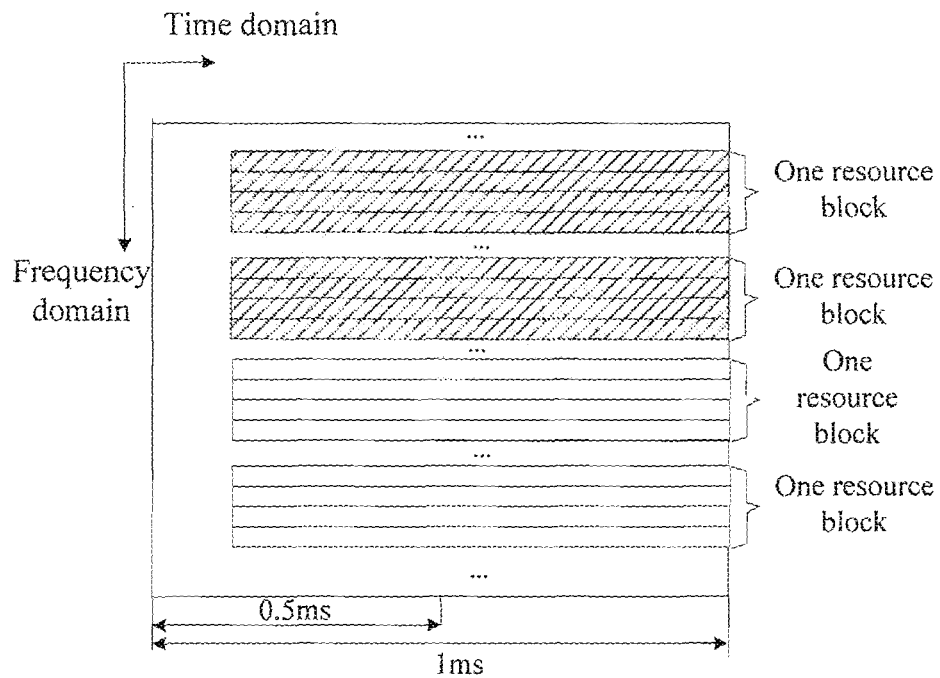
FIG. 22 is a schematic diagram of aggregation level 4 mapping of method 2-1 according to preferred embodiment II of the present disclosure.
Figure 23:
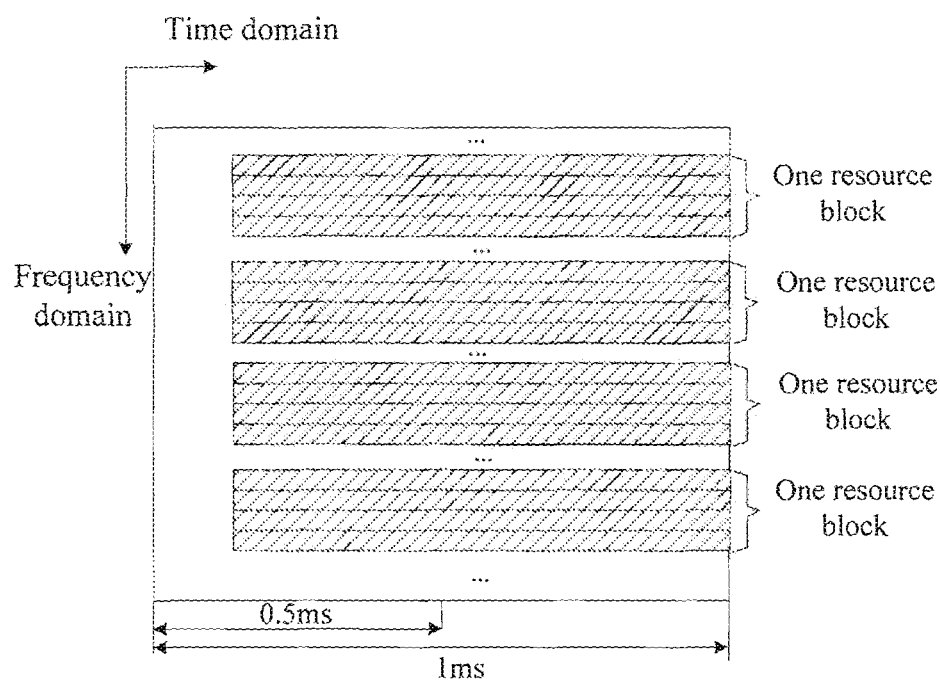
FIG. 23 is a schematic diagram of aggregation level 8 mapping of method 2-1 according to preferred embodiment II of the present disclosure.

FIG. 20 is a schematic diagram of aggregation level 1 mapping of method 2-1 according to preferred embodiment II of the present disclosure. As shown in FIG. 20, the aggregation level is 1, and it is mapped onto 2 PRBs. FIG. 21 is a schematic diagram of aggregation level 2 mapping of method 2-1 according to preferred embodiment II of the present disclosure. As shown in FIG. 21, the aggregation level is 2, and it is mapped onto 2 PRBs. FIG. 22 is a schematic diagram of aggregation level 4 mapping of method 2-1 according to preferred embodiment II of the present disclosure. As shown in FIG. 22, the aggregation level is 4, and it is mapped onto 2 PRBs. FIG. 23 is a schematic diagram of aggregation level 8 mapping of method 2-1 according to preferred embodiment II of the present disclosure. As shown in FIG. 23, the aggregation level is 8, and it is mapped onto 4 PRBs.

Method 2-2

Figure 24:
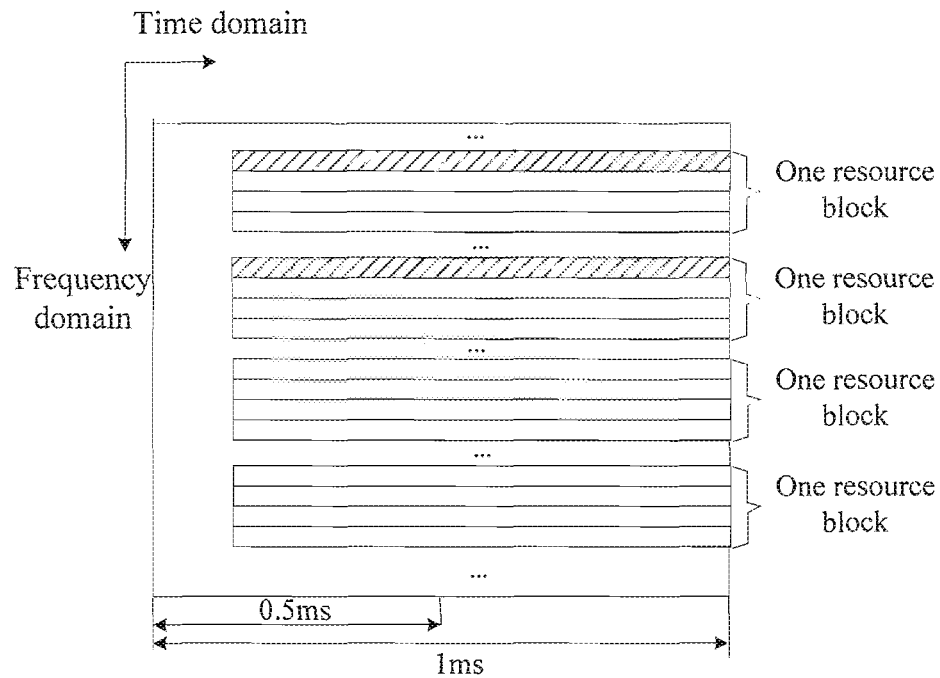
FIG. 24 is a schematic diagram of aggregation level 1 mapping of method 2-2 according to preferred embodiment II of the present disclosure.
Figure 25:
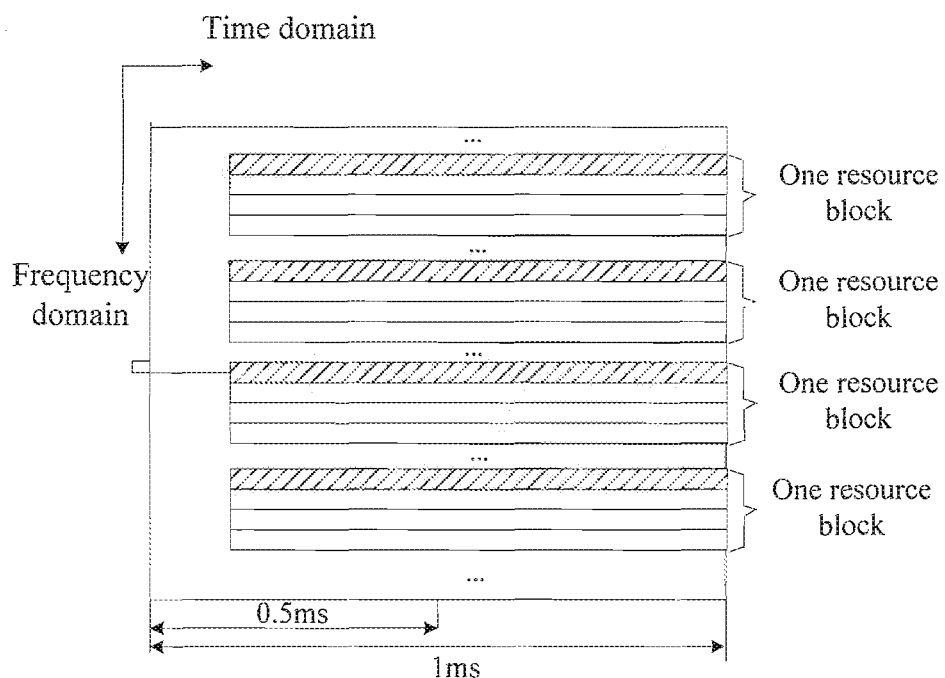
FIG. 25 is a schematic diagram of aggregation level 2 mapping of method 2-2 according to preferred embodiment II of the present disclosure.
Figure 26:
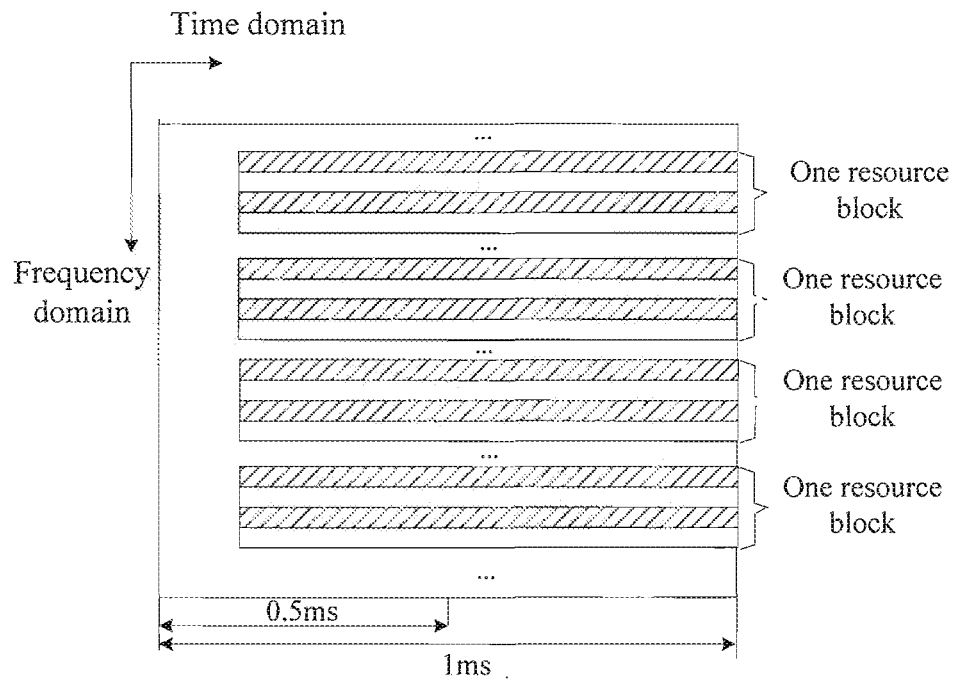
FIG. 26 is a schematic diagram of aggregation level 4 mapping of method 2-2 according to preferred embodiment I of the present disclosure.
Figure 27:
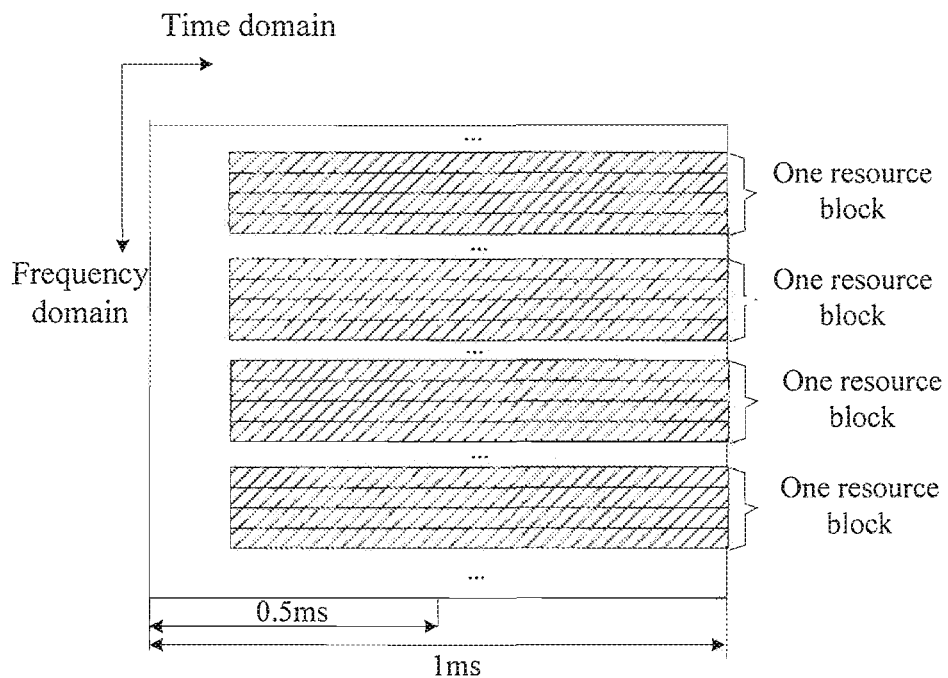
FIG. 27 is a schematic diagram of aggregation level 8 mapping of method 2-2 according to preferred embodiment II of the present disclosure.

FIG. 24 is a schematic diagram of aggregation level 1 mapping of method 2-2 according to preferred embodiment II of the present disclosure. As shown in FIG. 24, the aggregation level is 1, and it is mapped onto 2 PRBs. As shown in FIG. 25, the aggregation level is 2, and it is mapped onto 4 PRBs. As shown in FIG. 26, the aggregation level is 4, and it is mapped onto 4 PRBs. As shown in FIG. 27, the aggregation level is 8, and it is mapped onto 4 PRBs.

Method 2-3

Figure 28:
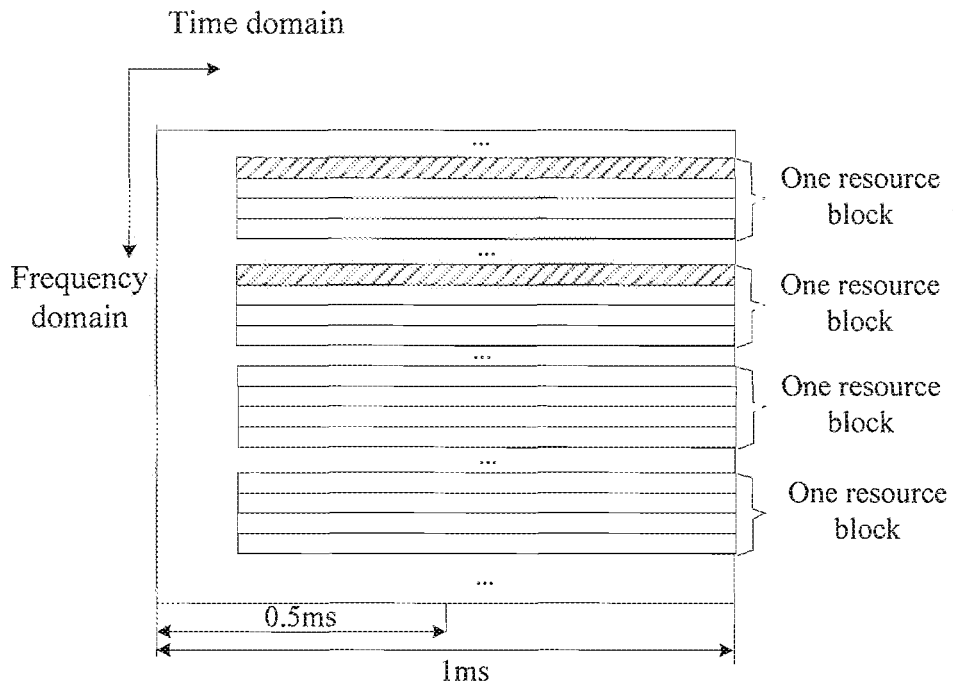
FIG. 28 is a schematic diagram of aggregation level 1 mapping of method 2-3 according to preferred embodiment II of the present disclosure.
Figure 29:
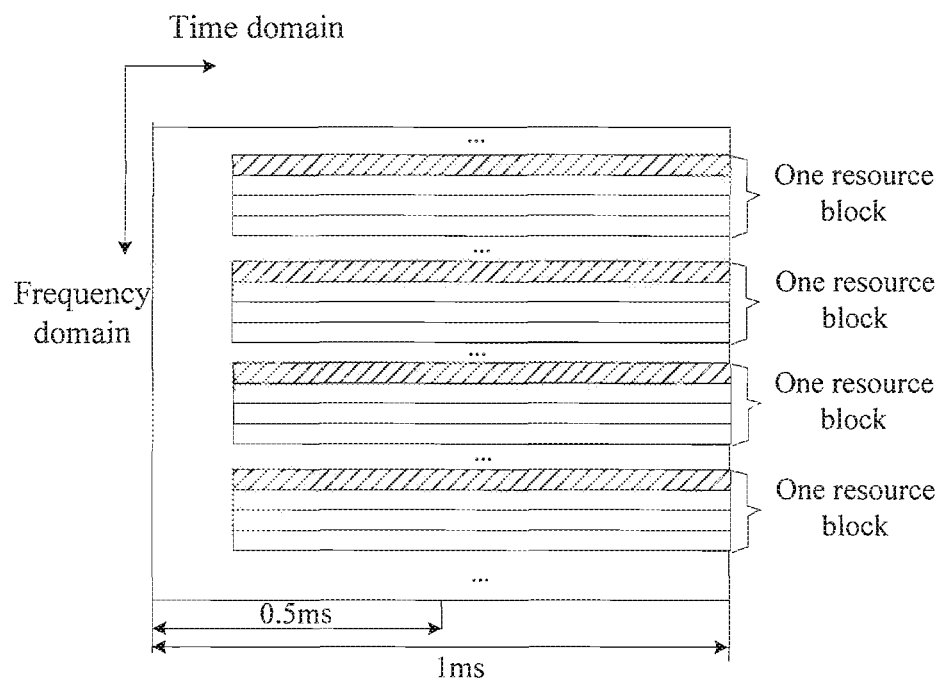
FIG. 29 is a schematic diagram of aggregation level 2 mapping of method 2-3 according to preferred embodiment II of the present disclosure.
Figure 30:
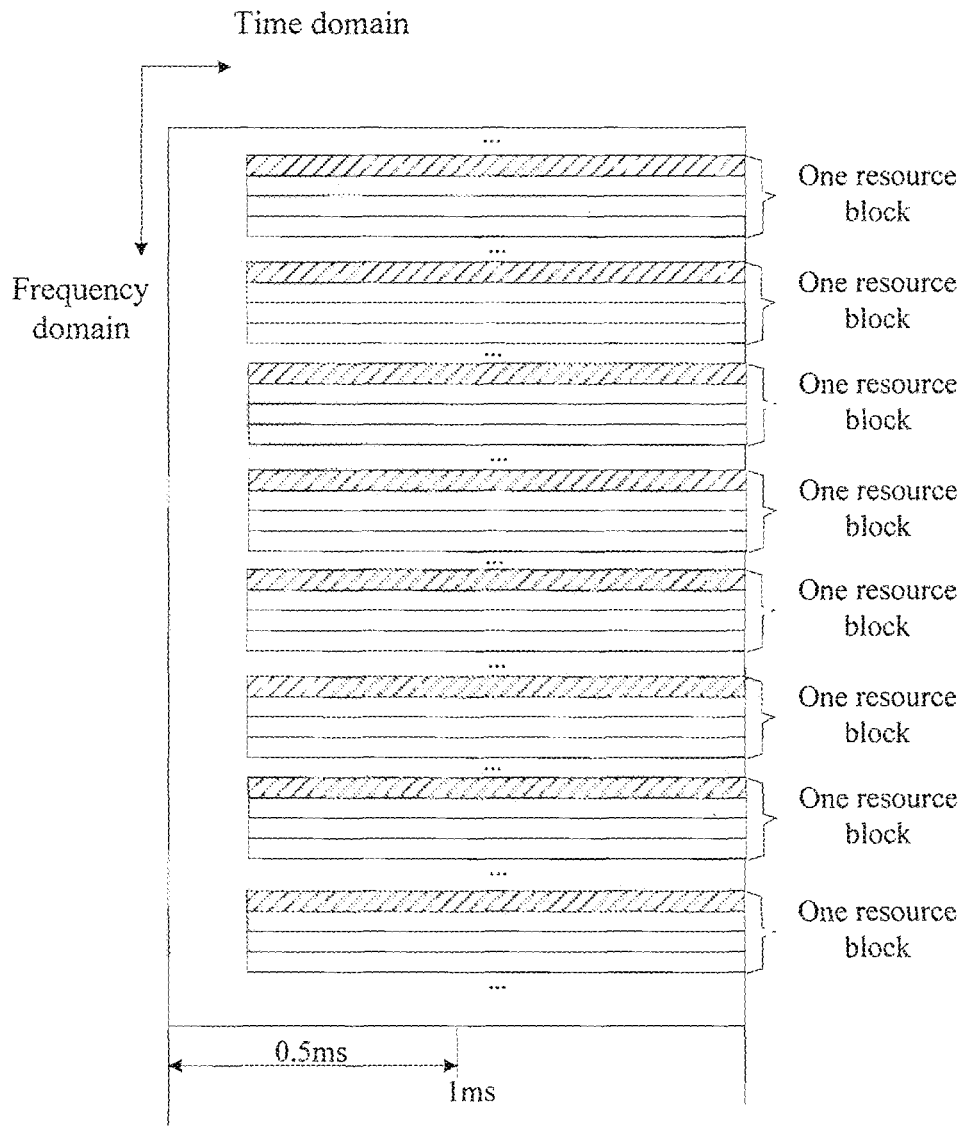
FIG. 30 is a schematic diagram of aggregation level 4 mapping of method 2-3 according to preferred embodiment II of the present disclosure.
Figure 31:
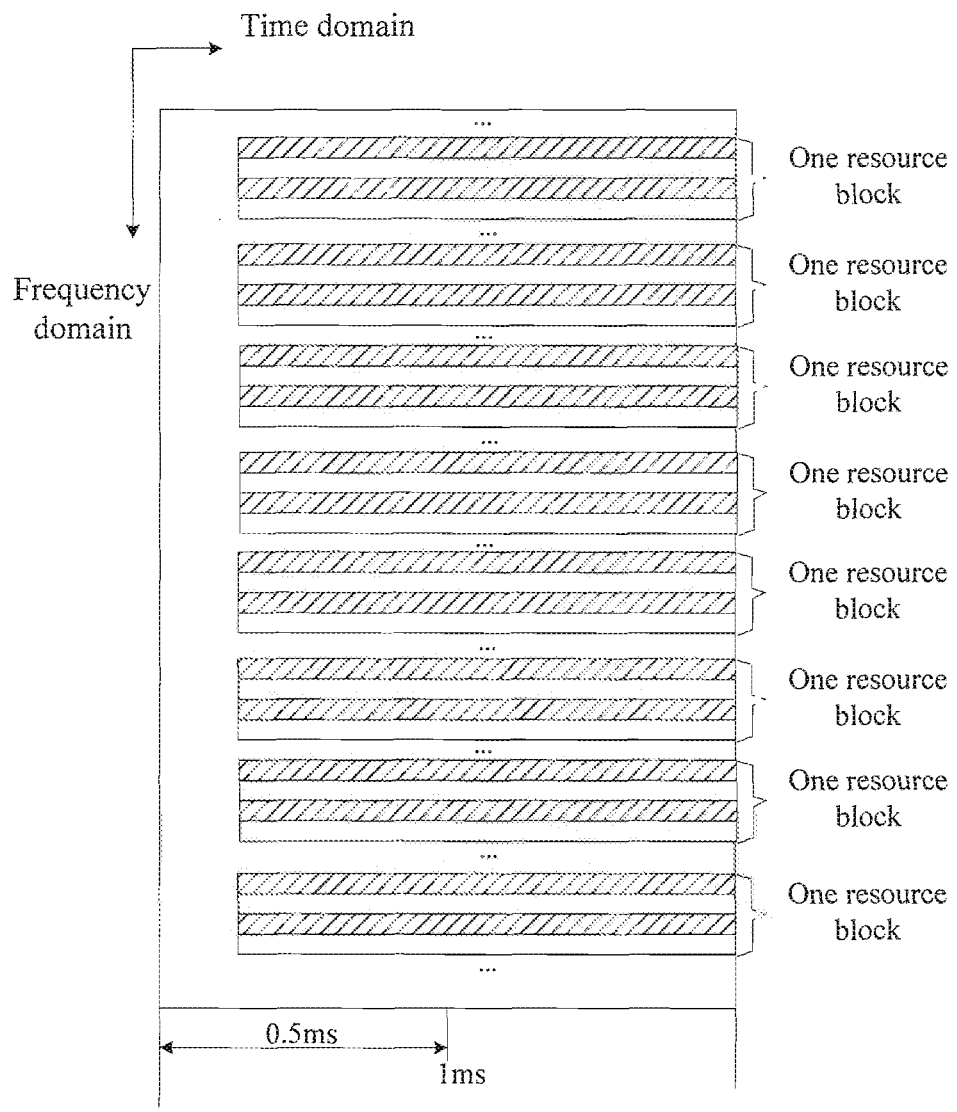
FIG. 31 is a schematic diagram of aggregation level 8 mapping of method 2-3 according to preferred embodiment II of the present disclosure.

FIG. 28 is a schematic diagram of aggregation level 1 mapping of method 2-3 according to preferred embodiment II of the present disclosure. As shown in FIG. 28, the aggregation level is 1, and it is mapped onto 2 PRBs. As shown in FIG. 29, the aggregation level is 2, and it is mapped onto 4 PRBs. As shown in FIG. 30, the aggregation level is 4, and it is mapped onto 8 PRBs. As shown in FIG. 31, the aggregation level is 8, and it is mapped onto 8 PRBs.

Method 2-4 to method 2-5 describe the cases where the subframe cyclic prefix is Extended CP.

Method 2-4

Figure 32:
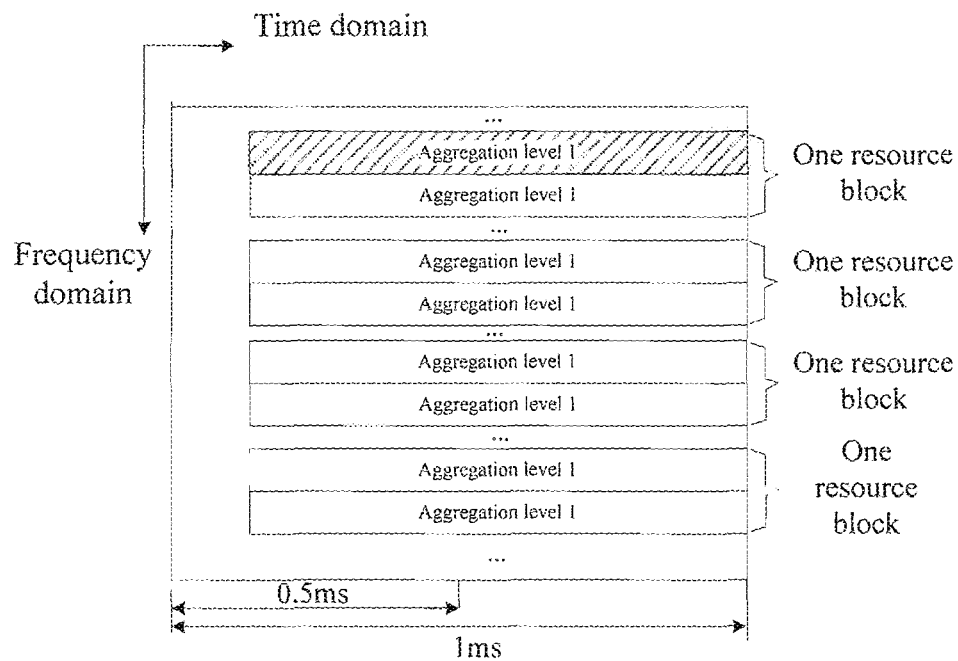
FIG. 32 is a schematic diagram of aggregation level 1 mapping of method 2-4 according to preferred embodiment II of the present disclosure.
Figure 33:
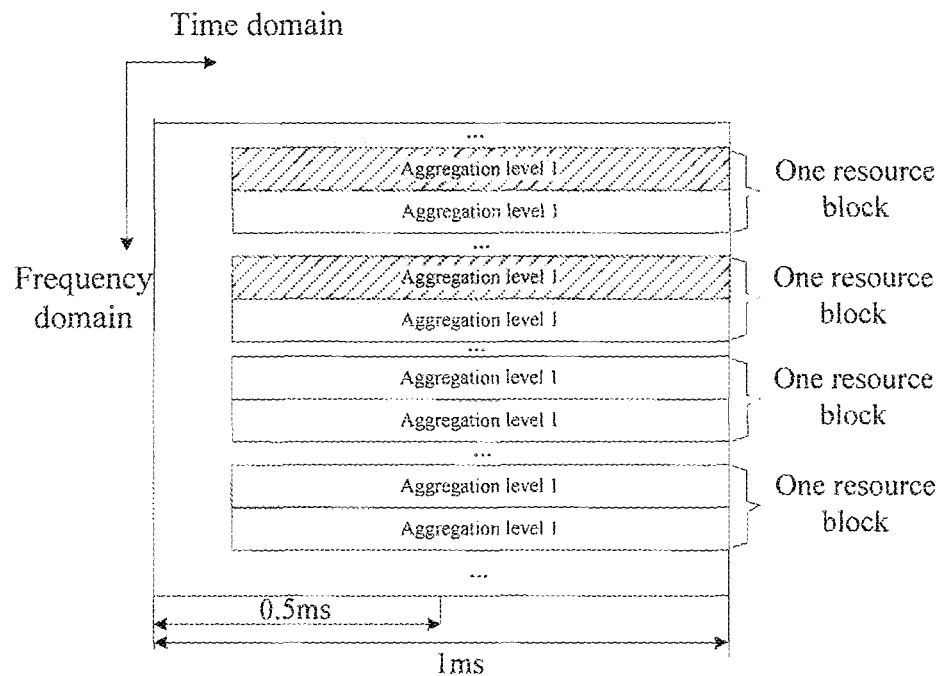
FIG. 33 is a schematic diagram of aggregation level 2 mapping of method 2-4 according to preferred embodiment II of the present disclosure.
Figure 34:
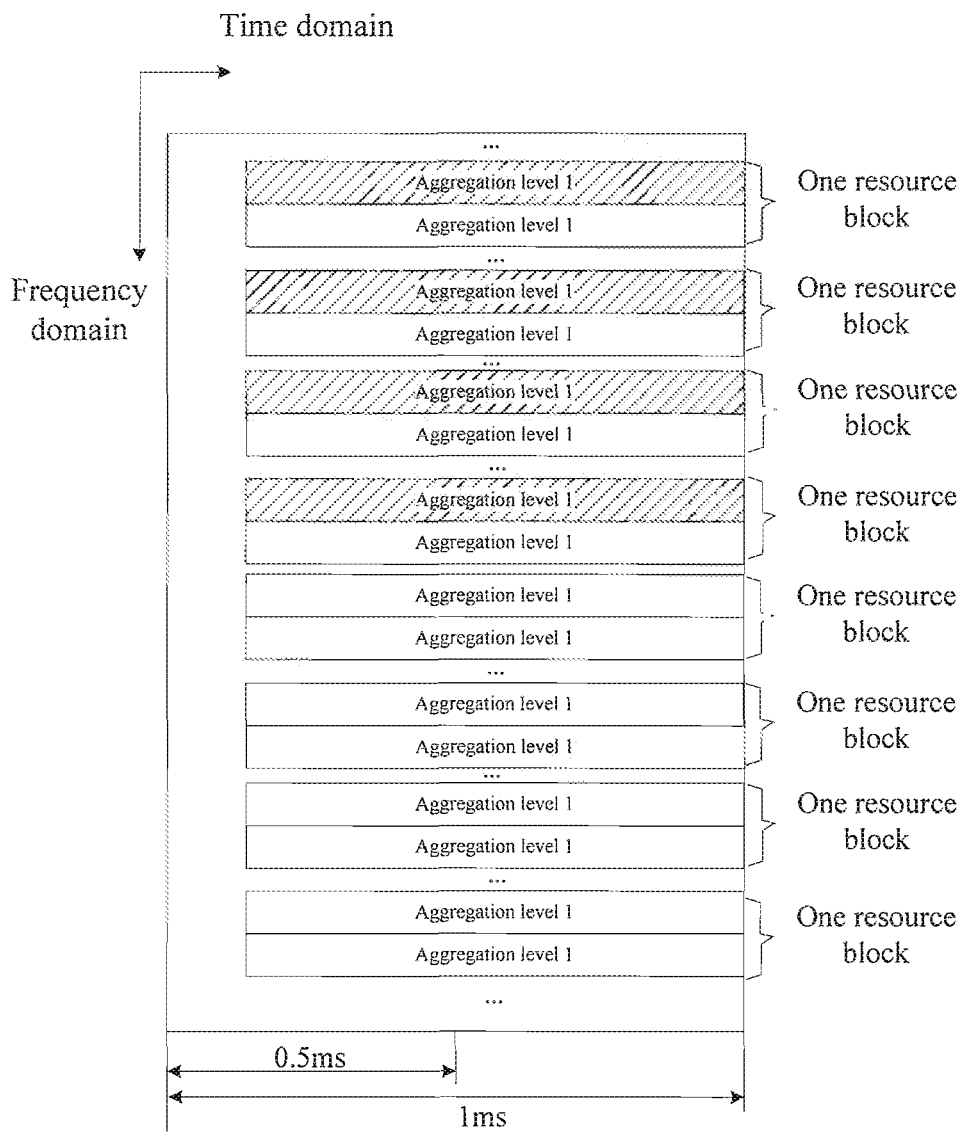
FIG. 34 is a schematic diagram of aggregation level 4 mapping of method 2-4 according to preferred embodiment II of the present disclosure.
Figure 35:
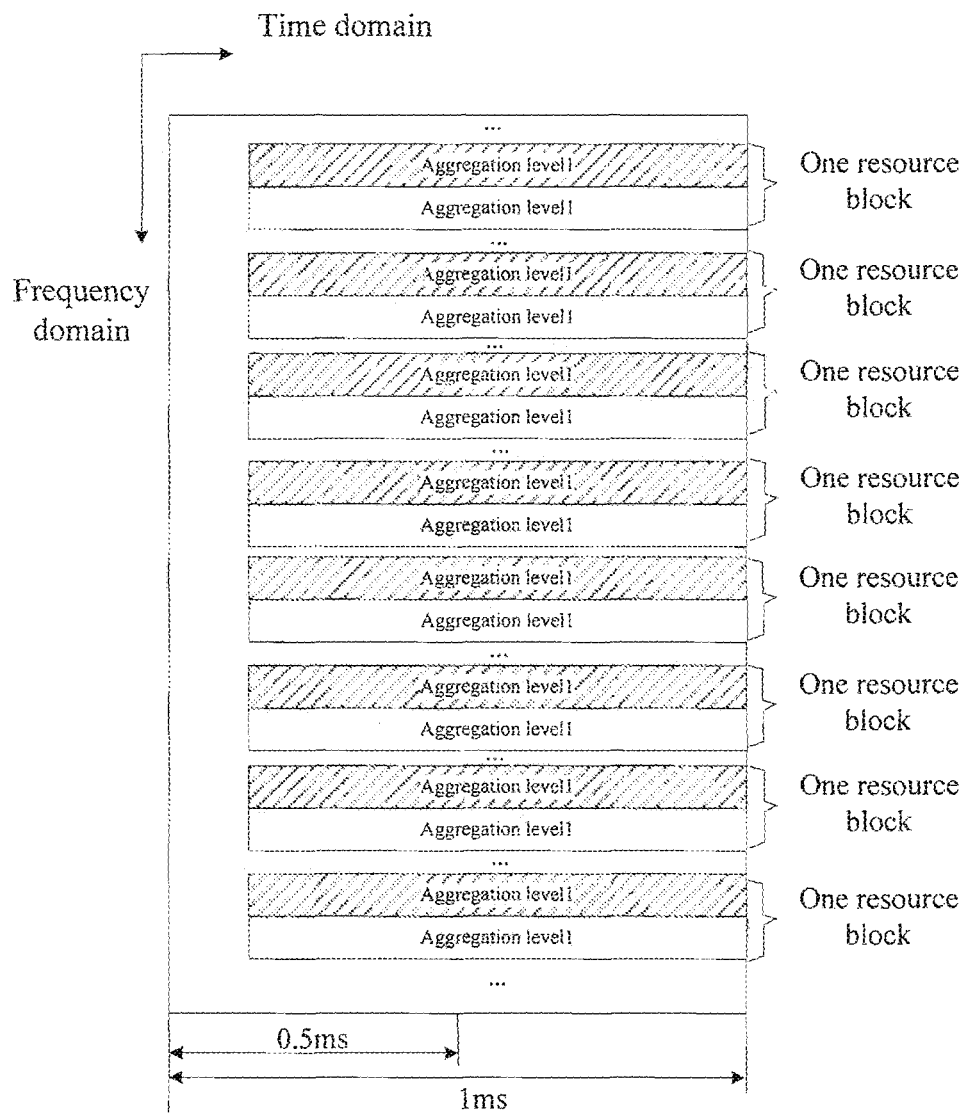
FIG. 35 is a schematic diagram of aggregation level 8 mapping of method 2-4 according to preferred embodiment II of the present disclosure.

FIG. 32 is a schematic diagram of aggregation level 1 mapping of method 2-4 according to preferred embodiment II of the present disclosure. As shown in FIG. 32, the aggregation level is 1, and it is mapped onto 1 PRB. As shown in FIG. 33, the aggregation level is 2, and it is mapped onto 2 PRBs. As shown in FIG. 34, the aggregation level is 4, and it is mapped onto 4 PRBs. As shown in FIG. 35, the aggregation level is 8, and it is mapped onto 8 PRBs.

Method 2-5

Figure 36:
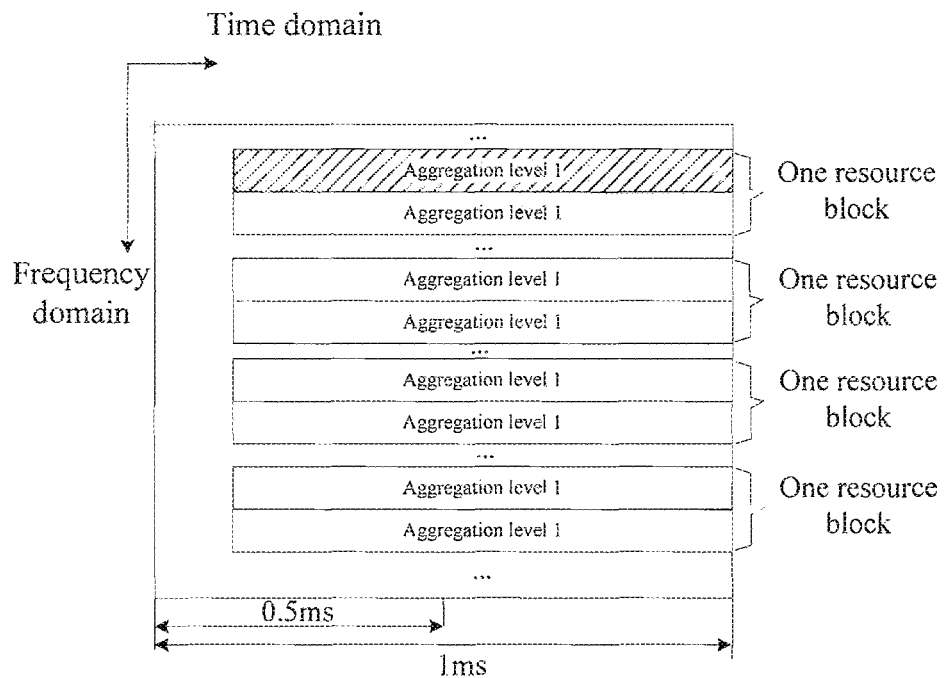
FIG. 36 is a schematic diagram of aggregation level 1 mapping of method 2-5 according to preferred embodiment II of the present disclosure.
Figure 37:
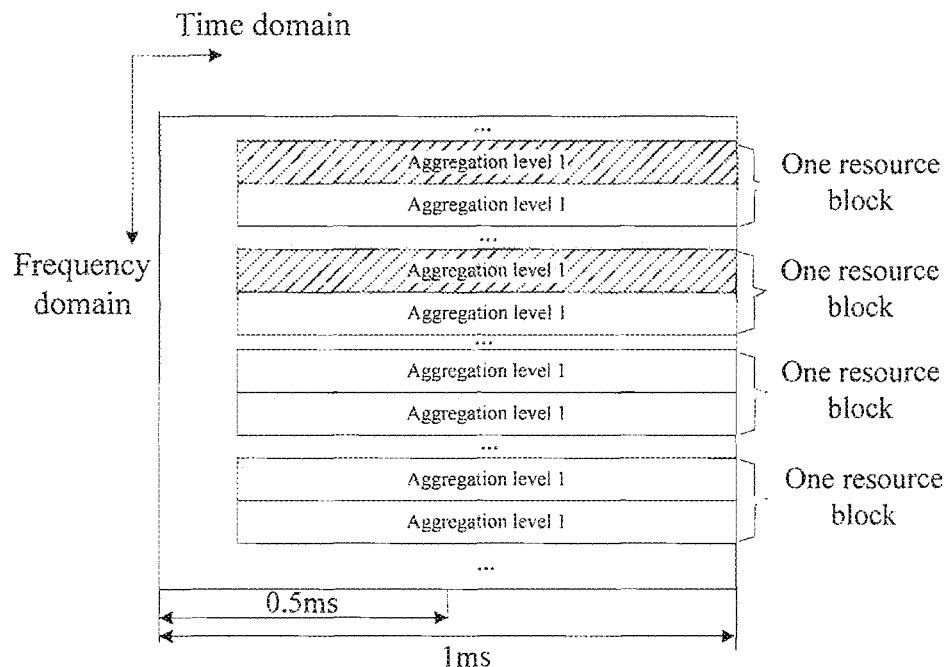
FIG. 37 is a schematic diagram of aggregation level 2 mapping of method 2-5 according to preferred embodiment II of the present disclosure.
Figure 38:
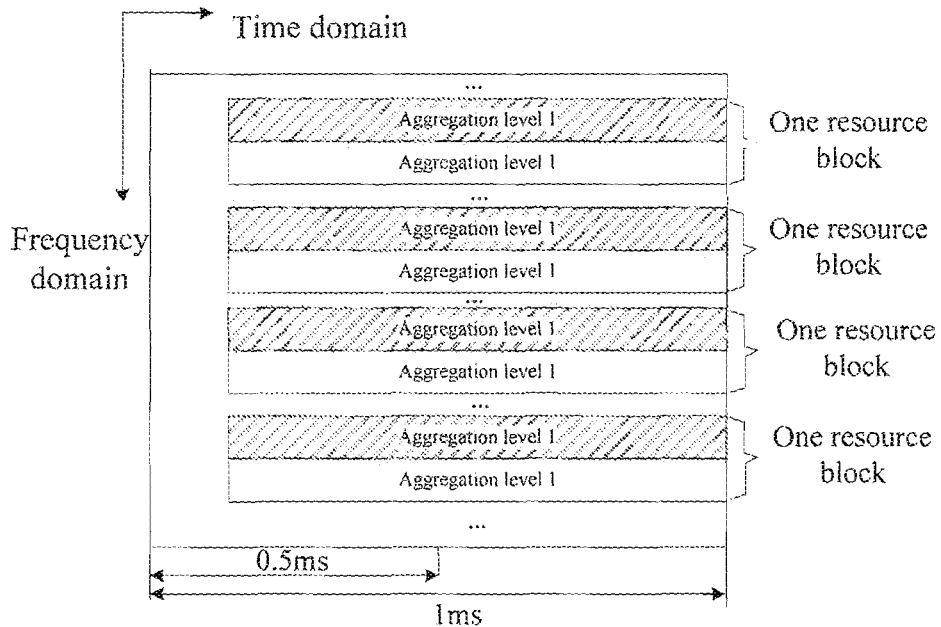
FIG. 38 is a schematic diagram of aggregation level 4 mapping of method 2-5 according to preferred embodiment II of the present disclosure.
Figure 39:
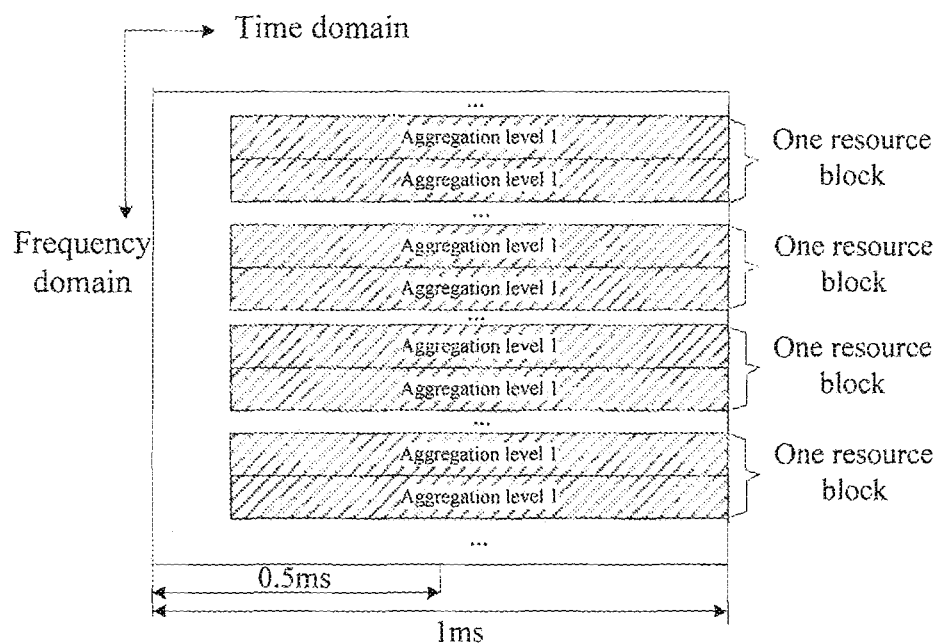
FIG. 39 is a schematic diagram of aggregation level 8 mapping of method 2-5 according to preferred embodiment II of the present disclosure.

FIG. 36 is a schematic diagram of aggregation level 1 mapping of method 2-5 according to preferred embodiment II of the present disclosure. As shown in FIG. 36, the aggregation level is 1, and it is mapped onto 1 PRB. As shown in FIG. 37, the aggregation level is 2, and it is mapped onto 2 PRBs. As shown in FIG. 38, the aggregation level is 4, and it is mapped onto 2 PRBs. As shown in FIG. 39, the aggregation level is 8, and it is mapped onto 4 PRBs.

Preferred Embodiment III

Corresponding to the Above-Mentioned Method III

Figure 40:
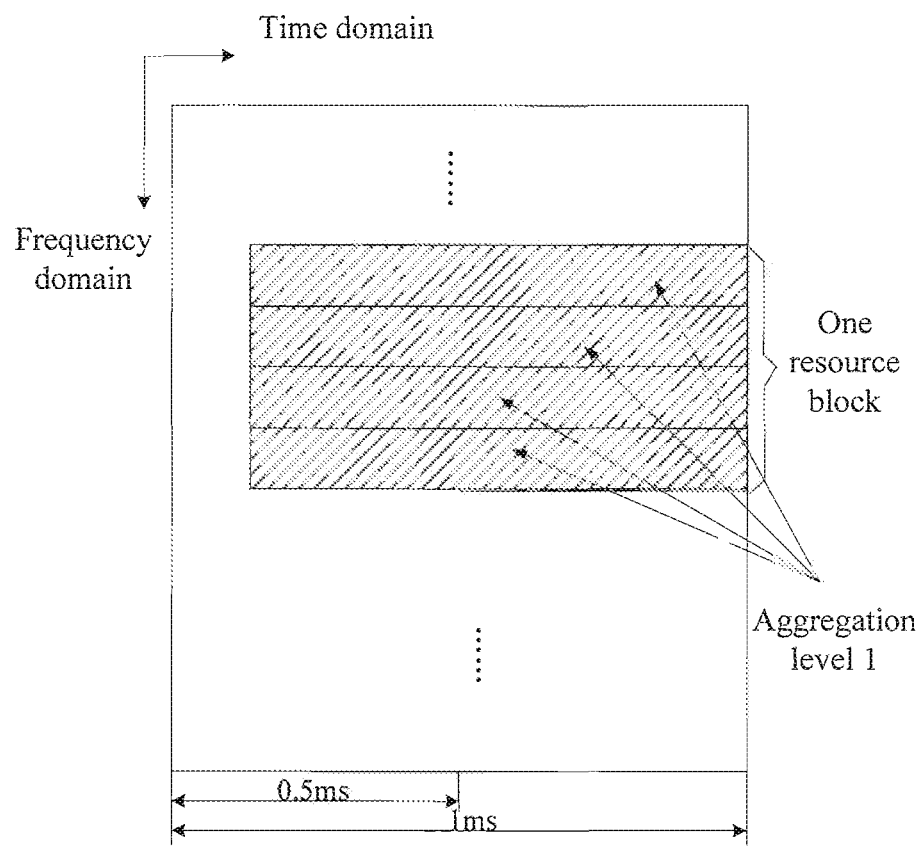
FIG. 40 is schematic diagram I that PRB pairs are capable of carrying 1 resource corresponding to aggregation level 1 according to preferred embodiment III of the present disclosure.
Figure 41:
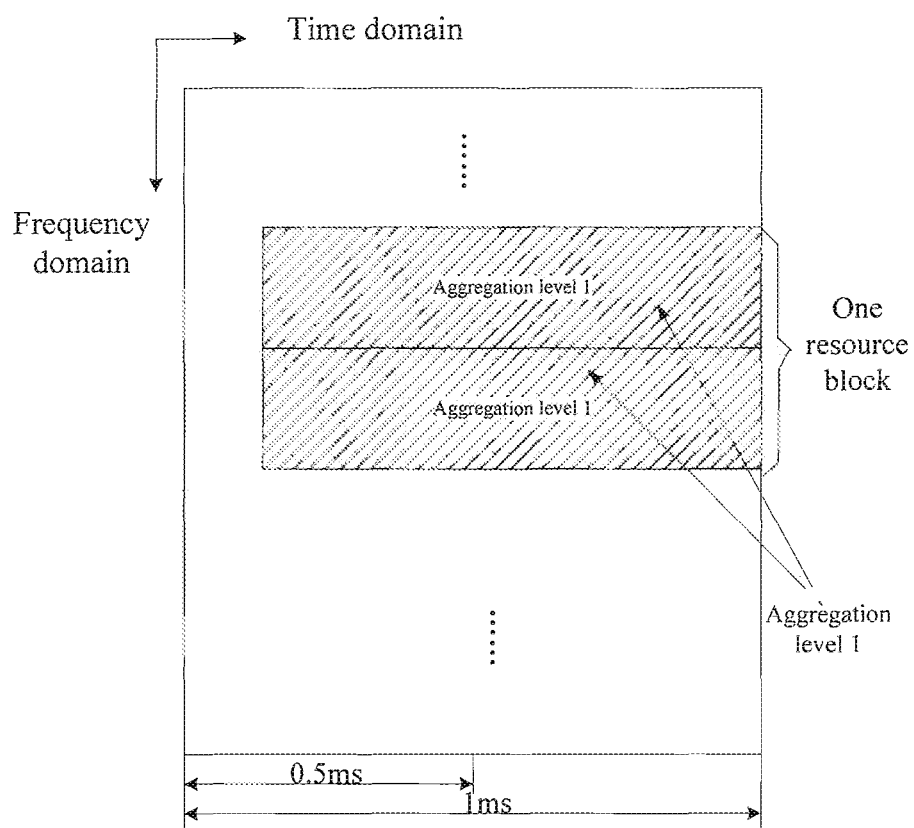
FIG. 41 is schematic diagram II that PRB pairs are capable of carrying 1 resource corresponding to aggregation level 1 according to preferred embodiment III of the present disclosure.

FIG. 40 is schematic diagram I that a PRB pair is capable of carrying 1 resource corresponding to aggregation level 1 according to preferred embodiment III of the present disclosure, and FIG. 41 is schematic diagram II that a PRB pair is capable of carrying 1 resource corresponding to aggregation level 1 according to preferred embodiment III of the present disclosure. As shown in FIG. 40 and FIG. 41, the ePDCCH comprises one or more of the following aggregation levels. According to the PDCCH aggregation level and/or subframe cyclic prefix type, the ePDCCH is mapped onto M PRB pairs.

Method 3-1 to method 3-2 describe the cases where the subframe cyclic prefix is Normal CP.

Method 3-1

Figure 42:
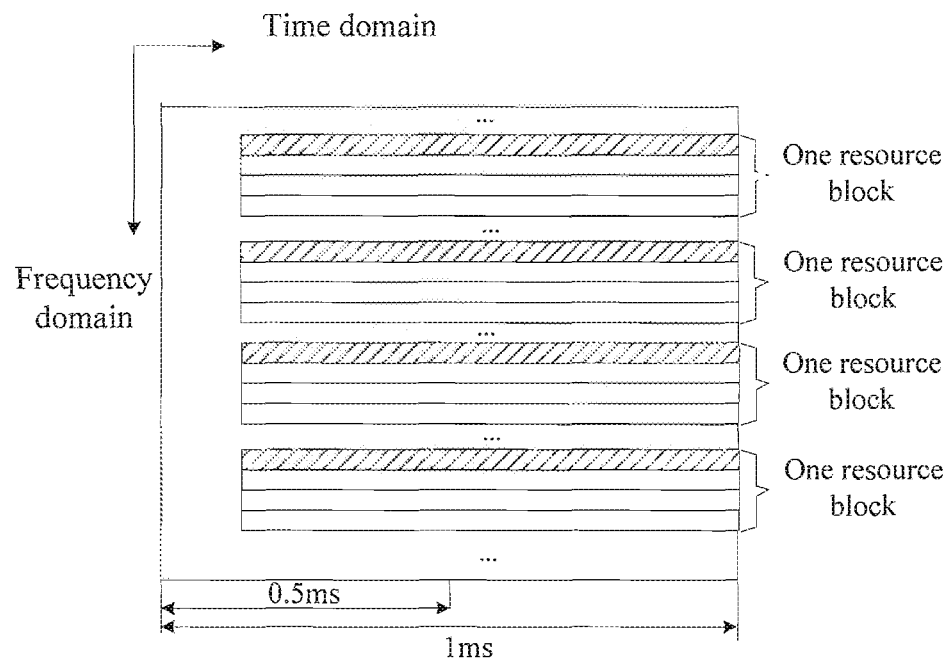
FIG. 42 is a schematic diagram of aggregation level 1 mapping of method 3-1 according to preferred embodiment III of the present disclosure.
Figure 43:
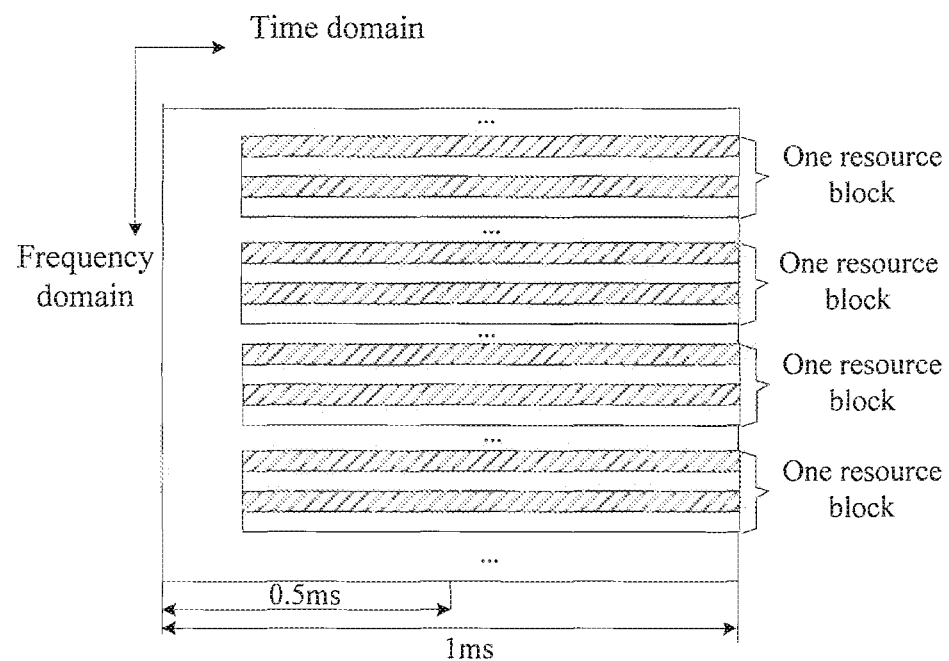
FIG. 43 is a schematic diagram of aggregation level 2 mapping of method 3-1 according to preferred embodiment III of the present disclosure.
Figure 44:
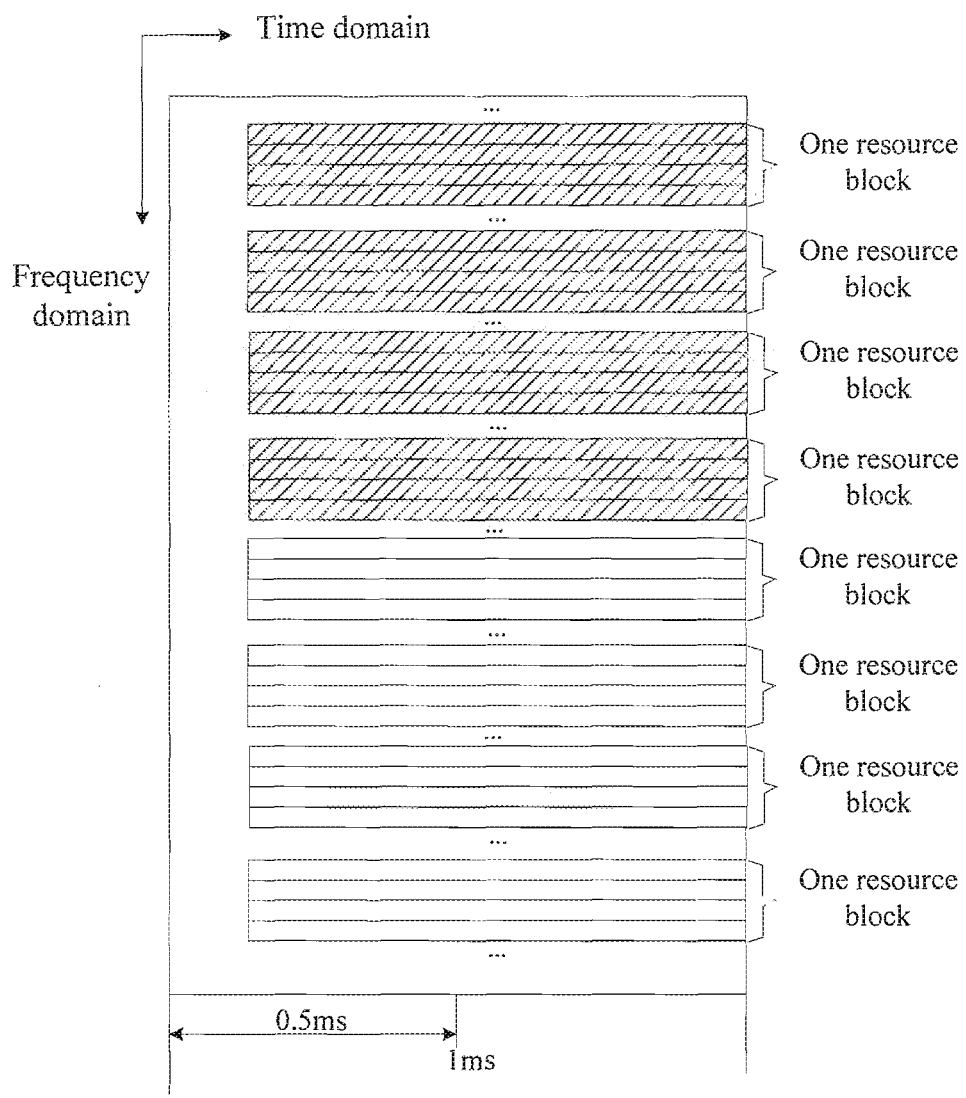
FIG. 44 is a schematic diagram of aggregation level 4 mapping of method 3-1 according to preferred embodiment III of the present disclosure.
Figure 45:
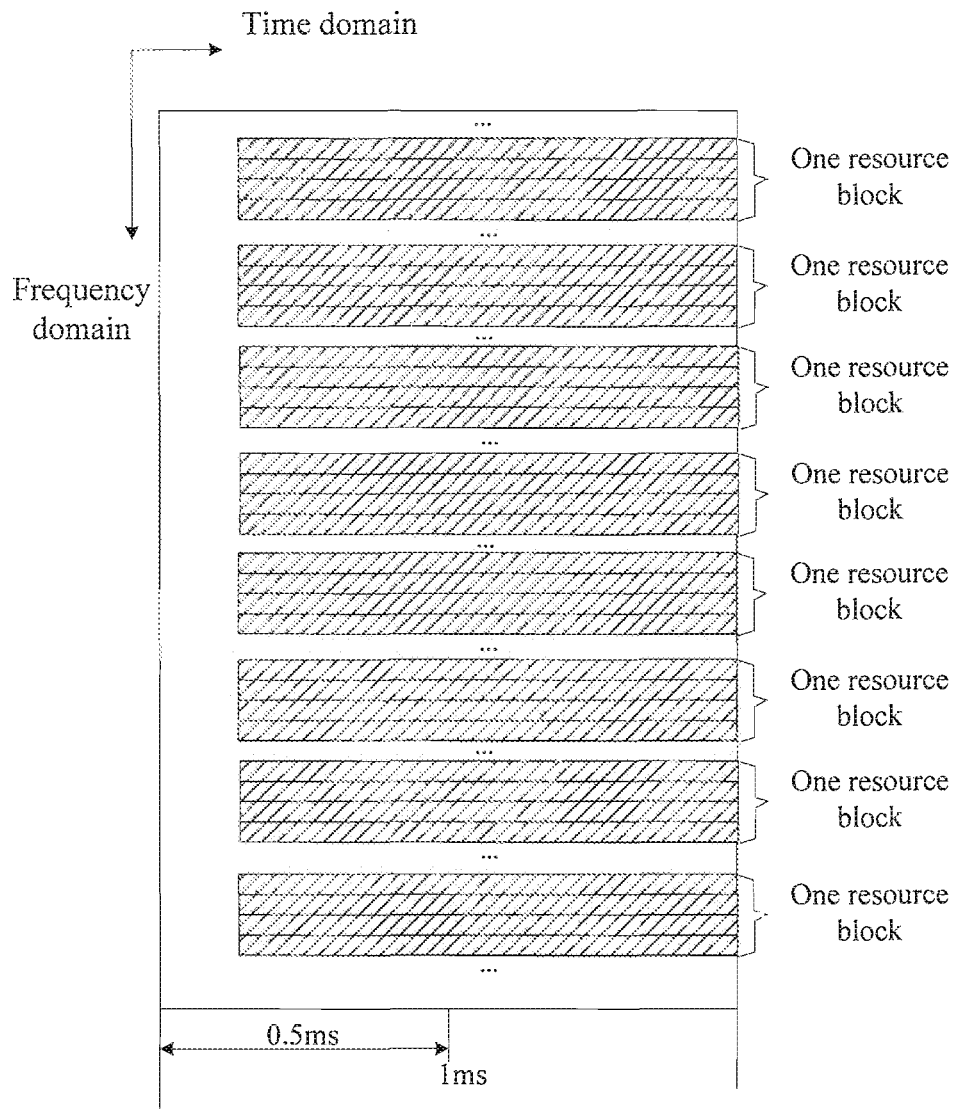
FIG. 45 is a schematic diagram of aggregation level 8 mapping of method 3-1 according to preferred embodiment II of the present disclosure.

FIG. 42 is a schematic diagram of aggregation level 1 mapping of method 3-1 according to preferred embodiment III of the present disclosure. As shown in FIG. 42, the aggregation level is 1, and it is mapped onto 4 PRBs. As shown in FIG. 43, the aggregation level is 2, and it is mapped onto 4 PRBs. As shown in FIG. 44, the aggregation level is 4, and it is mapped onto 4 PRBs. As shown in FIG. 45, the aggregation level is 8, and it is mapped onto 8 PRBs.

Method 3-2

Figure 46:
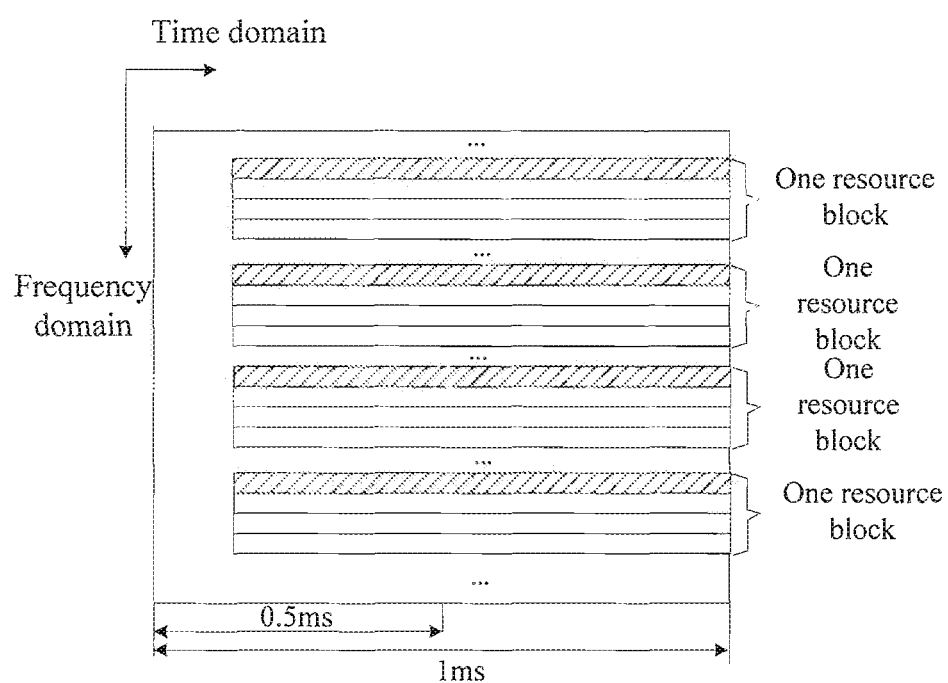
FIG. 46 is a schematic diagram of aggregation level 1 mapping of method 3-2 according to preferred embodiment III of the present disclosure.
Figure 47:
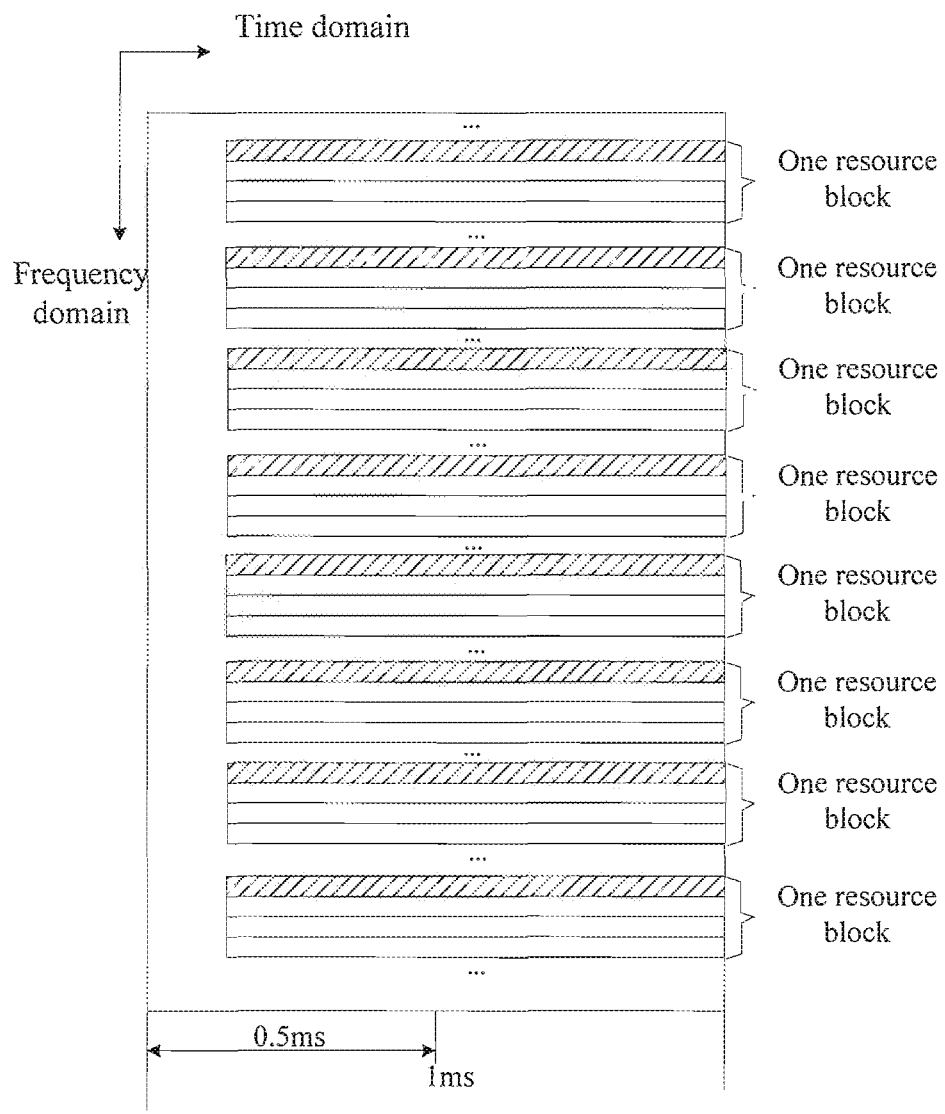
FIG. 47 is a schematic diagram of aggregation level 2 mapping of method 3-2 according to preferred embodiment III of the present disclosure.
Figure 48:
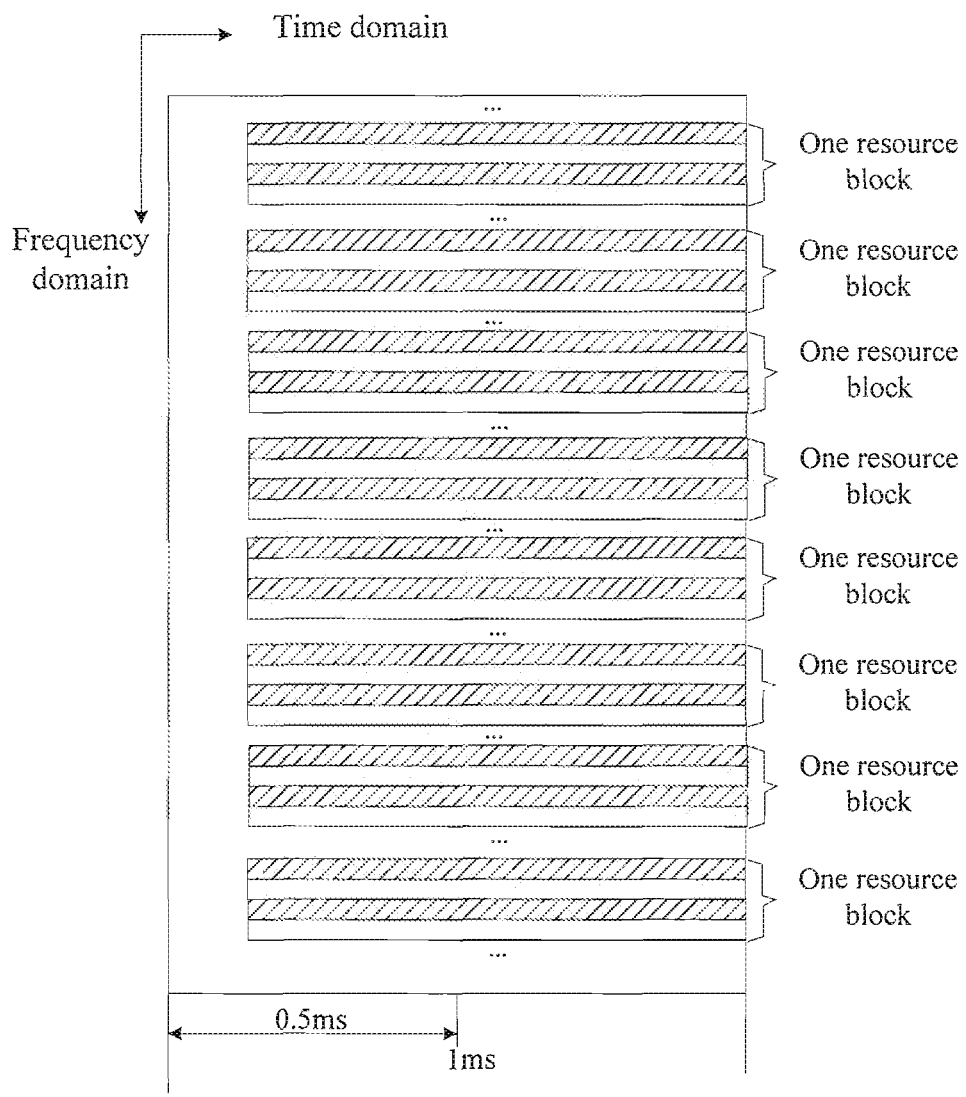
FIG. 48 is a schematic diagram of aggregation level 4 mapping of method 3-2 according to preferred embodiment III of the present disclosure.
Figure 49:
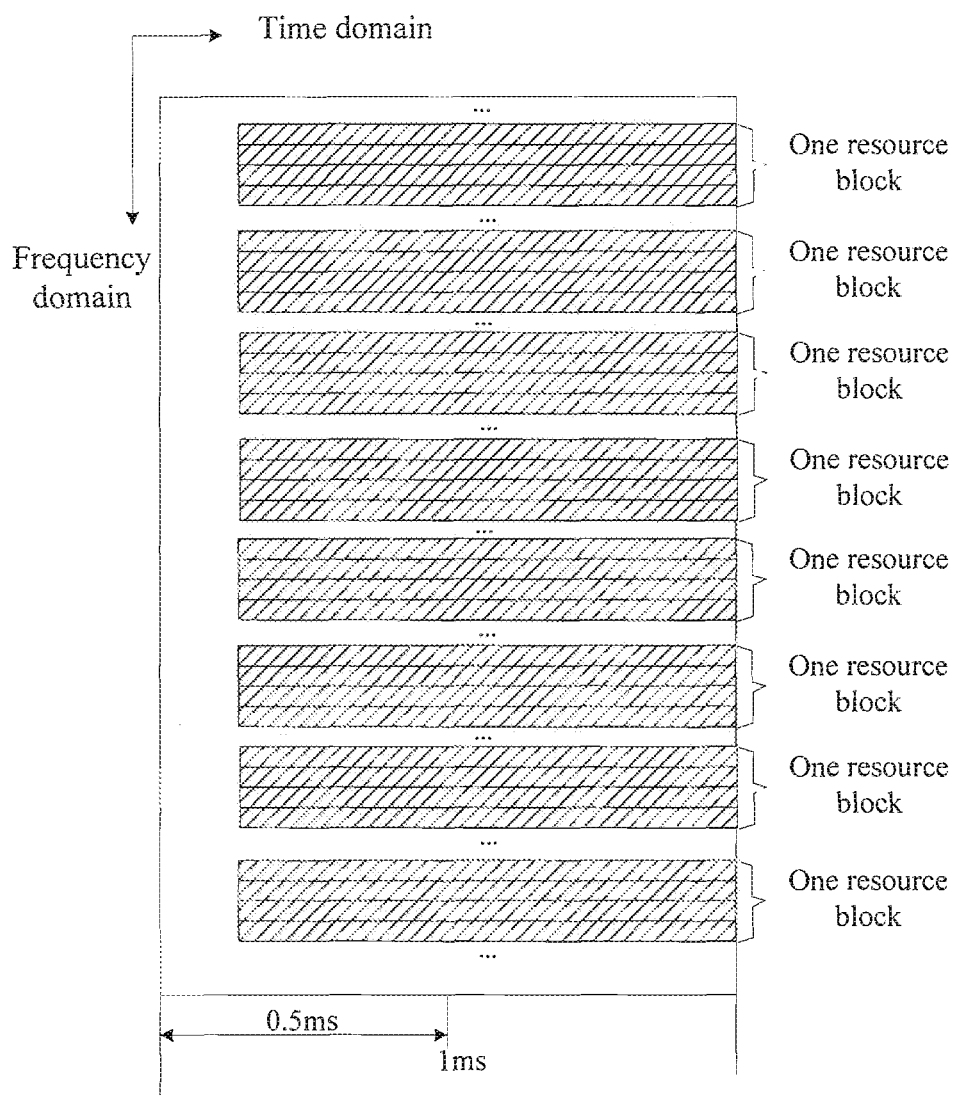
FIG. 49 is a schematic diagram of aggregation level 8 mapping of method 3-2 according to preferred embodiment III of the present disclosure.

FIG. 46 is a schematic diagram of aggregation level 1 mapping of method 3-2 according to preferred embodiment III of the present disclosure. As shown in FIG. 46, the aggregation level is 1, and it is mapped onto 4 PRBs. As shown in FIG. 47, the aggregation level is 2, and it is mapped onto 8 PRBs. As shown in FIG. 48, the aggregation level is 4, and it is mapped onto 8 PRBs. As shown in FIG. 49, the aggregation level is 8, and it is mapped onto 8 PRBs.

Method 3-3 to method 3-5 describe the cases where the subframe cyclic prefix is Extended CP.

Method 3-3

Figure 50:
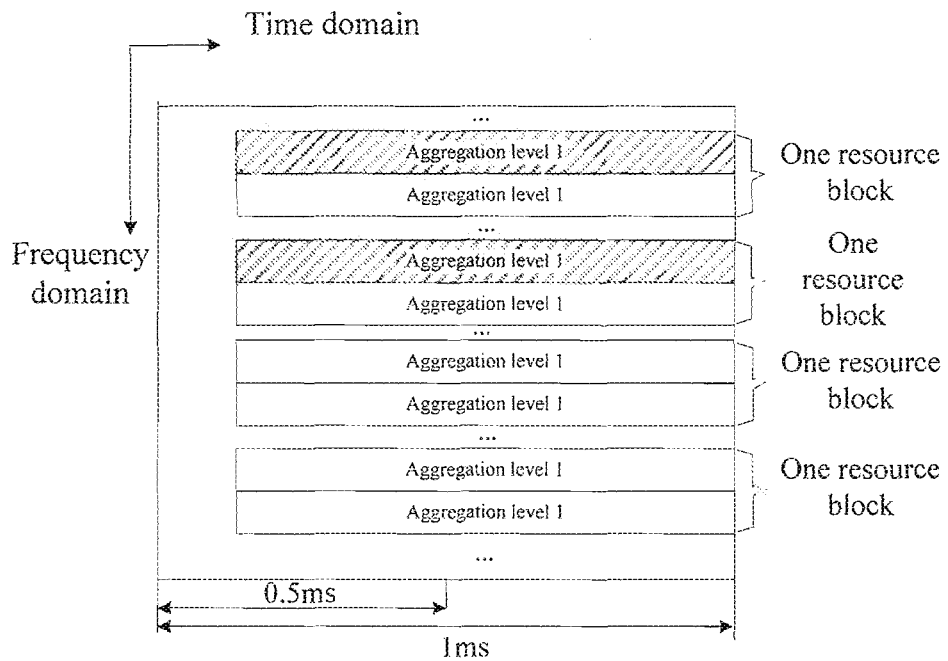
FIG. 50 is a schematic diagram of aggregation level 1 mapping of method 3-3 according to preferred embodiment III of the present disclosure.
Figure 51:
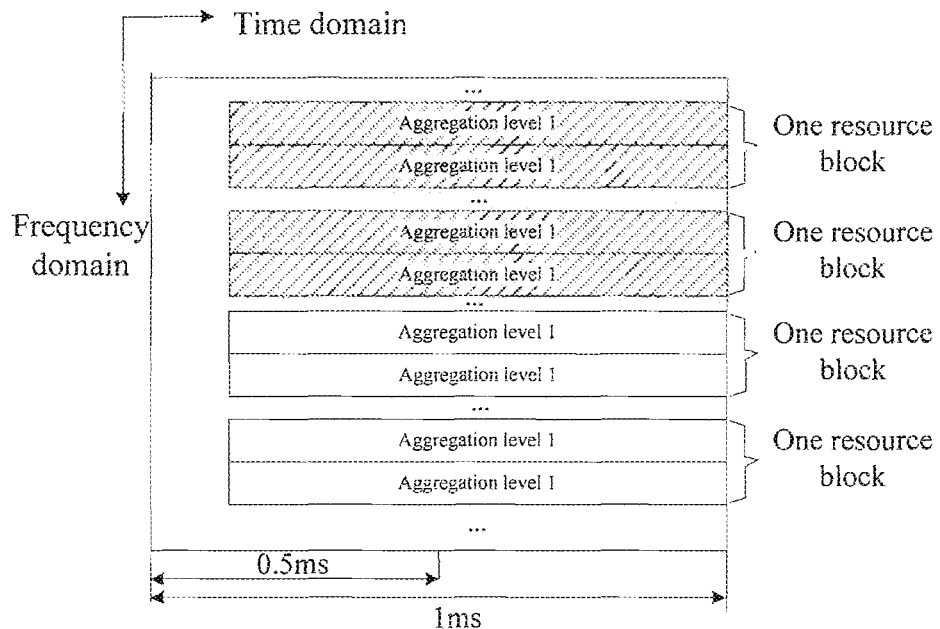
FIG. 51 is a schematic diagram of aggregation level 2 mapping of method 3-3 according to preferred embodiment II of the present disclosure.

FIG. 50 is a schematic diagram of aggregation level 1 mapping of method 3-3 according to preferred embodiment III of the present disclosure. As shown in FIG. 50, the aggregation level is 1, and it is mapped onto 2 PRBs. As shown in FIG. 51, the aggregation level is 2, and it is mapped onto 2

Figure 52:
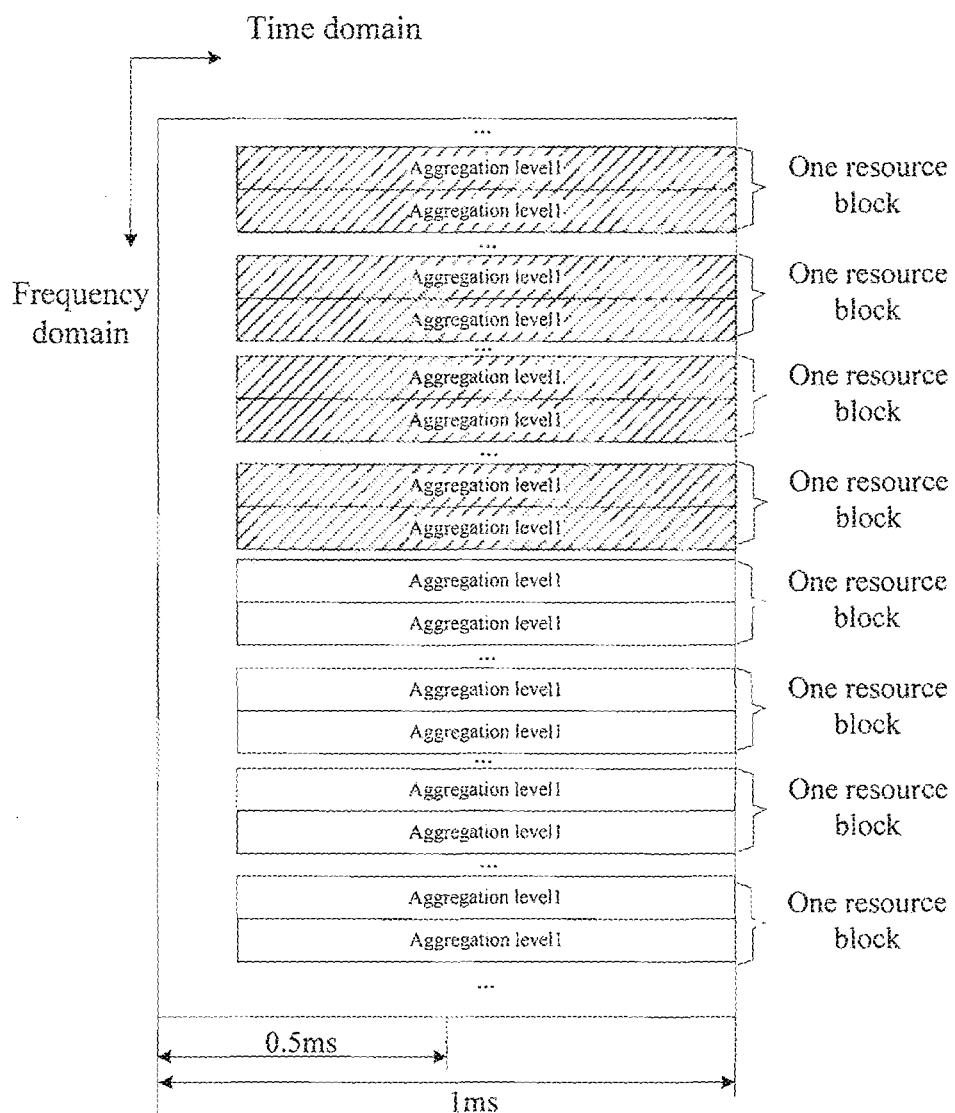
FIG. 52 is a schematic diagram of aggregation level 4 mapping of method 3-3 according to preferred embodiment III of the present disclosure.
Figure 53:
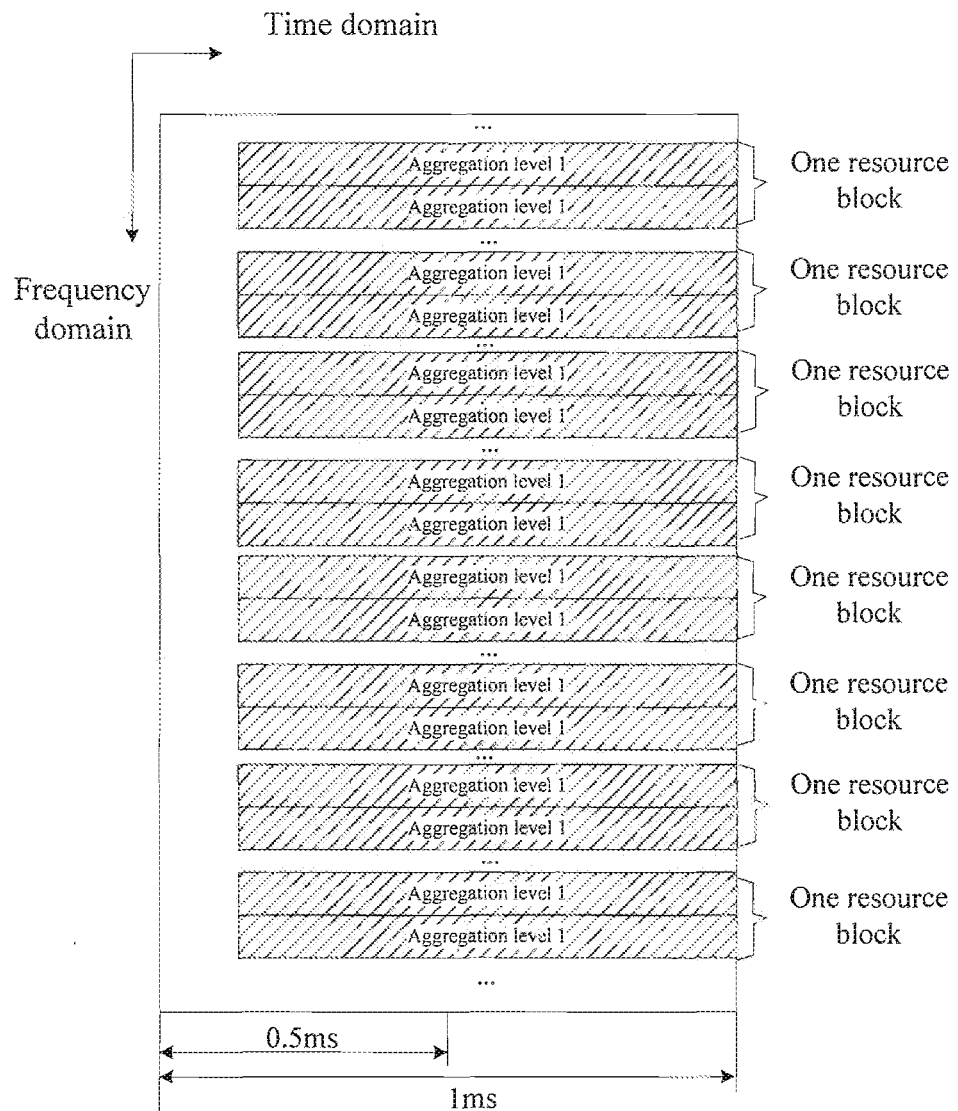
FIG. 53 is a schematic diagram of aggregation level 8 mapping of method 3-3 according to preferred embodiment III of the present disclosure.

PRBs. As shown in FIG. 52, the aggregation level is 4, and it is mapped onto 4 PRBs. As shown in FIG. 53, the aggregation level is 8, and it is mapped onto 8 PRBs.

Method 3-4

Figure 54:
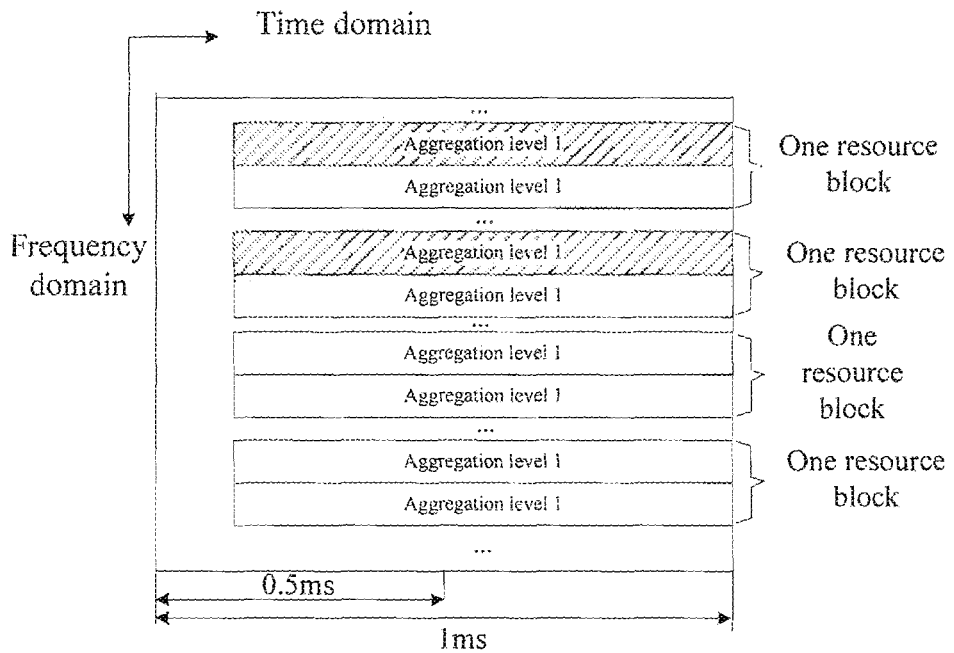
FIG. 54 is a schematic diagram of aggregation level 1 mapping of method 3-4 according to preferred embodiment III of the present disclosure.
Figure 55:
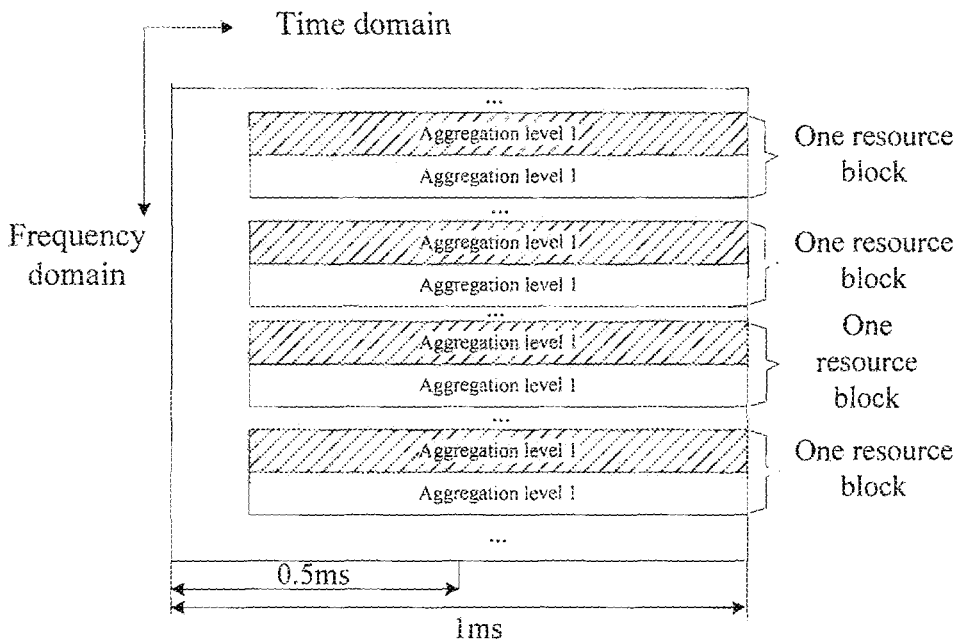
FIG. 55 is a schematic diagram of aggregation level 2 mapping of method 3-4 according to preferred embodiment III of the present disclosure.
Figure 56:
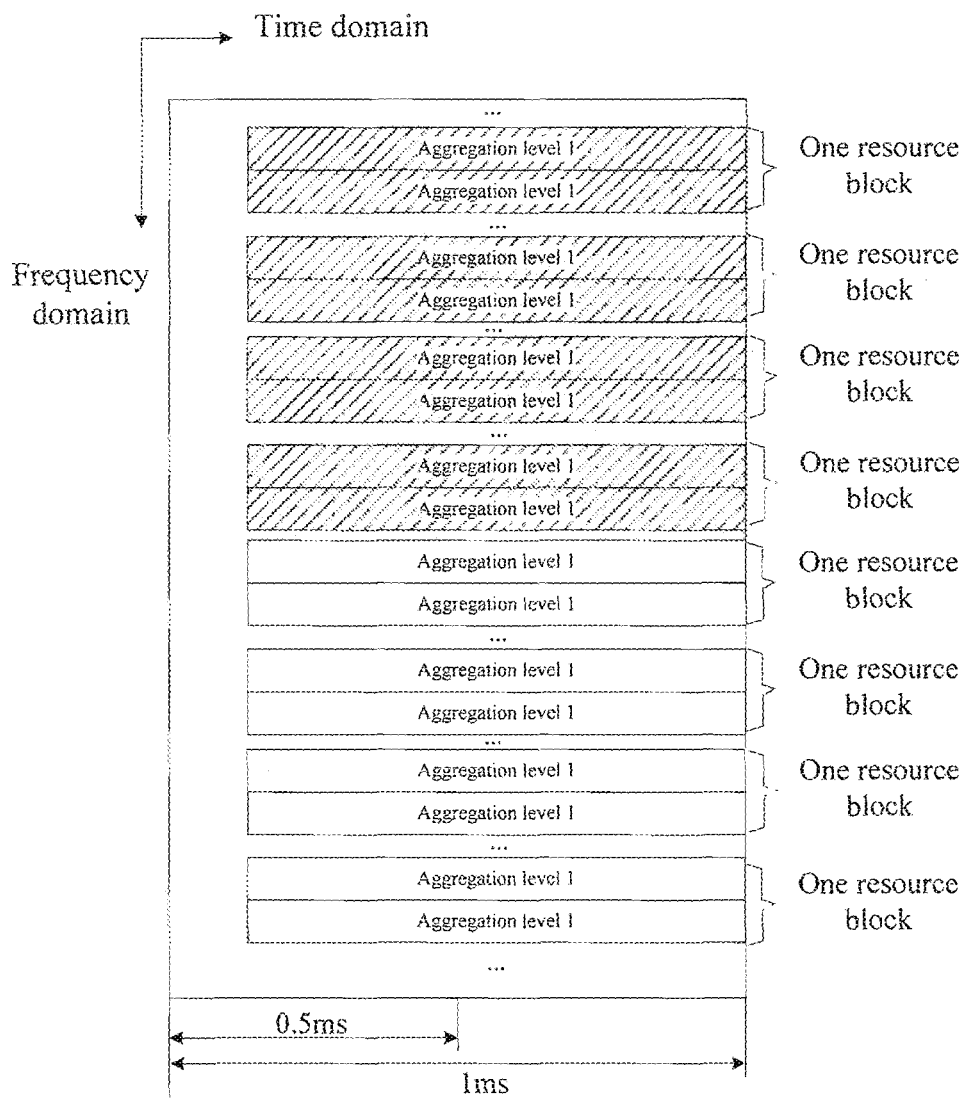
FIG. 56 is a schematic diagram of aggregation level 4 mapping of method 3-4 according to preferred embodiment III of the present disclosure.
Figure 57:
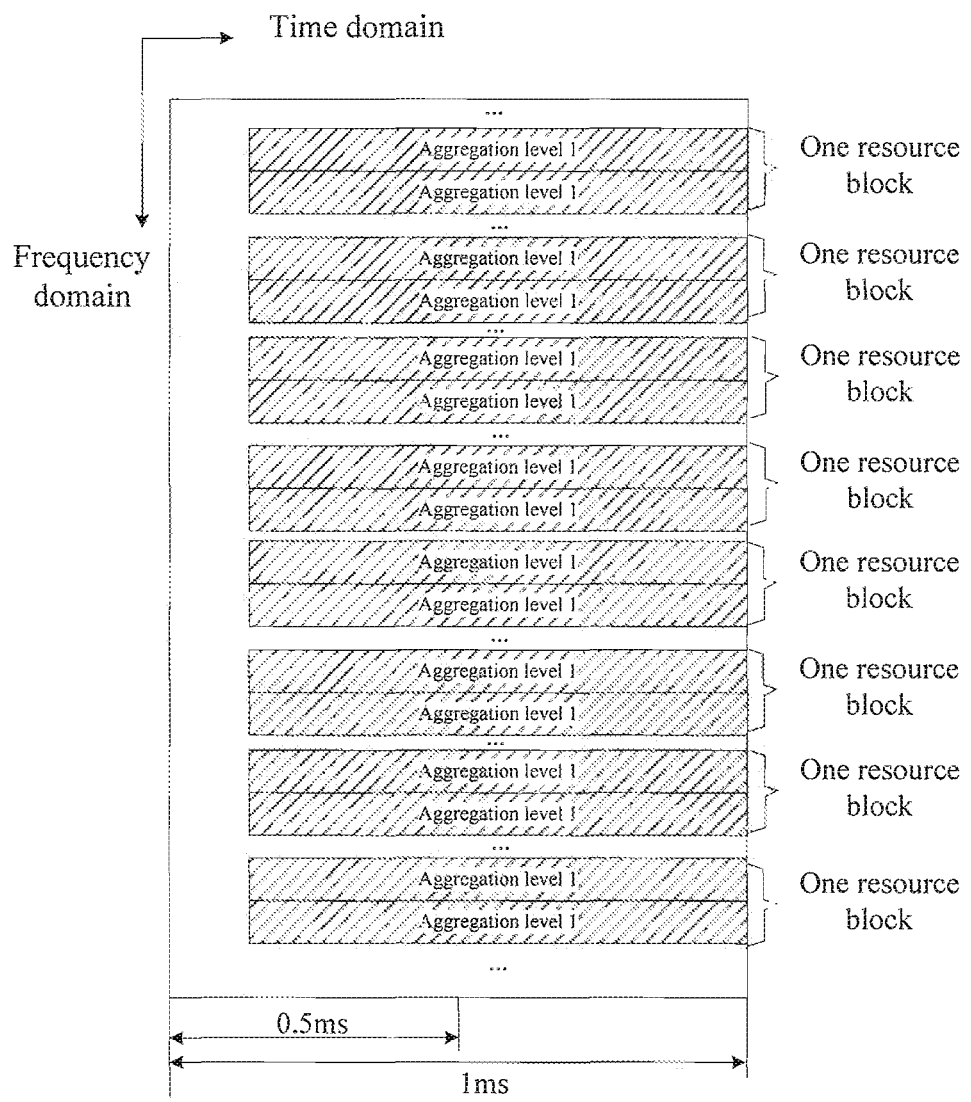
FIG. 57 is a schematic diagram of aggregation level 8 mapping of method 3-4 according to preferred embodiment m of the present disclosure.

FIG. 54 is a schematic diagram of aggregation level 1 mapping of method 3-4 according to preferred embodiment III of the present disclosure. As shown in FIG. 54, the aggregation level is 1, and it is mapped onto 2 PRBs. As shown in FIG. 55, the aggregation level is 2, and it is mapped onto 4 PRBs. As shown in FIG. 56, the aggregation level is 4, and it is mapped onto 4 PRBs. As shown in FIG. 57, the aggregation level is 8, and it is mapped onto 8 PRBs.

Method 3-5

Figure 58:
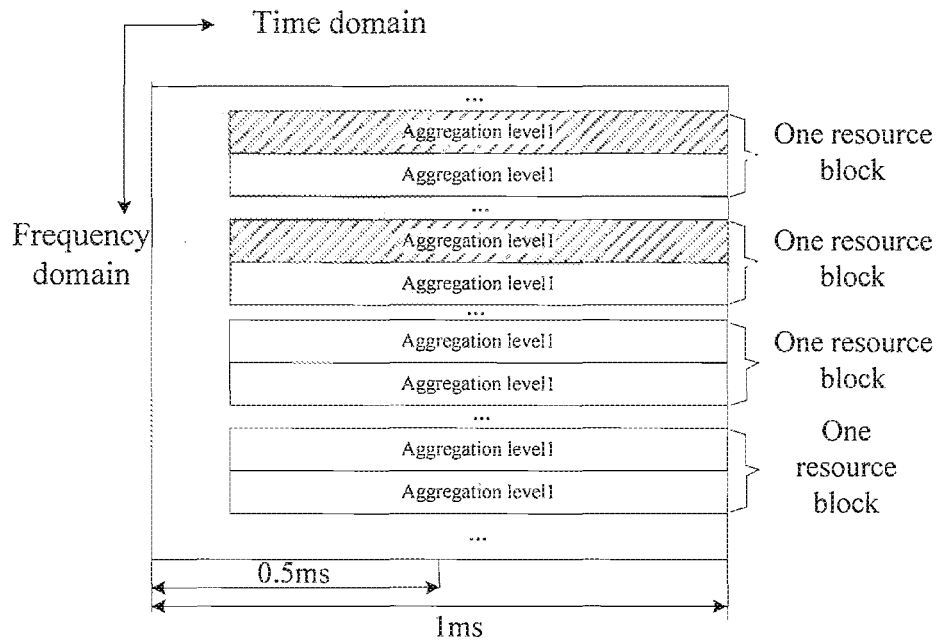
FIG. 58 is a schematic diagram of aggregation level 1 mapping of method 3-5 according to preferred embodiment III of the present disclosure.
Figure 59:
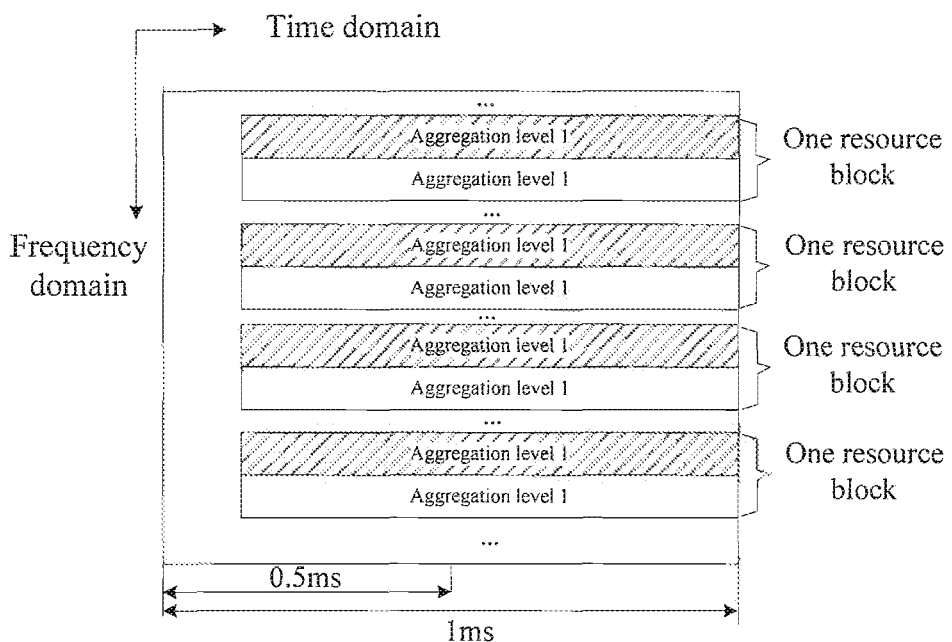
FIG. 59 is a schematic diagram of aggregation level 2 mapping of method 3-5 according to preferred embodiment m of the present disclosure.
Figure 60:
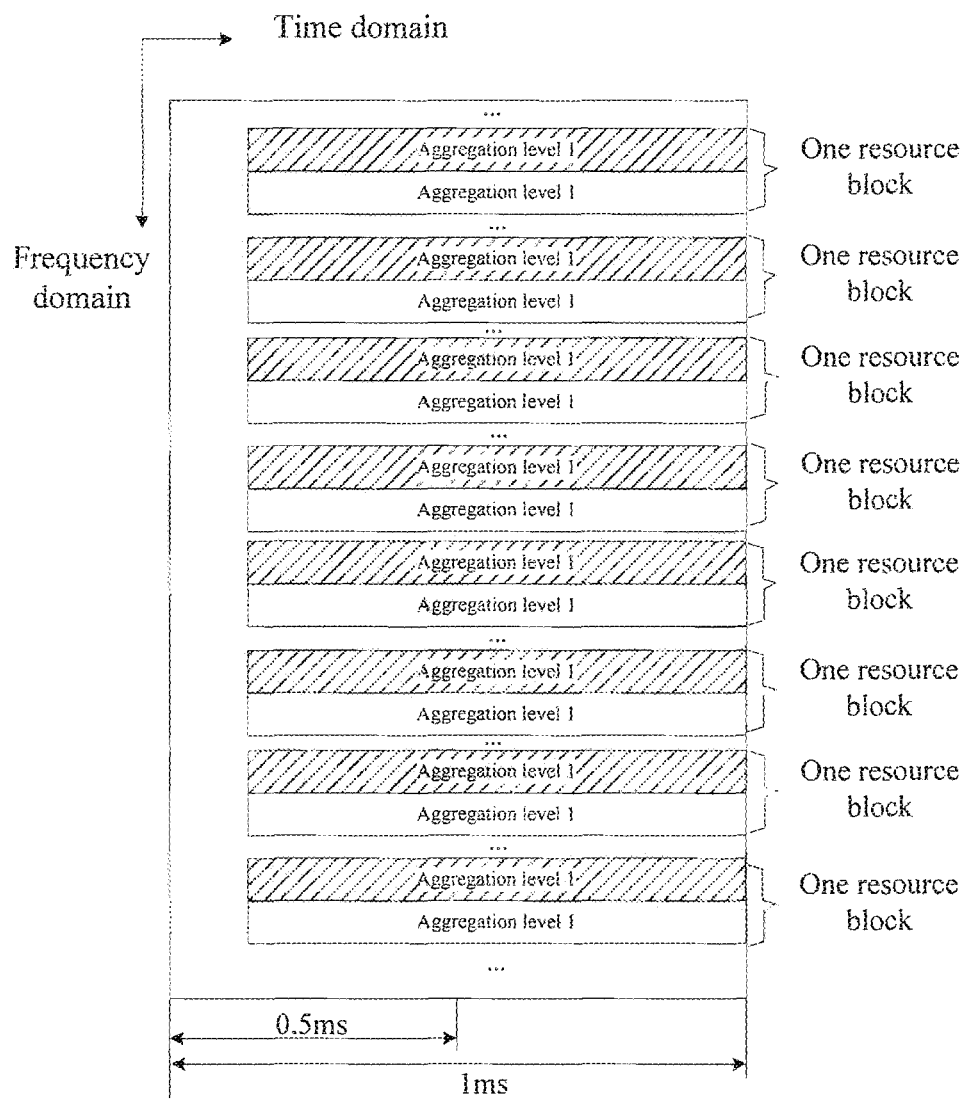
FIG. 60 is a schematic diagram of aggregation level 4 mapping of method 3-5 according to preferred embodiment III of the present disclosure.
Figure 61:
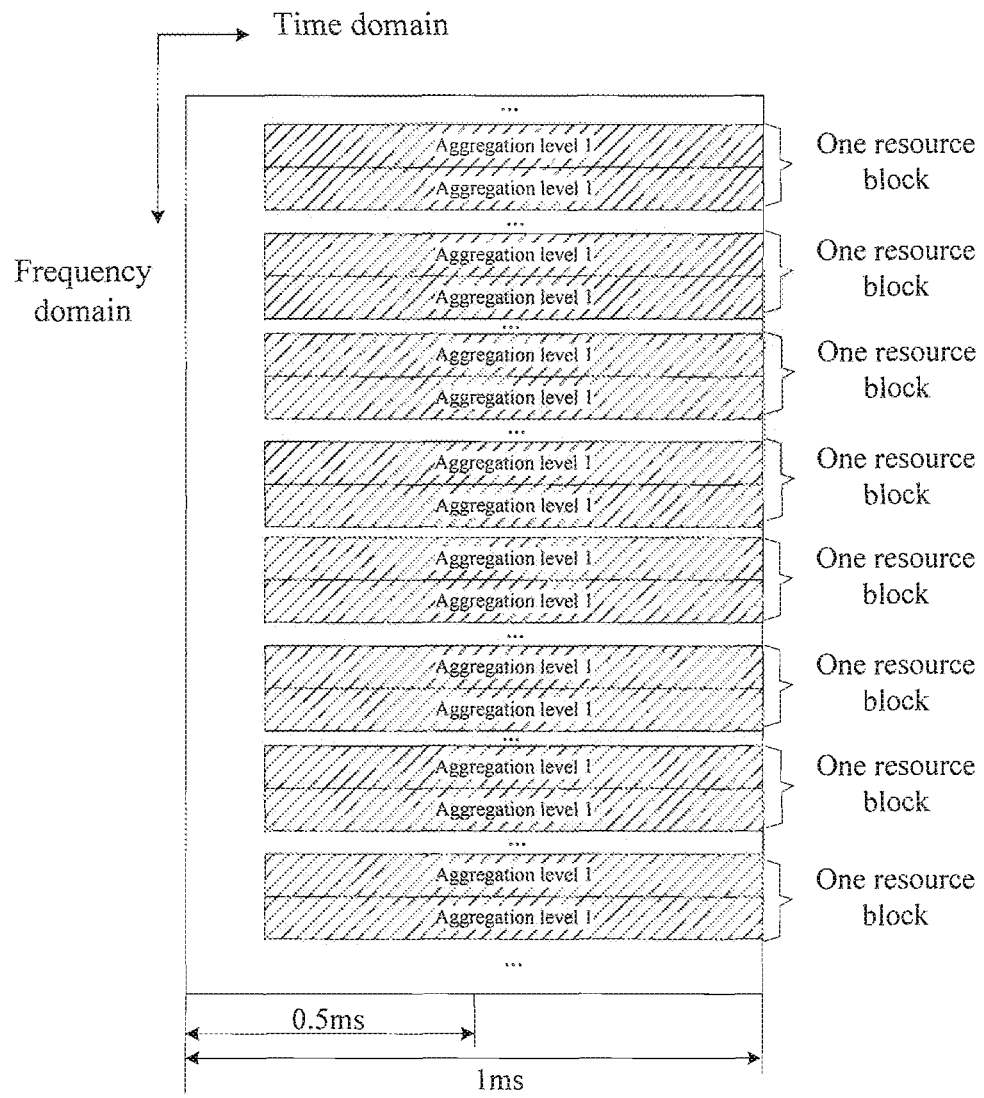
FIG. 61 is a schematic diagram of aggregation level 8 mapping of method 3-5 according to preferred embodiment III of the present disclosure.

FIG. 58 is a schematic diagram of aggregation level 1 mapping of method 3-5 according to preferred embodiment III of the present disclosure. As shown in FIG. 58, the aggregation level is 1, and it is mapped onto 2 PRBs. As shown in FIG. 59, the aggregation level is 2, and it is mapped onto 4 PRBs. As shown in FIG. 60, the to aggregation level is 4, and it is mapped onto 8 PRBs. As shown in FIG. 61, the aggregation level is 8, and it is mapped onto 8 PRBs.

Preferred Embodiment IV

Corresponding to the Above-Mentioned Method IV

The PRB pairs are capable of carrying k resources corresponding to aggregation level 1, wherein k is 1, 2 or 4. All the available aggregation levels are connected in series, and mapping is performed according to an aggregation level type sequence on the basis of a predefined initial aggregation level index, or mapping is performed according to an aggregation level type sequence on the basis of an aggregation level index configured by a base station. The specific applications are as follows:

The PRB pairs are capable of carrying k resources corresponding to aggregation level 1;

a base station configures M PRB pairs, then there are W=M*K available aggregation levels; the indices are from #0 to #(W−1); and an initial aggregation level index (an aggregation level index configured by the base station) R is randomly generated, thus when it is aggregation level 1, it is mapped to aggregation level #R;

when it is aggregation level 2, it is mapped to aggregation level #R and aggregation level #(R+1) mod (W), or when it is aggregation level 2, it is mapped to aggregation level ((R mod floor (W/2))*2) and aggregation level #((R mod (floor (W/2))*2)+1);

when it is aggregation level 4, it is mapped to aggregation level #R and aggregation level #(R+1) mod (W), aggregation level #(R+2) mod (W), aggregation level #(R+3) mod (W), or when it is aggregation level 4, it is mapped to aggregation level #(R mod (floor (W/2))*4) and aggregation level #((R mod (floor (W/2))*4)+1), and aggregation level #((R mod (floor (W/2))*4)+2) and aggregation level #((R mod (floor (W/2))*4)+3); and when it is aggregation level 8, it is mapped to aggregation level #R and aggregation level #(R+1) mod (W), aggregation level #(R+2) mod (W), aggregation level #(R+3) mod (W), aggregation level #(R+4) mod (W), aggregation level #(R+5) mod (W), aggregation level #(R+6) mod (W), aggregation level #(R+7) mod (W), or when it is aggregation level 8, it is mapped to aggregation level #(R mod (floor (W/2))*8) and aggregation level #(R mod (floor (W/2))*8)+1), aggregation level #(R mod (floor (W/2))*8)+2) and aggregation level #(R mod (floor (W/2))*8)+3), aggregation level #(R mod (floor (W/2))*8)+4) and aggregation level #(R mod (floor (W/2)) *8)+5), and aggregation level #(R mod (floor (W/2))*8)+6) and aggregation level #(R mod (floor (W/2))*8)+7).

Method 4-1

Figure 62:
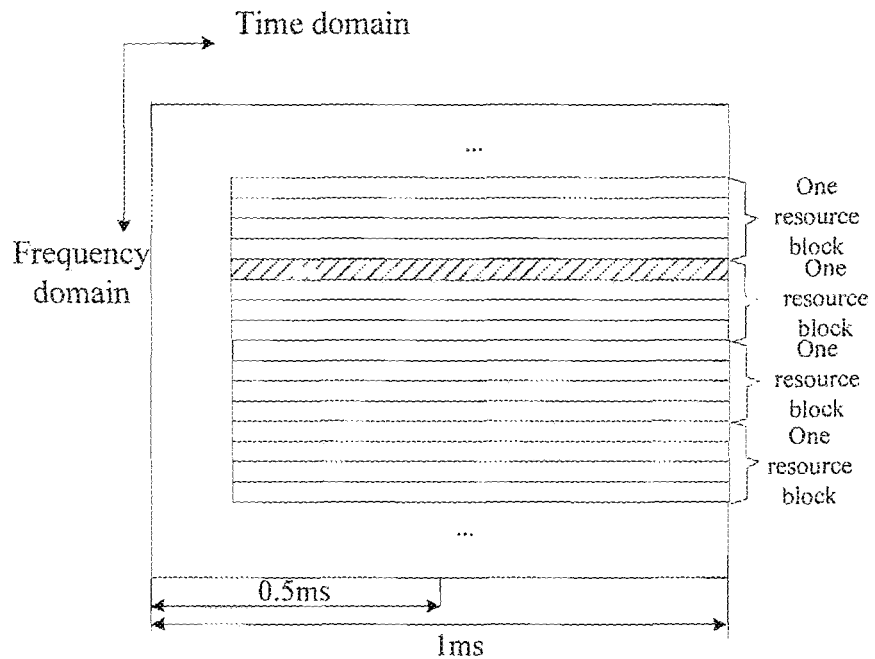
FIG. 62 is a schematic diagram of aggregation level 1 mapping of method 4-1 according to preferred embodiment IV of the present disclosure.
Figure 63:
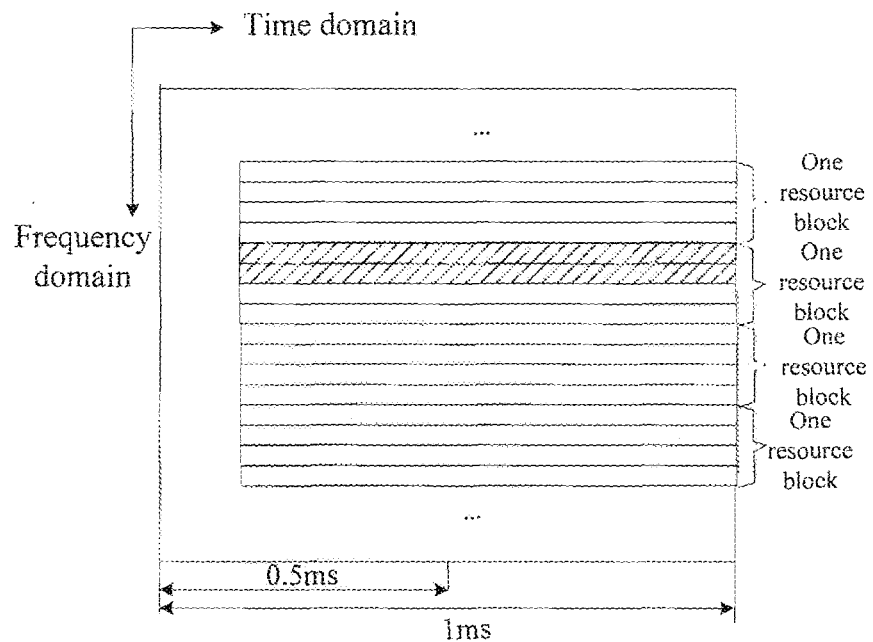
FIG. 63 is a schematic diagram of aggregation level 2 mapping of method 4-1 according to preferred embodiment IV of the present disclosure.
Figure 64:
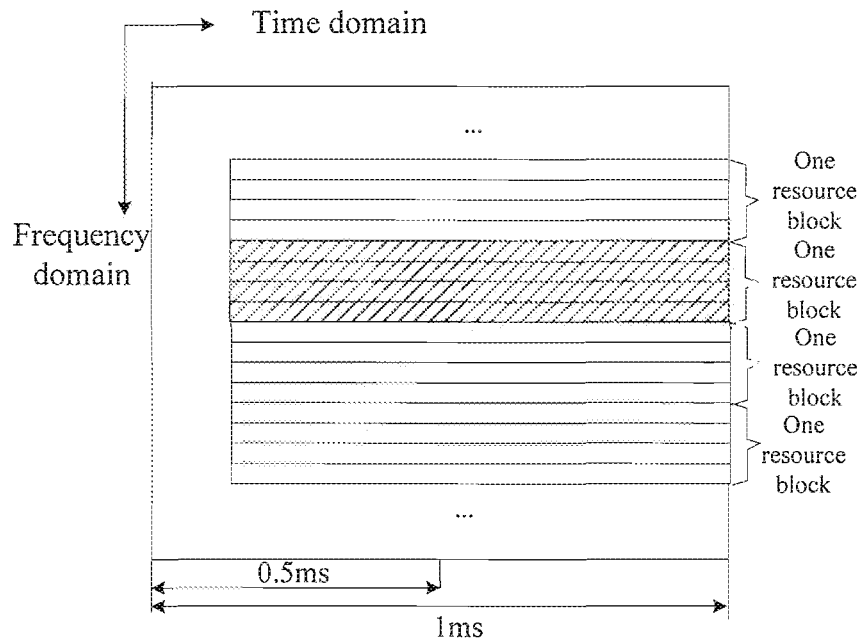
FIG. 64 is a schematic diagram of aggregation level 4 mapping of method 4-1 according to preferred embodiment IV of the present disclosure.
Figure 65:
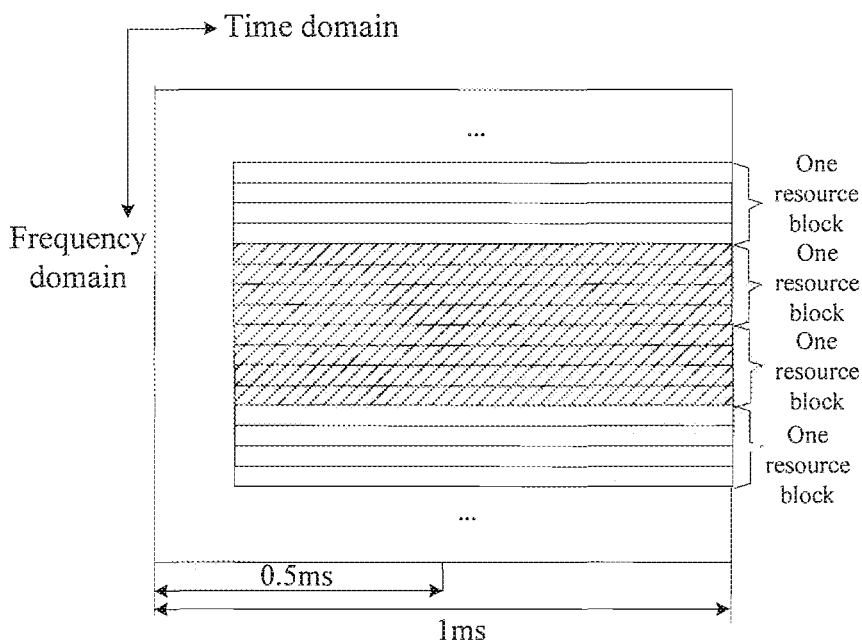
FIG. 65 is a schematic diagram of aggregation level 8 mapping of method 4-1 according to preferred embodiment IV of the present disclosure.

The PRB pairs may carry 4 resources corresponding to aggregation level 1. A base station configures 4 PRBs, which is W=4*4=16 for available aggregation levels, and the indices are #0 to #15. An initial aggregation level index (an aggregation level index configured by the base station) #4 is randomly generated, then FIG. 62 is a schematic diagram of aggregation level 1 mapping of method 4-1 according to preferred embodiment IV of the present disclosure. As shown in FIG. 62, the aggregation level is 1, and it is mapped onto 1 PRB. As shown in FIG. 63, the aggregation level is 2, and it is mapped onto 1 PRB. As shown in FIG. 64, the aggregation level is 4, and it is mapped onto 1 PRB. As shown in FIG. 65, the aggregation level is 8, and it is mapped onto 2 PRBs.

Method 4-2

Figure 66:
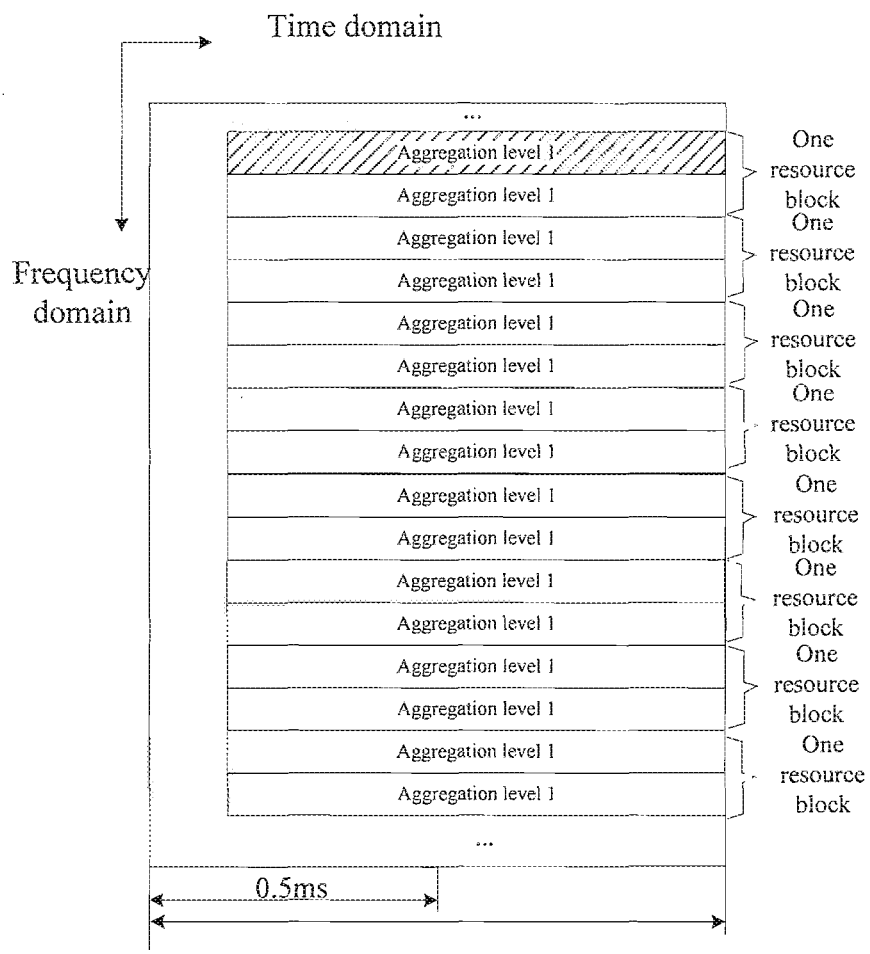
FIG. 66 is a schematic diagram of aggregation level 1 mapping of method 4-2 according to preferred embodiment IV of the present disclosure.
Figure 67:
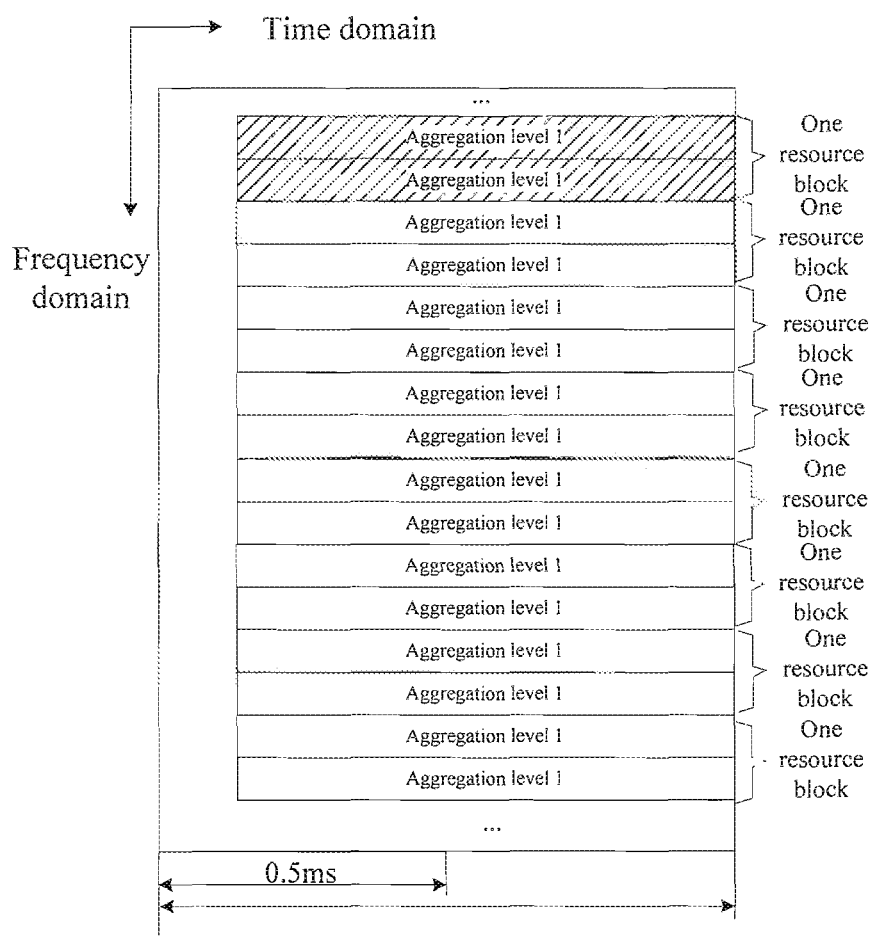
FIG. 67 is a schematic diagram of aggregation level 2 mapping of method 4-2 according to preferred embodiment IV of the present disclosure.
Figure 68:
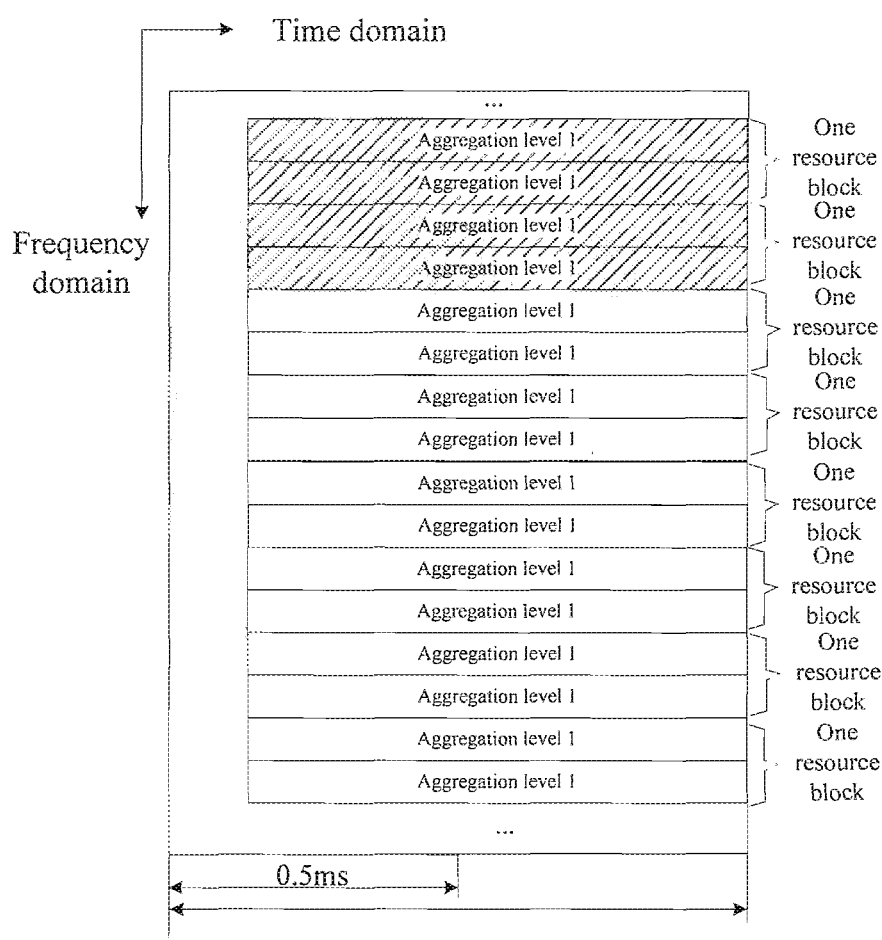
FIG. 68 is a schematic diagram of aggregation level 4 mapping of method 4-2 according to preferred embodiment IV of the present disclosure.
Figure 69:
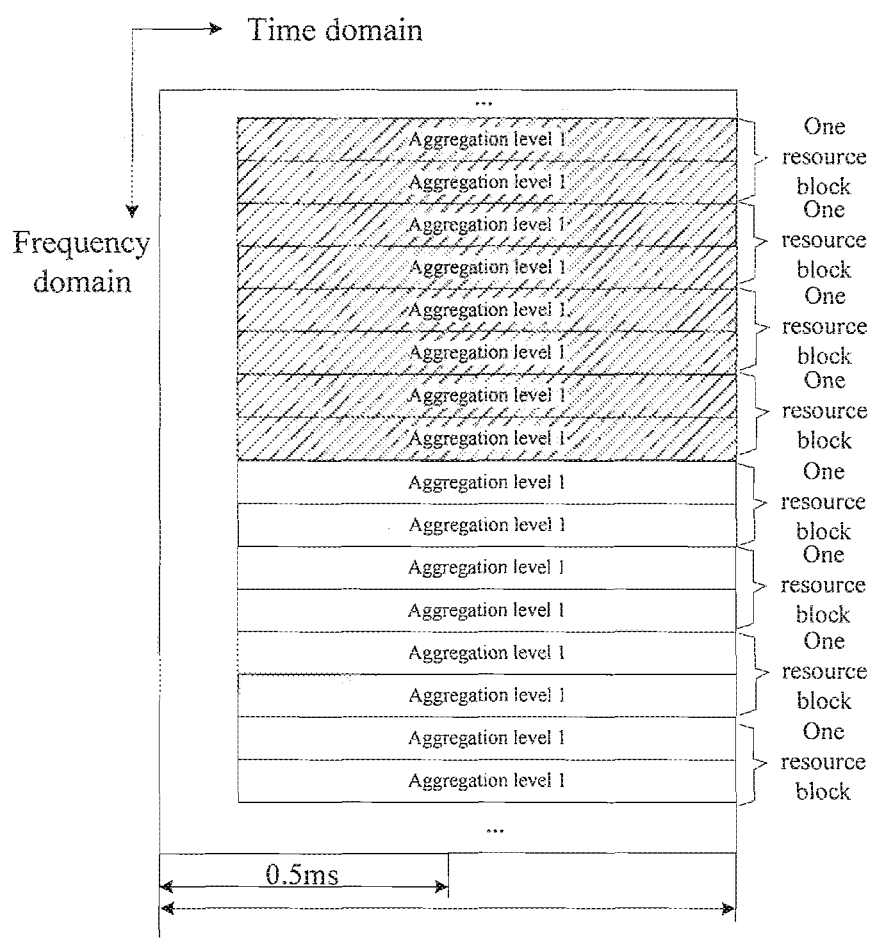
FIG. 69 is a schematic diagram of aggregation level 8 mapping of method 4-2 according to preferred embodiment IV of the present disclosure.

A PRB pair may carry 2 resources corresponding to aggregation level 1. A base station configures 8 PRBs, which is W=2*8=16 for available aggregation levels, and the indices are #0 to #15. An initial aggregation level index (an aggregation level index configured by the base station) #0 is randomly generated, then FIG. 66 is a schematic diagram of aggregation level 1 mapping of method 4-2 according to preferred embodiment IV of the present disclosure. As shown in FIG. 66, the aggregation level is 1, and it is mapped onto 1 PRB. As shown in FIG. 67, the aggregation level is 2, and it is mapped onto 1 PRB. As shown in FIG. 68, the aggregation level is 4, and it is mapped onto 2 PRBs. As shown in FIG. 69, the aggregation level is 8, and it is mapped onto 4 PRBs.

Method 4-3

Figure 70:
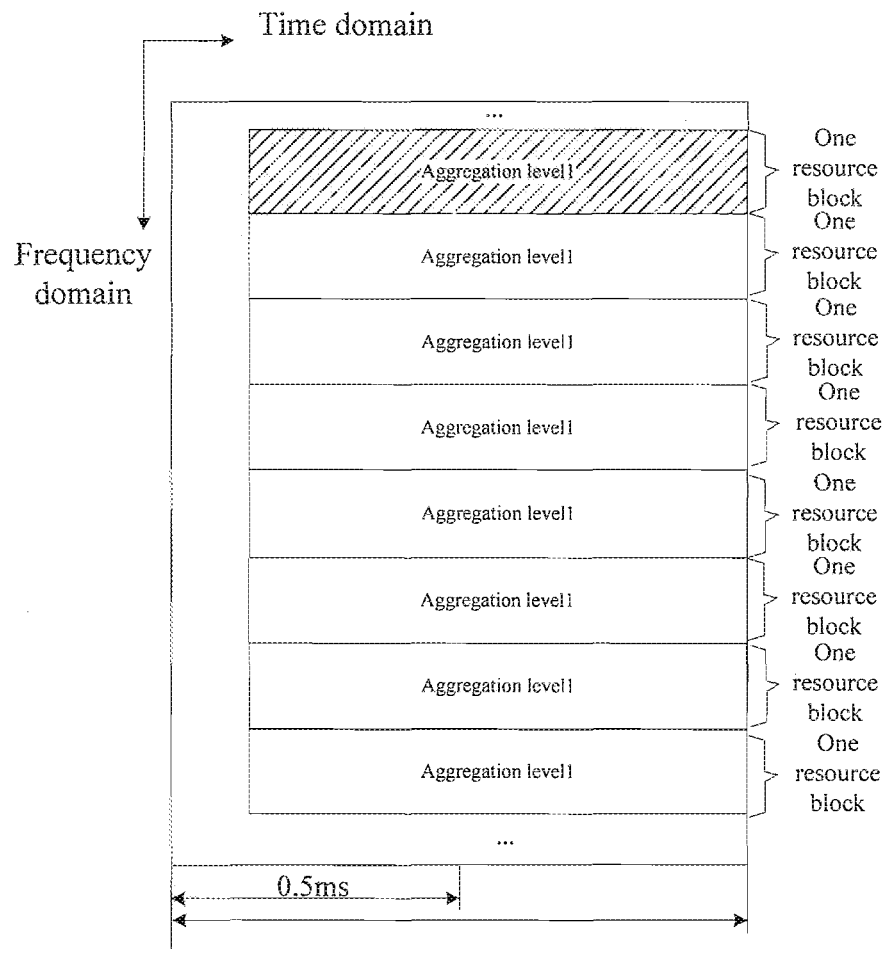
FIG. 70 is a schematic diagram of aggregation level 1 mapping of method 4-3 to according to preferred embodiment IV of the present disclosure.
Figure 71:
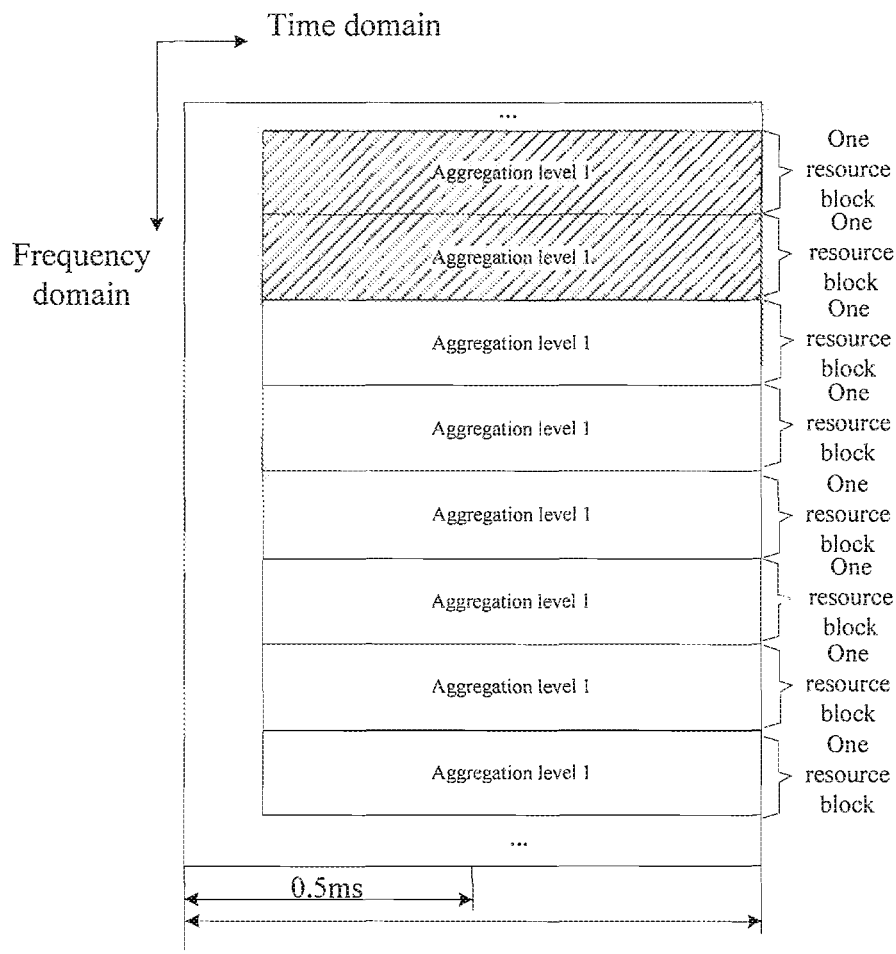
FIG. 71 is a schematic diagram of aggregation level 2 mapping of method 4-3 according to preferred embodiment IV of the present disclosure.
Figure 72:
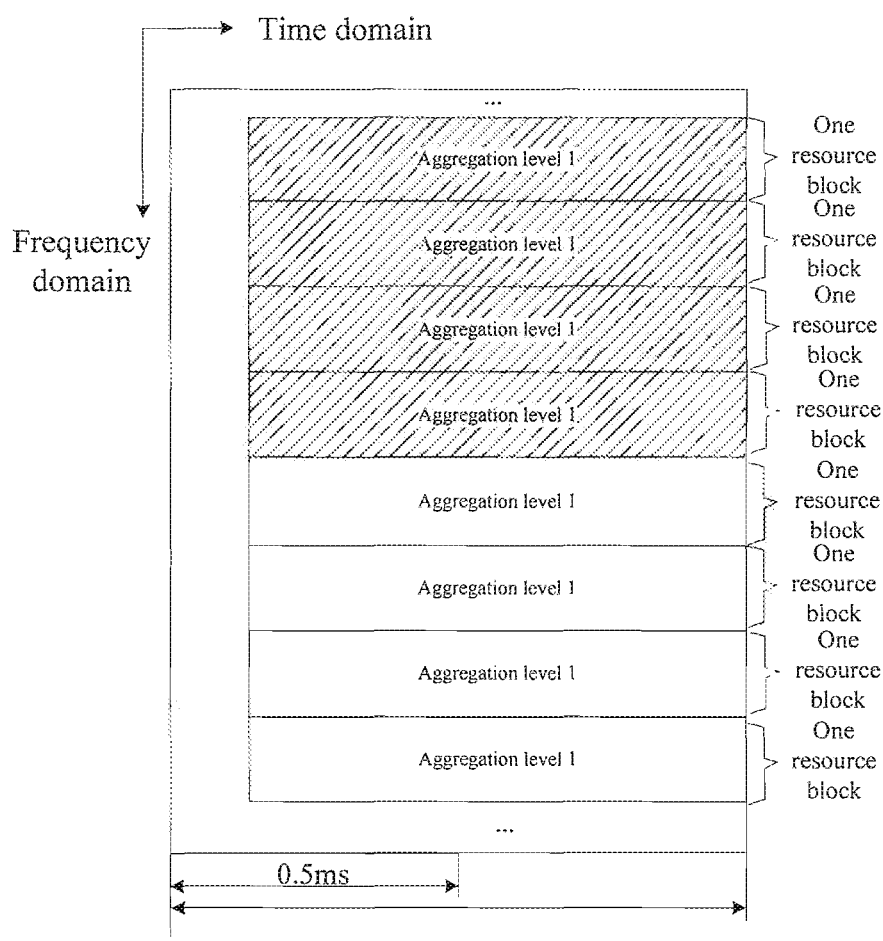
FIG. 72 is a schematic diagram of aggregation level 4 mapping of method 4-3 according to preferred embodiment IV of the present disclosure.
Figure 73:
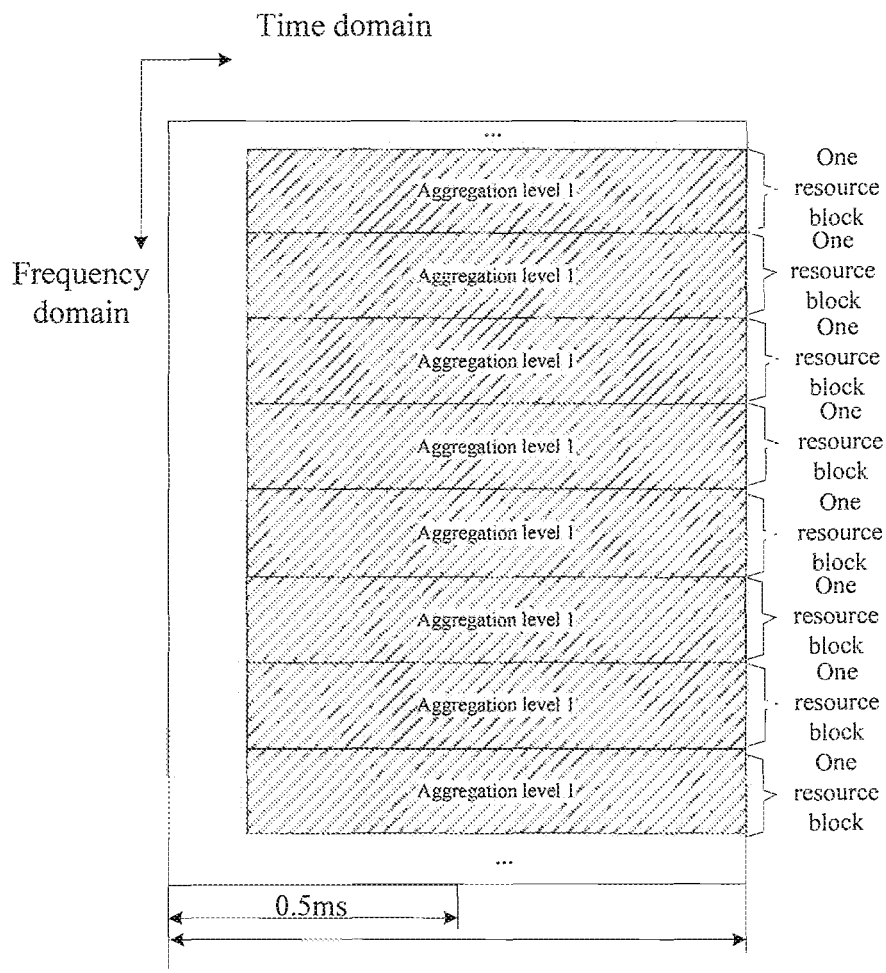
FIG. 73 is a schematic diagram of aggregation level 8 mapping of method 4-3 according to preferred embodiment IV of the present disclosure.

The PRB pairs may carry 1 resource corresponding to aggregation level 1. A base station configures 8 PRBs, which is W=1*8=8 for available aggregation levels, and the indices are #0 to #7. An initial aggregation level index (an aggregation level index configured by the base station) #0 is randomly generated, then FIG. 70 is a schematic diagram of aggregation level 1 mapping of method 4-3 according to preferred embodiment 1V of the present disclosure. As shown in FIG. 70, the aggregation level is 1, and it is mapped onto 1 PRB. The aggregation level is 2, and it is mapped onto 2 PRBs, as shown in FIG. 71. The aggregation level is 4, and it is mapped onto 4 PRBs, as shown in FIG. 72. The aggregation level is 8, and it is mapped onto 4 PRBs, as shown in FIG. 73.

Preferred Embodiment V

A Mapping Method is Determined According to a Downlink Transmission Mode

When the ePDCCH applies a diversity transmission mode, the mapping method is method X1, and when the ePDCCH applies a single-antenna port transmission mode, the mapping method is method Y1. The specific applications are as follows:

when the ePDCCH applies a diversity transmission mode, method II is used for mapping, and when the ePDCCH applies a single-antenna port transmission mode, method I is used for mapping, or when the ePDCCH applies the diversity transmission mode, method III is applied for mapping, and when the ePDCCH applies the single-antenna port transmission mode, method I is applied for mapping, or when the ePDCCH applies the diversity transmission mode, method III is applied for mapping, and when the ePDCCH applies the single-antenna port transmission mode, method II is applied for mapping, or when the ePDCCH applies the diversity transmission mode, method IV is applied for mapping, and when the ePDCCH applies the single-antenna port transmission mode, method II is applied for mapping, or when the ePDCCH applies the diversity transmission mode, method IV is applied for mapping, and when the ePDCCH applies the single-antenna port transmission mode, method I is applied for mapping.

Preferred Embodiment VI

This preferred embodiment describes a process of first determining an aggregation level according to aggregation levels and/or subframe cyclic prefix type, and then determining a mapping method according to the aggregation level.

The aggregation levels corresponding to the ePDCCH are determined according to indication information, wherein the indication information comprises the downlink control information format, the ePDCCH transmission mode, high layer signalling, the PDSCH transmission mode and the ePDCCH modulation mode. The above-mentioned content may also be described as, according to the aggregation levels, determining one piece or multiple pieces of information about one or more of the downlink control information format, the ePDCCH transmission mode, high layer signalling, the PDSCH transmission mode and the ePDCCH modulation mode.

Method a: Aggregation Levels are Determined According to the Downlink Control Information Format.

A downlink control information format set H1 and a downlink control information format set F1 are defined, wherein the aggregation levels corresponding to the downlink control information format set H1 are X2, and the aggregation levels corresponding to the downlink control information format set F1 are Y2. The specific applications are as follows:

the downlink control information format set H1 comprises: DCI Format 0 and DCI Format 1A;

the downlink control information format set F1 comprises: DCI Format 2C and DCI Format 4;

the aggregation levels X2 comprises one or more of aggregation level 1, aggregation level 2, aggregation level 4 and aggregation level 8; and the aggregation levels Y2 comprises one or more of aggregation level 2, aggregation level 4 and aggregation level 8;

then:

the aggregation levels corresponding to DCI Format 0 and DCI Format 1A comprise aggregation level 1, aggregation level 2 and aggregation level 4; and the aggregation levels corresponding to DCI Format 2C and DCI Format 4 comprise aggregation level 2, aggregation level 4 and aggregation level 8;

or, the aggregation levels corresponding to DCI Format 0 and DCI Format 1A comprise aggregation level 1, aggregation level 2, aggregation level 4 and aggregation level 8; and the aggregation levels corresponding to DCI Format 2C and DCI Format 4 comprise aggregation level 2, aggregation level 4 and aggregation level 8.

Method b: The Aggregation Levels are Determined According to the ePDCCH Transmission Mode.

When the ePDCCH applies a diversity transmission mode, the corresponding aggregation levels are X3, and when the ePDCCH applies a single-antenna port transmission mode, the corresponding aggregation levels are Y3;

the aggregation level X3 comprises one or more of aggregation level 2, aggregation level 4 and aggregation level 8; and the aggregation level Y3 comprises one or more of aggregation level 1, aggregation level 2, aggregation level 4 and aggregation level 8.

The Specific Applications are as Follows:

When the ePDCCH applies a diversity transmission mode, the corresponding aggregation levels comprise aggregation level 2, aggregation level 4 and aggregation level 8; and when the ePDCCH applies a single-antenna port transmission mode, the corresponding aggregation levels comprise aggregation level 1, aggregation level 2 and aggregation level 4;

or, when the ePDCCH aggregation levels are 1 and 2, the ePDCCH transmission mode is single-antenna port, and when the ePDCCH aggregation levels are 4 and 8, the ePDCCH transmission mode is diversity.

Method c: The Aggregation Levels are Determined According to High Layer Signalling For example, the aggregation levels configured by the RRC signalling are one or more of aggregation level 1, aggregation level 2, aggregation level 4 and aggregation level 8.

Method d: An Aggregation Level is Determined According to the PDSCH Transmission Mode A PDSCH transmission mode set H2 and a PDSCH transmission mode set F2 are defined, wherein the aggregation levels corresponding to the PDSCH transmission mode set H2 are X4, and the aggregation levels corresponding to the PDSCH transmission mode set F2 are Y4;

the PDSCH transmission mode set H2 may be the existing transmission modes 1 to 9;

the PDSCH transmission mode set F2 may be a newly defined transmission mode 10, etc.;

the aggregation levels X3 comprise one or more of aggregation level 2, aggregation level 4 and aggregation level 8; and the aggregation level Y3 comprise one or more of aggregation level 1, aggregation level 2, aggregation level 4 and aggregation level 8.

The Specific Applications are as Follows:

if the PDSCH downlink transmission modes are 1 to 9, then the aggregation levels are 2, 4 and 8; and the PDSCH downlink transmission mode is transmission mode 10, then the aggregation levels are 1, 2 and 4.

Method e: Aggregation Levels are Determined According to the ePDCCH Modulation Mode If the ePDCCH modulation mode is QPSK, then the aggregation levels are X5; and if the ePDCCH modulation mode is 16QAM, then the aggregation levels are Y5;

the aggregation levels X5 comprise one or more of aggregation levels 1, 2, 4 and 8; and the aggregation levels Y5 comprise one or more of aggregation levels 1, 2 and 4.

The Specific Applications are as Follows:

if the ePDCCH modulation mode is QPSK, then the aggregation levels are 1, 2, 4 and 8; and the ePDCCH modulation mode is 16QAM, then the aggregation levels are 1, 2 and 4.

It should be noted that the above-mentioned method a to method e may be applied by any combination, and are not limited to the above-mentioned application methods.

In addition, the aggregation levels corresponding to the ePDCCH may also be fixed as M kinds, wherein M is a natural number.

A specific application: the aggregation levels corresponding to the ePDCCH may also be fixed as 4 kinds, which aggregation levels are aggregation level 1, aggregation level 2, aggregation level 4 and aggregation level 8.

Preferred Embodiment VII

The above-mentioned mapping method is not limited to continuous mapping, and may also be used in discrete mapping. As discrete mapping, the specific applications are as follows:

The PRB pairs are capable of carrying 2 resources corresponding to aggregation level 1, as shown in FIG. 5.

Figure 74:
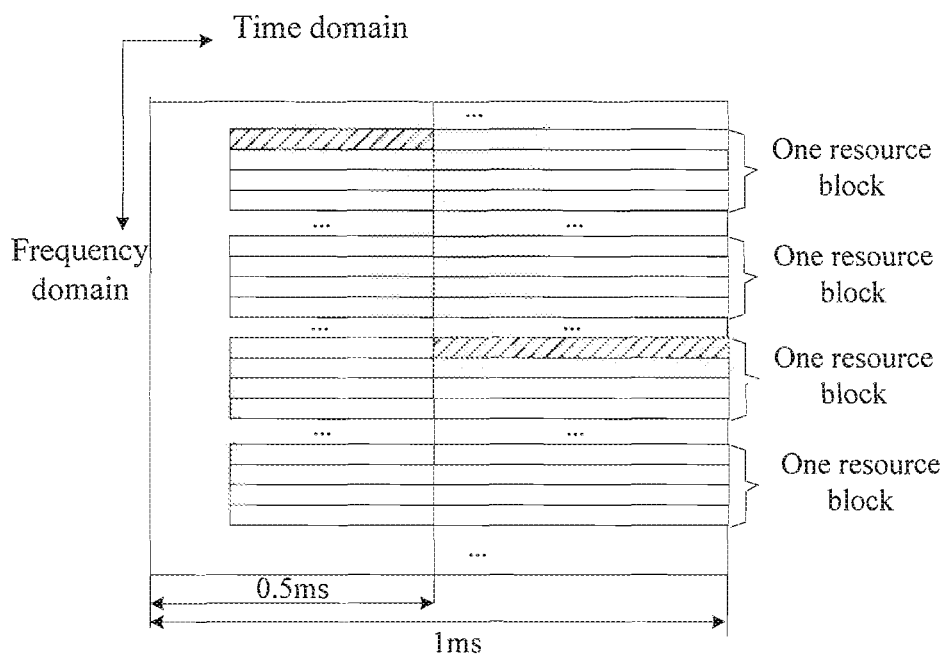
FIG. 74 is schematic diagram I of aggregation level 1 mapping according to preferred embodiment VII of the present disclosure.
Figure 75:
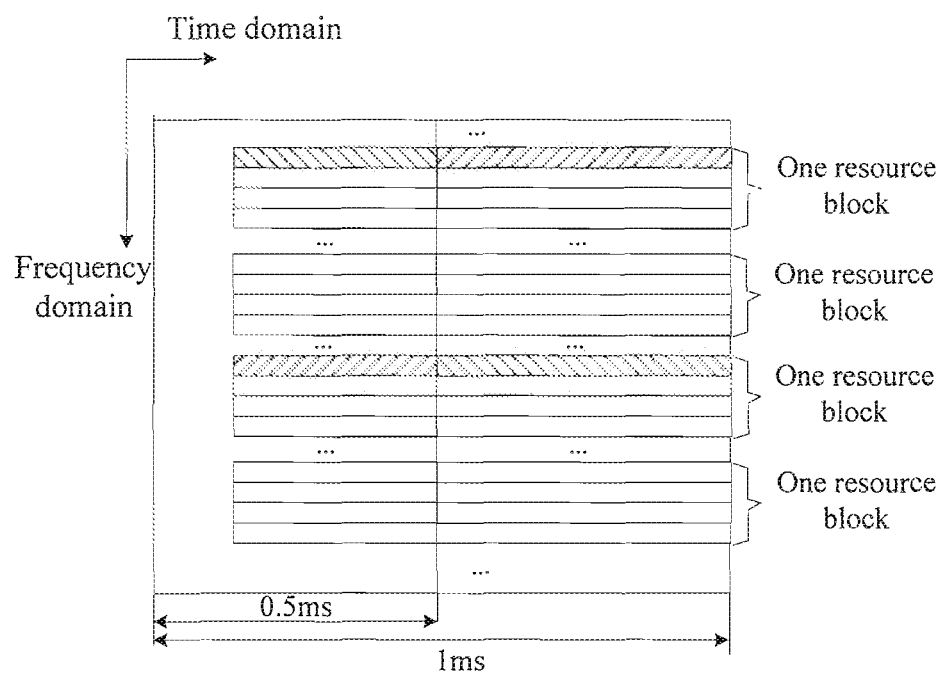
FIG. 75 is schematic diagram I of aggregation level 2 mapping according to preferred embodiment VII of the present disclosure.
Figure 76:
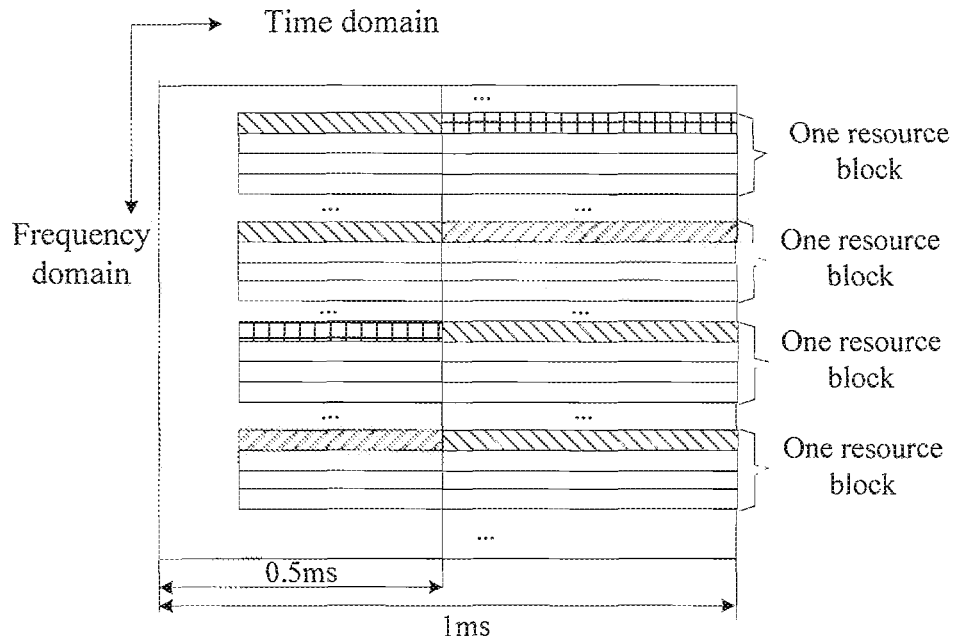
FIG. 76 is schematic diagram I of aggregation level 4 mapping according to preferred embodiment VII of the present disclosure.
Figure 77:
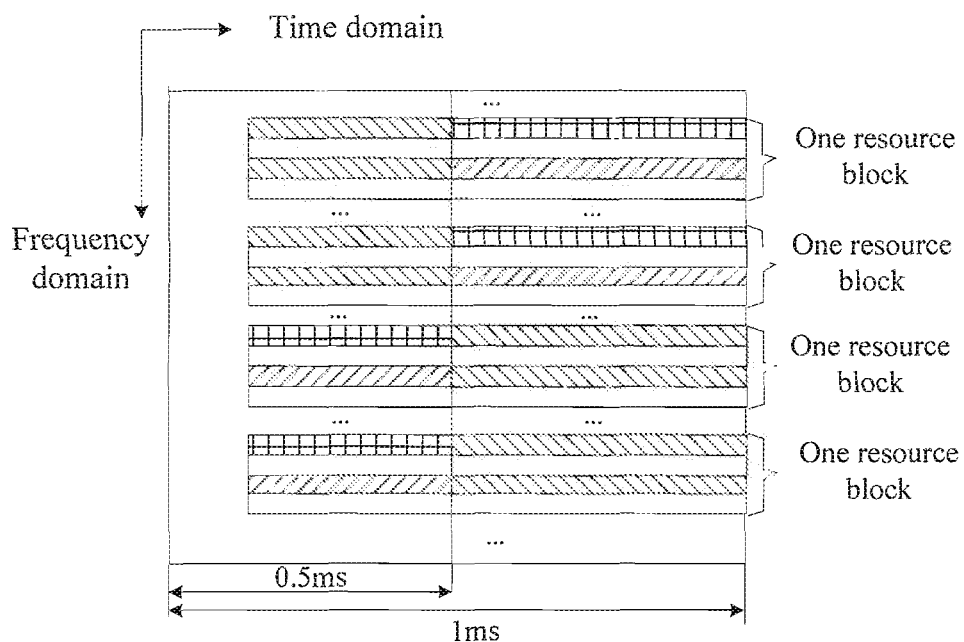
FIG. 77 is schematic diagram I of aggregation level 8 mapping according to preferred embodiment VII of the present disclosure.
Figure 78:
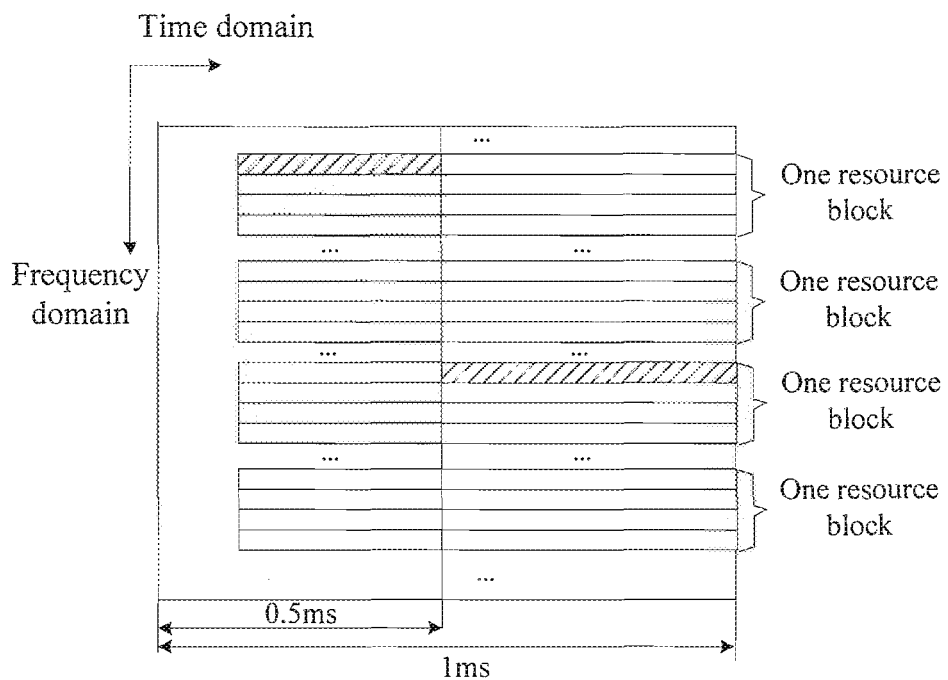
FIG. 78 is schematic diagram II of aggregation level 1 mapping according to preferred embodiment VII of the present disclosure.
Figure 79:
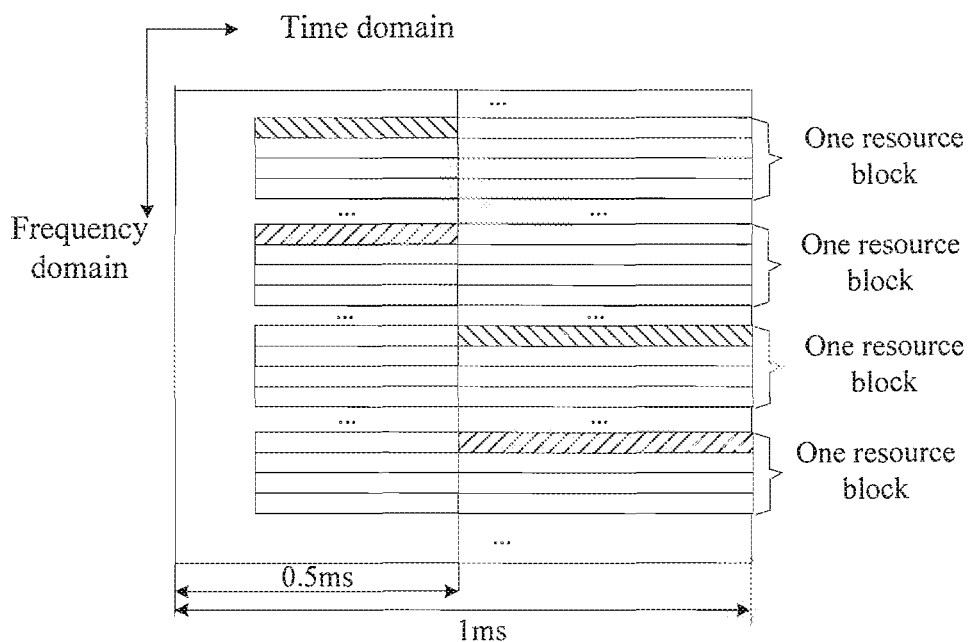
FIG. 79 is schematic diagram II of aggregation level 2 mapping according to preferred embodiment VII of the present disclosure.
Figure 80:
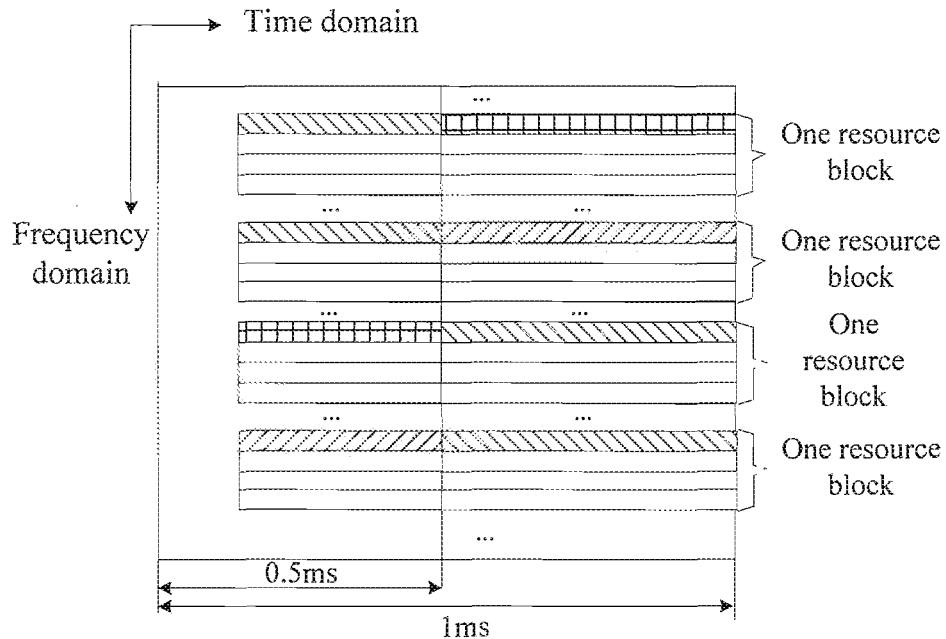
FIG. 80 is schematic diagram II of aggregation level 4 mapping according to preferred embodiment VII of the present disclosure.
Figure 81:
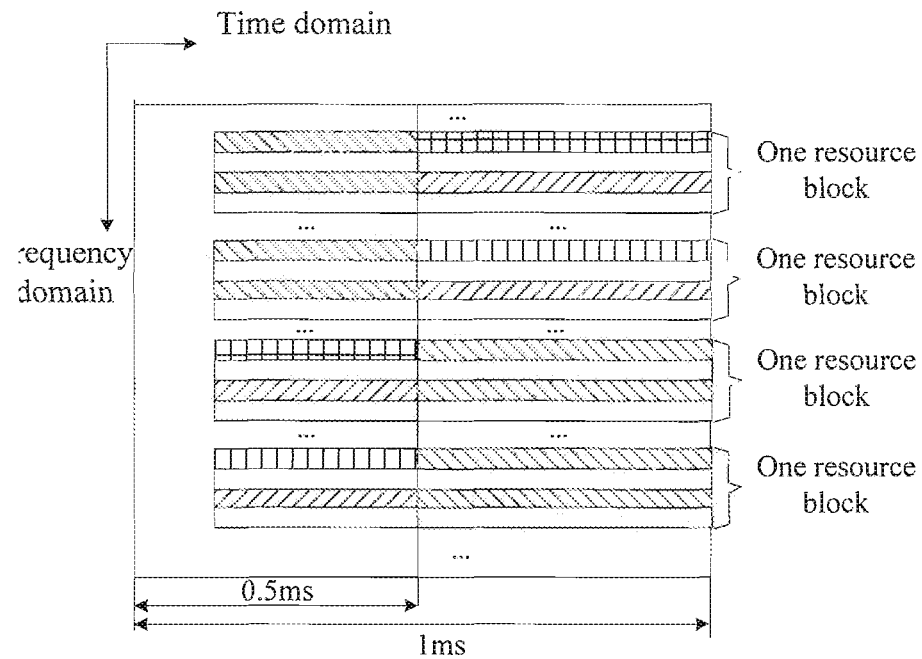
FIG. 81 is schematic diagram II of aggregation level 8 mapping according to preferred embodiment VII of the present disclosure.

The aggregation level is 1, and it is mapped onto 2 PRBs, as shown in FIG. 74. The aggregation level is 2, and it is mapped onto 2 PRBs, as shown in FIG. 75. The aggregation level is 4, and it is mapped onto 2 PRBs, as shown in FIG. 76. The aggregation level is 8, and it is mapped onto 4 PRBs, as shown in FIG. 77. Or, the aggregation level is 1, and it is mapped onto 2 PRBs, as shown in FIG. 78. The aggregation level is 2, and it is mapped onto 4 PRBs, as shown in FIG. 79. The aggregation level is 4, and it is mapped onto 4 PRBs, as shown in FIG. 80. The aggregation level is 8, and it is mapped onto 4 PRBs, as shown in FIG. 81.

The PRB pairs are capable of carrying 2 resources corresponding to aggregation level 1, as shown in FIG. 18 and FIG. 19.

Figure 82:
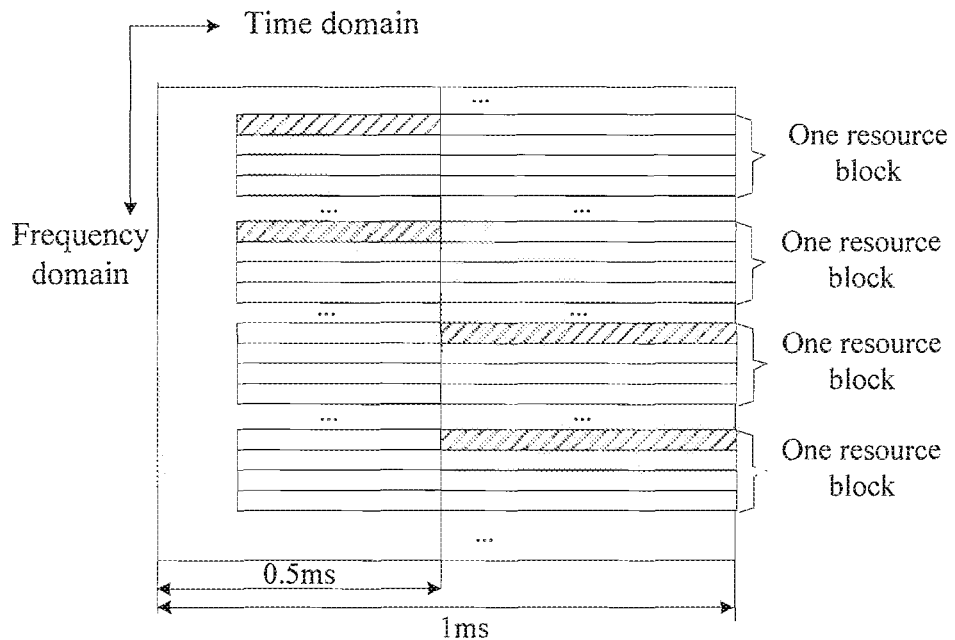
FIG. 82 is schematic diagram III of aggregation level 1 mapping according to preferred embodiment VII of the present disclosure.
Figure 83:
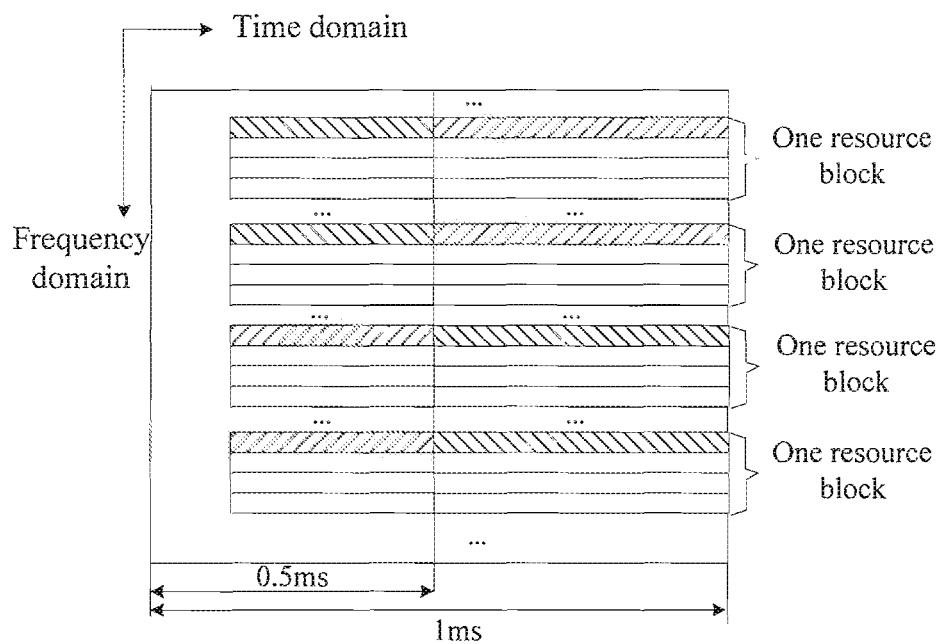
FIG. 83 is schematic diagram III of aggregation level 2 mapping according to preferred embodiment VII of the present disclosure.
Figure 84:
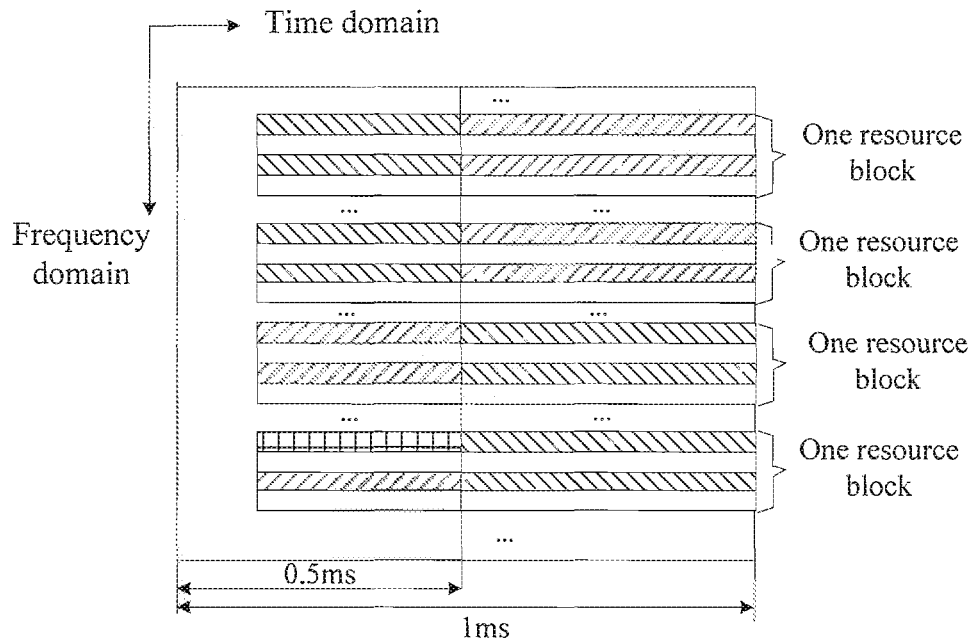
FIG. 84 is schematic diagram III of aggregation level 4 mapping according to preferred embodiment VII of the present disclosure.
Figure 85:
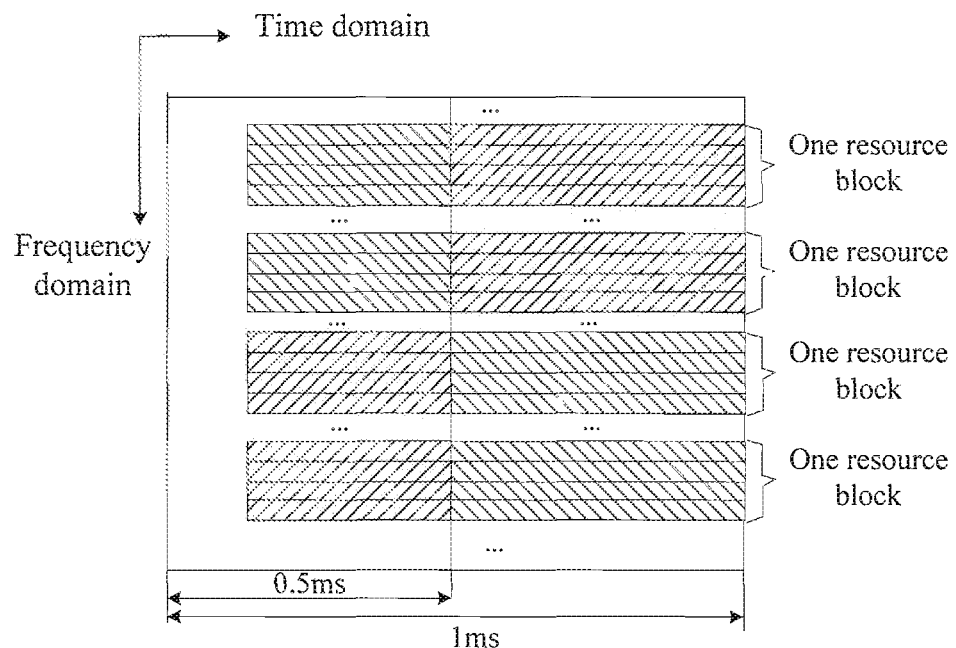
FIG. 85 is schematic diagram III of aggregation level 8 mapping according to preferred embodiment VII of the present disclosure.

The aggregation level is 1, and it is mapped onto 4 PRBs, as shown in FIG. 82. The aggregation level is 2, and it is mapped onto 4 PRBs, as shown in FIG. 83. The aggregation level is 4, and it is mapped onto 4 PRBs, as shown in FIG. 84. The aggregation level is 8, and it is mapped onto 4 PRBs, as shown in FIG. 85.

Embodiment VIII

This preferred embodiment describes the process of determining a mapping method according to mapping mode indication information.

Assumption 1, the mapping mode indication information is 1 bit, and the corresponding mapping methods are method X8 and mapping method Y8; and assumption 2, the mapping mode indication information is 2 bits, and the corresponding mapping methods are method X9, mapping method Y9, mapping method Z9 and mapping method D9.

The Specific Applications are as Follows:

if the mapping mode indication information is 1 bit, and the mapping mode indication information is '0', the mapping method is method 4; and if the mapping mode indication information is 1 bit and the mapping mode indication information is '1', the mapping method is method 1. Or, if the mapping mode indication information is 1 bit and the mapping mode indication information is '0', the mapping method is method 2. Or, if the mapping mode indication information is 1 bit and the mapping mode indication information is '1', the mapping method is method 4. Or, if the mapping mode indication information is 2 bits and the mapping mode indication information is '00', the mapping method is method 1. Or, if the mapping mode indication information is 2 bits and the mapping mode indication information is '01', the mapping method is method 2. Or if the mapping mode indication information is 2 bits and the mapping mode indication information is '01', the mapping method is method 3. Or if the mapping mode indication information is 2 bits and the mapping mode indication information is '11', the mapping method is method 4.

In addition, a process of determining a mapping method according to mapping mode indication information and subframe cyclic prefix type is also described.

It is assumed that if the mapping mode indication information is 1 bit and the mapping mode indication information is '0', the mapping method is method X10; if the mapping mode indication information is 1 bit, the mapping mode indication information is '1' and it is Normal CP, the mapping method is method Y10; and if the mapping mode indication information is 1 bit, the mapping mode indication information is '1', and it is Extended CP, the mapping method is method Z10.

The Specific Applications are as Follows:

If the mapping mode indication information is 1 bit, and the mapping mode indication information is '0', the mapping method is method 4; if the mapping mode indication information is 1 bit, the mapping mode indication information is '1', and it is Normal CP, the mapping method is method 1; if the mapping mode indication information is 1 bit, the mapping mode indication information is '1', and it is Extended CP, the mapping method is method 2. Or, if the mapping mode indication information is 1 bit, and the mapping mode indication information is '0', the mapping method is method 4; if the mapping mode indication information is 1 bit, the mapping mode indication information is '1', and it is Normal CP, the mapping is method is method 2; if the mapping mode indication information is 1 bit, the mapping mode indication information is '1', and it is Extended CP, the mapping method is method 2. Or, if the mapping mode indication information is 1 bit, and the mapping mode indication information is '1', the mapping method is method 4; if the mapping mode indication information is 1 bit, the mapping mode indication information is '0', and it is Normal CP, the mapping method is method 2; if the mapping mode indication information is 1 bit, the mapping mode indication information is '0', and it is Extended CP, the mapping method is method 2; if the mapping mode indication information is 1 bit, the mapping mode indication information is '0', the mapping method is method 2.

Note: the states '0' and '1' corresponding to the indication information may be interchanged.

It should be noted that the steps shown in the flowchart of the drawings can be executed, for example, in a computer system with a set of instructions executable by a computer, in addition, a logic order is shown in the flowchart, but the shown or described steps can be executed in a different order under some conditions.

Figure 86:
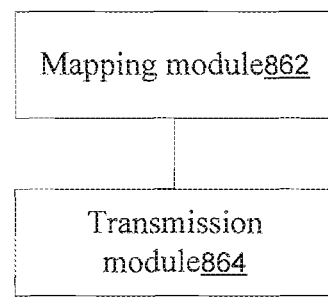
FIG. 86 is a structural block diagram of a device for transmitting downlink control information according to an embodiment of the present disclosure.
Figure 87:
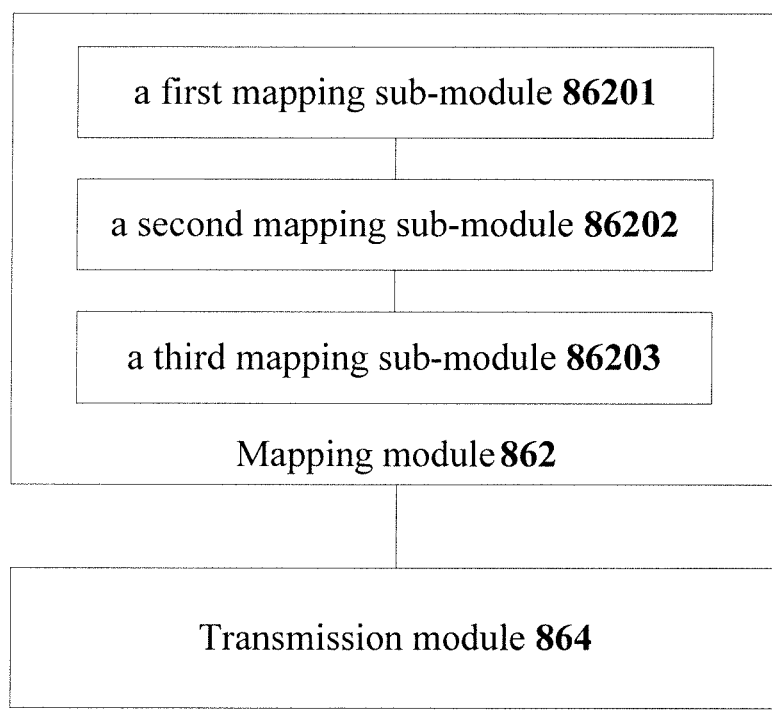
FIG. 87 is a structural block diagram detailing sub-modules for a mapping module in FIG. 86.
Figure 88:
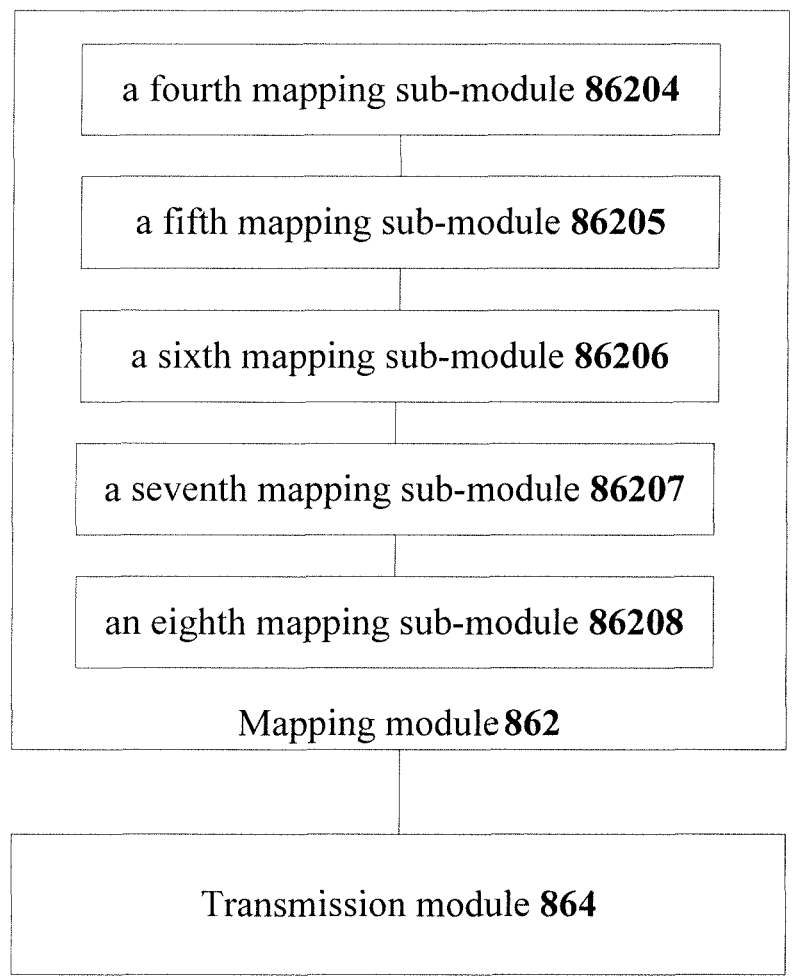
FIG. 88 is a structural block diagram detailing other sub-modules for the mapping module in FIG. 86.
Figure 89:
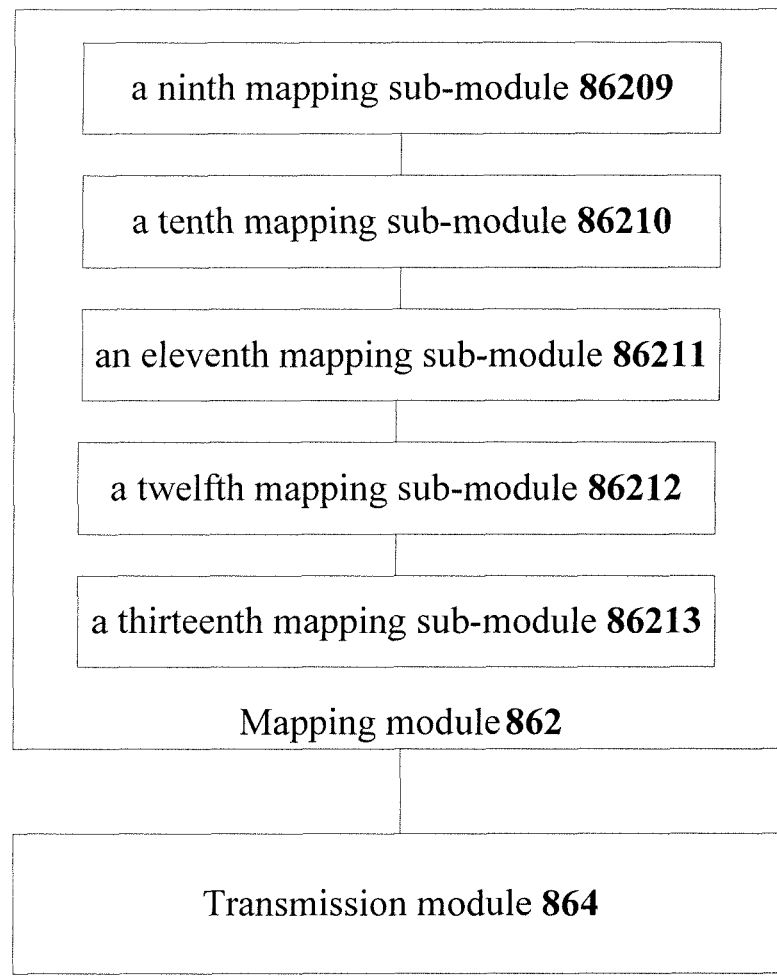
FIG. 89 is a structural block diagram detailing other sub-modules for the mapping module in FIG. 86.
Figure 90:
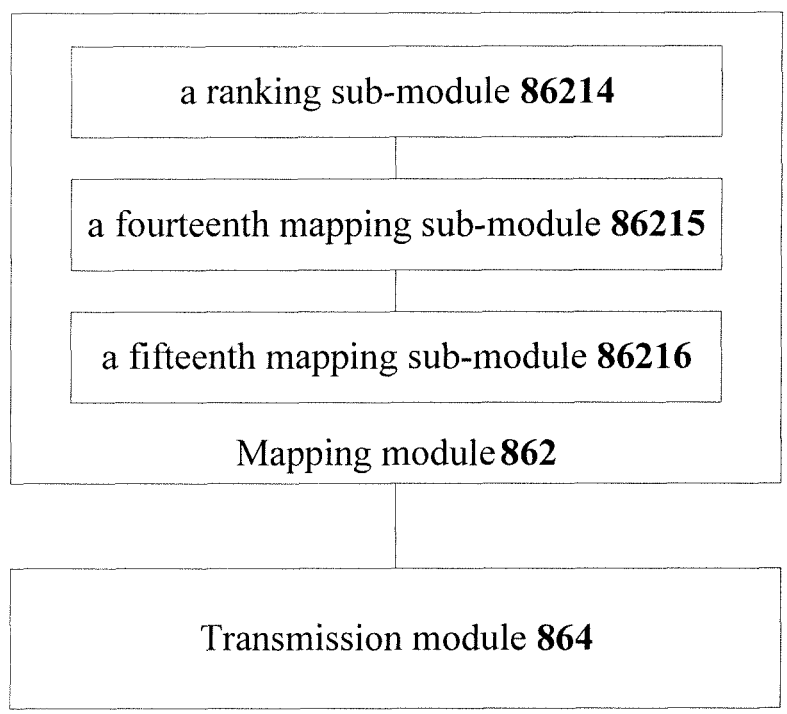
FIG. 90 is a structural block diagram detailing other sub-modules for the mapping module in FIG. 86.

The embodiment of the present disclosure provides a device for transmitting downlink control information, and the device for transmitting downlink control information may be used for performing the method for transmitting downlink control information above. FIG. 86 is a structural block diagram of a device for transmitting downlink control information according to an embodiment of the present disclosure. As shown in FIG. 86, a mapping module 862 and a transmission module 864 are comprised. The structure is described in details below.

The mapping module 862 is configured to, according to a predefined condition, map the downlink control information carried on an enhanced physical downlink control channel (ePDCCH) onto at least one PRB pair, the predefined condition comprising at least one of: an ePDCCH aggregation level, a subframe cyclic prefix type, a format of the downlink control information carried on the ePDCCH, an ePDCCH transmission mode, and mapping mode indication information; and the transmission module 864 is connected to the mapping module 862, and is configured to transmit the downlink control information carried on the at least one PRB pair mapped by the mapping module 862.

Preferably, if the at least one PRB pair is capable of carrying 4 pieces of the downlink control information with the aggregation level being 1, the mapping module 862 comprises: a first mapping sub-module 86201, configured to map onto 1 PRB pair when the aggregation level is 1, map onto 2 PRB pairs when the aggregation level is 2, map onto 4 PRB pairs when the aggregation level is 4, and map onto 8 PRB pairs when the aggregation level is 8; a second mapping sub-module 86202, configured to map onto 1 PRB pair when the aggregation level is 1, map onto 2 PRB pairs when the aggregation level is 2, map onto 4 PRB pairs when the aggregation level is 4, and map onto 4 PRB pairs when the aggregation level is 8; and a third mapping sub-module 86203, configured to map onto 1 PRB pair when the aggregation level is 1, map onto 2 PRB pairs when the aggregation level is 2, map onto 2 PRB pairs when the aggregation level is 4, and map onto 2 PRB pairs when the aggregation level is 8.

Preferably, if the at least one PRB pair is capable of carrying 2 pieces of the downlink control information with the aggregation level being 1, the mapping module comprises: a fourth mapping sub-module 86204, configured to, if the predefined condition comprises that the subframe cyclic prefix type is Normal CP, mapping onto 2 of the PRB pairs when the aggregation level is 1, mapping onto 2 of the PRB pairs when the aggregation level is 2, map onto 2 PRB pairs when the aggregation level is 4, and map onto 4 PRB pairs when the aggregation level is 8; a fifth mapping sub-module 86205, configured to, if the predefined condition comprises that the subframe cyclic prefix type is Normal CP, map onto 2 PRB pairs when the aggregation level is 1, map onto 4 PRB pairs when the aggregation level is 2, map onto 4 PRB pairs when the aggregation level is 4, and map onto 4 PRB pairs when the aggregation level is 8; a sixth mapping sub-module 86206, configured to, if the predefined condition comprises that the subframe cyclic prefix type is Normal CP, map onto 2 PRB pairs when the aggregation level is 1, map onto 4 PRB pairs when the aggregation level is 2, map onto 8 PRB pairs when the aggregation level is 4, and map onto 8 PRB pairs when the aggregation level is 8; a seventh mapping sub-module 86207, configured to, if the predefined condition comprises that the subframe cyclic prefix type is Extended CP, map onto 1 PRB pair when the aggregation level is 1, map onto 2 PRB pairs when the aggregation level is 2, map onto 4 PRB pairs when the aggregation level is 4, and map onto 8 PRB pairs when the aggregation level is 8; and an eighth mapping sub-module 86208, configured to, if the predefined condition comprises that the subframe cyclic prefix type is Extended CP, map onto 1 PRB pair when the aggregation level is 1, map onto 2 PRB pairs when the aggregation level is 2, map onto 2 PRB pairs when the aggregation level is 4, and map onto 4 PRB pairs when the aggregation level is 8.

Preferably, if the at least one PRB pair is capable of carrying 1 piece of the downlink control information with the aggregation level being 1, the mapping module comprises: a ninth mapping sub-module 86209, configured to, if the predefined condition comprises that the subframe cyclic prefix type is Normal CP, map onto 4 PRB pairs when the aggregation level is 1, map onto 4 PRB pairs when the aggregation level is 2, map onto 4 PRB pairs when the aggregation level is 4, and map onto 8 PRB pairs when the aggregation level is 8; a tenth mapping sub-module 86210, configured to, if the predefined condition comprises that the subframe cyclic prefix type is Normal CP, map onto 4 PRB pairs when the aggregation level is 1, map onto 8 PRB pairs when the aggregation level is 2, map onto 8 PRB pairs when the aggregation level is 4, and map onto 8 PRB pairs when the aggregation level is 8; an eleventh mapping sub-module 86211, configured to, if the predefined condition comprises that the subframe cyclic prefix type is Extended CP, map onto 2 PRB pairs when the aggregation level is 1, map onto 2 PRB pairs when the aggregation level is 2, map onto 4 PRB pairs when the aggregation level is 4, and map onto 8 PRB pairs when the aggregation level is 8; a twelfth mapping sub-module 86212, configured to, if the predefined condition comprises that the subframe cyclic prefix type is Extended CP, map onto 2 PRB pairs when the aggregation level is 1, map onto 4 PRB pairs when the aggregation level is 2, map onto 4 PRB pairs when the aggregation level is 4, and map onto 8 PRB pairs when the aggregation level is 8; and a thirteenth mapping sub-module 86213, configured to, if the predefined condition comprises that the subframe cyclic prefix type is Extended CP, map onto 2 PRB pair when the aggregation level is 1, map onto 4 PRB pairs when the aggregation level is 2, map onto 8 PRB pairs when the aggregation level is 4, and map onto 8 PRB pairs when the aggregation level is 8.

Preferably, if the at least one PRB pair is capable of carrying K pieces of the downlink control information with the aggregation level being 1 and the value range of K comprises at least one of 1, 2 and 4, the mapping module comprises: a ranking module 86214, configured to successively rank aggregation levels comprised by all the PRB pairs configured to carry the downlink control information; a fourteenth mapping sub-module 86215, configured to map according to an aggregation level type sequence on the basis of a predefined initial aggregation level index; and a fifteenth mapping sub-module 86216, configured to map according to an aggregation level type sequence on the basis of an aggregation level index configured by a base station.

It should be noted that the device for transmitting downlink control information described in the device embodiments corresponds to the method embodiments above, with the specific implementation described in the method embodiments in detail, thereby needing no further description.

It should be noted that in the embodiments above of the present disclosure, all the downlink control information formats comprise downlink control information formats defined in the future, and all the aggregation levels comprise aggregation levels defined in the future; all the resource block pairs may be continuous resource block pairs and may also be discrete resource block pairs; and the method for dividing all the resource block pairs into aggregation level 1 may be continuously divided or discretely divided according to the frequency domain and time domain, divided with an equal size, or divided with unequal sizes and any dividing methods.

It should be noted that aggregation level 1 may be regarded as a unit for downlink control information mapping, i.e. an enhanced control channel element (eCCE); aggregation level 1, aggregation level 2, aggregation level 4 and aggregation level 8 correspond to 1 eCCE, 2 eCCEs, 4 eCCEs and 8 eCCEs, which also correspond to four ePDCCH formats.

In summary, according to the embodiments above of the present disclosure, a method and device for transmitting downlink control information are provided. By mapping according to one or more predefined conditions, the present disclosure achieves mapping from the ePDCCH to the physical resource pair, and ensures the ePDCCH to obtain frequency domain diversity gain and scheduling gain.

Obviously, those skilled in the art shall understand that the above-mentioned modules and steps of the present disclosure can be realized by using general purpose calculating device, can be integrated in one calculating device or distributed on a network which consists of a plurality of calculating devices. Alternatively, the modules and the steps of the present disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present disclosure is not restricted to any particular hardware and software combination.

The descriptions above are only the preferable embodiment of the present disclosure, which are not used to restrict the present disclosure, for those skilled in the art, the present disclosure may have various changes and variations. All modifications, equivalents and improvements, which are made within the spirit and principle of the present disclosure, should be comprised in the protection scope of the present disclosure.

What is claimed is:

1. A method for transmitting downlink control information, comprising:

mapping the downlink control information carried on an enhanced Physical Downlink Control Channel (ePDCCH) onto at least one physical resource block (PRB) pair according to a predefined condition, the predefined condition comprising: an ePDCCH aggregation level, a subframe cyclic prefix type, a format of the downlink control information carried on the ePDCCH and mapping mode indication information, wherein:

a) when the at least one PRB pair carries 4 pieces of the downlink control information with the aggregation level being 1, mapping the downlink control information carried on the ePDCCH onto the at least one PRB pair according to the predefined condition comprises a part or all of one of:

mapping onto 1 PRB pair when the aggregation level is 1, mapping onto 2 PRB pairs when the aggregation level is 2, mapping onto 4 PRB pairs when the aggregation level is 4, and mapping onto 8 PRB pairs when the aggregation level is 8;

mapping onto 1 PRB pair when the aggregation level is 1, mapping onto 2 PRB pairs when the aggregation level is 2, mapping onto 4 PRB pairs when the aggregation level is 4, and mapping onto 4 PRB pairs when the aggregation level is 8; and mapping onto 1 PRB pair when the aggregation level is 1, mapping onto 2 PRB pairs when the aggregation level is 2, mapping onto 2 PRB pairs when the aggregation level is 4, and mapping onto 2 PRB pairs when the aggregation level is 8;

b) when the at least one PRB pair carries 2 pieces of the downlink control information with the aggregation level being 1, mapping the downlink control information carried on the ePDCCH onto the at least one PRB pair according to the predefined condition comprises a part or all of one of:

when the predefined condition comprises that the subframe cyclic prefix type is Normal CP, mapping onto 2 PRB pairs when the aggregation level is 1, mapping onto 2 PRB pairs when the aggregation level is 2, mapping onto 2 PRB pairs when the aggregation level is 4, and mapping onto 4 PRB pairs when the aggregation level is 8;

when the predefined condition comprises that the subframe cyclic prefix type is Normal CP, mapping onto 2 PRB pairs when the aggregation level is 1, mapping onto 4 PRB pairs when the aggregation level is 2, mapping onto 4 PRB pairs when the aggregation level is 4, and mapping onto 4 PRB pairs when the aggregation level is 8;

when the predefined condition comprises that the subframe cyclic prefix type is Normal CP, mapping onto 2 PRB pairs when the aggregation level is 1, mapping onto 4 PRB pairs when the aggregation level is 2, mapping onto 8 PRB pairs when the aggregation level is 4, and mapping onto 8 PRB pairs when the aggregation level is 8;

when the predefined condition comprises that the subframe cyclic prefix type is Extended CP, mapping onto 1 PRB pair when the aggregation level is 1, mapping onto 2 PRB pairs when the aggregation level is 2, mapping onto 4 PRB pairs when the aggregation level is 4, and mapping onto 8 PRB pairs when the aggregation level is 8; and when the predefined condition comprises that the subframe cyclic prefix type is Extended CP, mapping onto 1 PRB pair when the aggregation level is 1, mapping onto 2 PRB pairs when the aggregation level is 2, mapping onto 2 PRB pairs when the aggregation level is 4, and mapping onto 4 PRB pairs when the aggregation level is 8, or c) when the at least one PRB pair carries 1 piece of the downlink control information with the aggregation level being 1, mapping the downlink control information carried on the ePDCCH onto the at least one PRB pair according to the predefined condition comprises a part or all of one of:

when the predefined condition comprises that the subframe cyclic prefix type is Normal CP, mapping onto 4 PRB pairs when the aggregation level is 1, mapping onto 4 PRB pairs when the aggregation level is 2, mapping onto 4 PRB pairs when the aggregation level is 4, and mapping onto 8 PRB pairs when the aggregation level is 8;

when the predefined condition comprises that the subframe cyclic prefix type is Normal CP, mapping onto 4 PRB pairs when the aggregation level is 1, mapping onto 8 PRB pairs when the aggregation level is 2, mapping onto 8 PRB pairs when the aggregation is 4, and mapping onto 8 PRB pairs when the aggregation level is 8;

when the predefined condition comprises that the subframe cyclic prefix type is Extended CP, mapping onto 2 PRB pairs when the aggregation level is 1, mapping onto 2 PRB pairs when the aggregation level is 2, mapping onto 4 PRB pairs when the aggregation level is 4, and mapping onto 8 PRB pairs when the aggregation level is 8;

when the predefined condition comprises that the subframe cyclic prefix type is Extended CP, mapping onto 2 PRB pairs when the aggregation level is 1, mapping onto 2 PRB pairs when the aggregation level is 4, mapping onto 4 PRB pairs when the aggregation level is 4, and mapping onto 8 PRB pairs when the aggregation level is 8; and when the predefined condition comprises that the subframe cyclic prefix type is Extended CP, mapping onto 2 PRB pairs when the aggregation level is 1, mapping onto 4 PRB pairs when the aggregation level is 2, mapping onto 8 PRB pairs when the aggregation level is 4, and mapping onto 8 PRB pairs when the aggregation level is 8; and transmitting the downlink control information carried on the at least one PRB pair.

2. The method according to claim 1, wherein the at least one PRB pair carries 4 pieces of the downlink control information with the aggregation level being 1.

3. The method according to claim 1, wherein the at least one PRB pair carries 2 pieces of the downlink control information with the aggregation level being 1.

4. The method according to claim 1, wherein the at least one PRB pair carries 1 piece of the downlink control information with the aggregation level being 1.

5. The method according to claim 1, wherein when the at least one PRB pair carries K pieces of the downlink control information with the aggregation level being 1 and the value range of K comprises at least one of 1, 2 and 4, mapping the downlink control information carried on the ePDCCH onto the at least one PRB pair according to the predefined condition comprises one of:

ranking successively aggregation levels comprised by all the PRB pairs configured to carry the downlink control information, and mapping according to an aggregation level type sequence on the basis of a predefined initial aggregation level index; and ranking successively aggregation levels comprised by all the PRB pairs configured to carry the downlink control information, and mapping according to an aggregation level type sequence on the basis of an aggregation level index configured by a base station.

6. The method according to claim 1, wherein before mapping the downlink control information carried on the ePDCCH onto the at least one PRB pair according to the predefined condition, the method further comprises: determining the aggregation level according to indication information, wherein the indication information comprises at least one of: the format of the downlink control information carried on the ePDCCH, the ePDCCH transmission mode, an ePDCCH modulation mode, high layer signalling, and a transmission mode of physical downlink shared channel (PDSH).

7. A device for transmitting downlink control information, comprising:
   a mapping module to, according to a predefined condition, map the downlink control information carried on an enhanced physical downlink control channel (ePDCCH) onto at least one physical resource block (PRB) pair, the predefined condition comprising: an ePDCCH aggregation level, a subframe cyclic prefix type, a format of the downlink control information carried on the ePDCCH and mapping mode indication information; and
   a transmission module to transmit the downlink control information carried on the at least one PRB pair, wherein:

a) when the at least one PRB pair carries 4 pieces of the downlink control information with the aggregation level being 1, the mapping module comprises:
   a first mapping sub-module to map onto 1 PRB pair when the aggregation level is 1, map onto 2 PRB pairs when the aggregation level is 2, map onto 4 PRB pairs when the aggregation level is 4, and map onto 8 PRB pairs when the aggregation level is 8;
   a second mapping sub-module to map onto 1 PRB pair when the aggregation level is 1, map onto 2 PRB pairs when the aggregation level is 2, map onto 4 PRB pairs when the aggregation level is 4, and map onto 4 PRB pairs when the aggregation level is 8; and
   a third mapping sub-module to map onto 1 PRB pair when the aggregation level is 1, map onto 2 PRB pairs when the aggregation level is 2, map onto 2 PRB pairs when the aggregation level is 4, and map onto 2 PRB pairs when the aggregation level is 8;

b) when the at least one PRB pair carries 2 pieces of the downlink control information with the aggregation level being 1, the mapping module comprises:
   a fourth mapping sub-module that will, when the predefined condition comprises that the subframe cyclic prefix type is Normal CP, map onto 2 PRB pairs when the aggregation level is 1, map onto 2 PRB pairs when the aggregation level is 2, map onto 2 PRB pairs when the aggregation level is 4, and map onto 4 PRB pairs when the aggregation level is 8;
   a fifth mapping sub-module that will, when the predefined condition comprises that the subframe cyclic prefix type is Normal CP, map onto 2 PRB pairs when the aggregation level is 1, map onto 4 PRB pairs when the aggregation level is 2, map onto 4 PRB pairs when the aggregation level is 4, and map onto 4 PRB pairs when the aggregation level is 8;
   a sixth mapping sub-module that will, when the predefined condition comprises that the subframe cyclic prefix type is Normal CP, map onto 2 PRB pairs when the aggregation level is 1, map onto 4 PRB pairs when the aggregation level is 2, map onto 8 PRB pairs when the aggregation level is 4, and map onto 8 PRB pairs when the aggregation level is 8;
   a seventh mapping sub-module that will, when the predefined condition comprises that the subframe cyclic prefix type is Extended CP, map onto 1 PRB pair when the aggregation level is 1, map onto 2 PRB pairs when the aggregation level is 2, map onto 4 PRB pairs when the aggregation level is 4, and map onto 8 PRB pairs when the aggregation level is 8; and
   an eighth mapping sub-module that will, when the predefined condition comprises that the subframe cyclic prefix type is Extended CP, map onto 1 PRB pair when the aggregation level is 1, map onto 2 PRB pairs when the aggregation level is 2, mapping onto 2 PRB pairs when the aggregation level is 4, and map onto 4 PRB pairs when the aggregation level is 8;

or c) when the at least one PRB pair carries 1 piece of the downlink control information with the aggregation level being 1, the mapping module comprises:
   a ninth mapping sub-module that will, when the predefined condition comprises that the subframe cyclic prefix type is Normal CP, map onto 4 PRB pairs when the aggregation level is 1, map onto 4 PRB pairs when the aggregation level is 2, map onto 4 PRB pairs when the aggregation level is 4, and map onto 8 PRB pairs when the aggregation level is 8;
   a tenth mapping sub-module that will, when the predefined condition comprises that the subframe cyclic prefix type is Normal CP, map onto 4 PRB pairs when the aggregation level is 1, map onto 8 PRB pairs when the aggregation level is 2 map onto 8 PRB pairs when the aggregation level is 4, and map onto 8 PRB pairs when the aggregation level is 8;
   an eleventh mapping sub-module that will, when the predefined condition comprises that the subframe cyclic prefix type is Extended CP, map onto 2 PRB pairs when the aggregation level is 1, map onto 2 PRB pairs when the aggregation level is 2, map onto 4 PRB pairs when the aggregation level is 4, and map onto 8 PRB pairs when the aggregation level is 8;
   a twelfth mapping sub-module that will, when the predefined condition comprises that the subframe cyclic prefix type is Extended CP, map onto 2 PRB pairs when the aggregation level is 1, map onto 4 PRB pairs when the aggregation level is 2, map onto 4 PRB pairs when the aggregation level is 4, and map onto 8 PRB pairs when the aggregation level is 8; and
   a thirteenth mapping sub-module that will, when the predefined condition comprises that the subframe cyclic prefix type is Extended CP, map onto 2 PRB pairs when the aggregation level is 1, map onto 4 PRB pairs when the aggregation level is 2, mapping onto 8 PRB pairs when the aggregation level is 4, and map onto 8 PRB pairs when the aggregation level is 8.

8. The device according to claim 7, wherein the at least one PRB pair carries 4 pieces of the downlink control information with the aggregation level being 1.

9. The device according to claim 7, wherein the at least one PRB pair carries 2 pieces of the downlink control information with the aggregation level being 1.

10. The device according to claim 7, wherein the at least one PRB pair carries 1 piece of the downlink control information with the aggregation level being 1.

11. The device according to claim 7, wherein when the at least one PRB pair carries K pieces of the downlink control information with the aggregation level being 1 and the value range of K comprises at least one of 1, 2 and 4, the mapping module comprises:
 a ranking sub-module to successively rank aggregation levels comprised by all the PRB pairs configured to carry the downlink control information;
 a fourteenth mapping sub-module to map according to an aggregation level type sequence on the basis of a predefined initial aggregation level index; and
 a fifteenth mapping sub-module to map according to an aggregation level type sequence on the basis of an aggregation level index configured by a base station.

12. The method according to claim 1, the number of the at least one PRB pair corresponding to the ePDCCH comprises: 2, 4, or 8.

13. The method according to claim 1, wherein the at least one PRB pair is capable of carrying 4 pieces of the downlink control information with the aggregation level being 1, or, the at least one PRB pair is capable of carrying 2 pieces of the downlink control information with the aggregation level being 1.

14. The device according to claim 7, wherein the number of the at least one PRB pair corresponding to the ePDCCH comprises: 2, 4, or 8.

15. The device according to claim 7, wherein the at least one PRB pair is capable of carrying 4 pieces of the downlink control information with the aggregation level being 1, or, the at least one PRB pair is capable of carrying 2 pieces of the downlink control information with the aggregation level being 1.

16. The method according to claim 2, wherein before mapping the downlink control information carried on the ePDCCH onto the at least one PRB pair according to the predefined condition, the method further comprises: determining the aggregation level according to indication information, wherein the indication information comprises at least one of: the format of the downlink control information carried on the ePDCCH, the ePDCCH transmission mode, an ePDCCH modulation mode, high layer signalling, and a transmission mode of physical downlink shared channel (PDSH).

17. The method according to claim 3, wherein before mapping the downlink control information carried on the ePDCCH onto the at least one PRB pair according to the predefined condition, the method further comprises: determining the aggregation level according to indication information, wherein the indication information comprises at least one of: the format of the downlink control information carried on the ePDCCH, the ePDCCH transmission mode, an ePDCCH modulation mode, high layer signalling, and a transmission mode of physical downlink shared channel (PDSH).

18. The method according to claim 4, wherein before mapping the downlink control information carried on the ePDCCH onto the at least one PRB pair according to the predefined condition, the method further comprises: determining the aggregation level according to indication information, wherein the indication information comprises at least one of: the format of the downlink control information carried on the ePDCCH, the ePDCCH transmission mode, an ePDCCH modulation mode, high layer signalling, and a transmission mode of physical downlink shared channel (PDSH).

19. The method according to claim 5, wherein before mapping the downlink control information carried on the ePDCCH onto the at least one PRB pair according to the predefined condition, the method further comprises: determining the aggregation level according to indication information, wherein the indication information comprises at least one of: the format of the downlink control information carried on the ePDCCH, the ePDCCH transmission mode, an ePDCCH modulation mode, high layer signalling, and a transmission mode of physical downlink shared channel (PDSH).

* * * * *